United States Patent
Gronsbell et al.

(10) Patent No.: US 12,400,490 B2
(45) Date of Patent: Aug. 26, 2025

(54) METHODS, APPARATUSES, AND SYSTEMS FOR MONITORING AND MAINTAINING VEHICLE CONDITION

(71) Applicant: Assurant, Inc., New York, NY (US)

(72) Inventors: Dan Gronsbell, Marietta, GA (US); Angel Garcia, Miami, FL (US); Ronnie Blake Perkna, Smyrna, GA (US)

(73) Assignee: Assurant, Inc., New York, NY (US)

( * ) Notice: Subject to any disclaimer, the term of this patent is extended or adjusted under 35 U.S.C. 154(b) by 0 days.

(21) Appl. No.: 18/173,507

(22) Filed: Feb. 23, 2023

(65) Prior Publication Data

US 2023/0274587 A1     Aug. 31, 2023

Related U.S. Application Data

(63) Continuation of application No. 16/750,838, filed on Jan. 23, 2020, now Pat. No. 11,625,957.

(60) Provisional application No. 62/795,832, filed on Jan. 23, 2019.

(51) Int. Cl.
*G07C 5/00* (2006.01)
*G06F 3/0482* (2013.01)
*G06F 16/25* (2019.01)
*G06Q 40/08* (2012.01)
(Continued)

(52) U.S. Cl.
CPC ......... *G07C 5/008* (2013.01); *G06F 3/0482* (2013.01); *G06F 16/25* (2019.01); *G06Q 40/08* (2013.01); *G07C 5/006* (2013.01); *G07C 5/0808* (2013.01); *G07C 5/0816* (2013.01); *G07C 5/085* (2013.01); *G07C 5/12* (2013.01)

(58) Field of Classification Search
CPC ...................................................... G07C 5/008
See application file for complete search history.

(56) References Cited

U.S. PATENT DOCUMENTS

| | | | |
|---|---|---|---|
| 8,996,230 B2 * | 3/2015 | Lorenz | G07C 5/008 |
| | | | 701/29.9 |
| 9,329,049 B2 * | 5/2016 | Edwards | G01C 21/3605 |
| 9,520,006 B1 | 12/2016 | Sankovsky et al. | |

(Continued)

OTHER PUBLICATIONS

U.S. Appl. No. 16/750,838, filed Jan. 23, 2020, U.S. Pat. No. 11,625,957.
(Continued)

*Primary Examiner* — Michael A Berns
(74) *Attorney, Agent, or Firm* — ALSTON & BIRD LLP

(57) ABSTRACT

Methods, systems, apparatuses, and computer readable media for monitoring and maintaining vehicle condition. An apparatus of an example embodiment includes means for receiving a partial dataset indicator for a certain type of dataset. Said apparatus also includes means for providing at least one complete dataset indicator. The partial dataset indicator and the at least one complete dataset indicators provides an indication of one or more terms in their respective dataset. Said apparatus further includes means for determining at least one of the one or more terms of the partial dataset. Said apparatus still further includes means for causing the transmission of at least one of the one or more determined terms of the partial dataset for use by a mobile application. Corresponding systems, methods, and computer readable media are also provided.

20 Claims, 52 Drawing Sheets

(51) Int. Cl.
G07C 5/08 (2006.01)
G07C 5/12 (2006.01)

(56) References Cited

U.S. PATENT DOCUMENTS

| | | | |
|---|---|---|---|
| 10,347,058 B2 * | 7/2019 | Pursifull | G07C 5/0808 |
| 10,410,526 B2 * | 9/2019 | Kumar | G08G 1/205 |
| 10,466,690 B2 | 11/2019 | Unuma et al. | |
| 11,487,963 B2 * | 11/2022 | Angel | G06N 3/04 |
| 11,625,927 B2 * | 4/2023 | Morimoto | G06V 40/16 |
| | | | 382/103 |
| 2003/0055666 A1 * | 3/2003 | Roddy | G07C 5/008 |
| | | | 705/305 |
| 2014/0195098 A1 | 7/2014 | Lorenz et al. | |
| 2015/0286994 A1 * | 10/2015 | Elder | G06Q 10/20 |
| | | | 705/305 |
| 2016/0163130 A1 | 6/2016 | Zagajac et al. | |
| 2018/0144639 A1 | 5/2018 | Kumar et al. | |
| 2020/0234515 A1 | 7/2020 | Gronsbell et al. | |
| 2023/0274587 A1 * | 8/2023 | Gronsbell | G07C 5/008 |
| | | | 701/31.4 |

OTHER PUBLICATIONS

European Search Report and Search Opinion received for EP Application No. 20745068.5, mailed on Sep. 26, 2022, 9 pages.
ISA/US, International Search Report and Written Opinion for PCT/US2020/014828 (23 pages), Jun. 18, 2020.
Extended European Search Report Mailed on Apr. 11, 2025 for EP Application No. 24220326, 7 page(s).

* cited by examiner

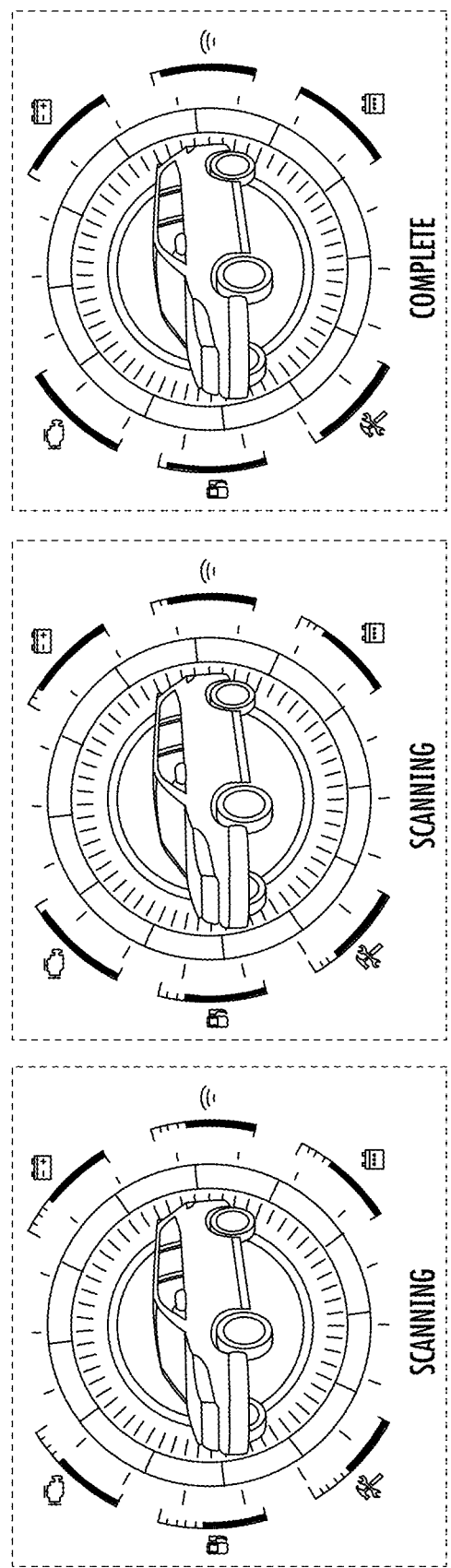

METHODS, APPARATUSES, AND SYSTEMS FOR MONITORING AND MAINTAINING VEHICLE CONDITION

CROSS-REFERENCE TO RELATED APPLICATION

This application is a continuation of U.S. Non-Provisional application Ser. No. 16/750,838, titled "METHODS, APPARATUSES, AND SYSTEMS FOR MONITORING AND MAINTAINING VEHICLE CONDITION," filed Jan. 23, 2020, which claims the benefit of U.S. Provisional Application No. 62/795,832, filed Jan. 23, 2019, the contents of which are incorporated herein by reference in their entireties.

TECHNOLOGICAL FIELD

Example embodiments of the present invention relate generally to detection and management of vehicles and, more particularly, to an approach to monitor and maintain a vehicle in an efficient manner based on sensory data and protection policies.

BACKGROUND

Modern vehicles provide indications, such as a check engine light, to users when there are potential malfunctions in a vehicle. However, without sophisticated tools, most users are unable to pinpoint the cause without expensive trips to mechanics. Additionally, many warranties require regular maintenance that can often be forgotten during everyday life. Even with the advancement in technology, most of the responsibility for vehicle repair and maintenance remains on the vehicle owner to notice or understand the malfunctions. Dangerous situations can occur where a user cannot identify a malfunction or declines to repair a malfunction.

The applicant has discovered problems with current methods, systems, and apparatuses for managing network devices. Through applied effort, ingenuity, and innovation, Applicant has solved many of these identified problems by developing a solution that is embodied by the present invention, which is described in detail below.

BRIEF SUMMARY

Embodiments are provided herein of systems, platforms, methods, apparatuses, and computer readable media for improving the accuracy, speed, convenience, and efficiency of vehicle monitoring and tracking as well as associated onboarding, diagnostic, and repair activities. A method, apparatuses, and non-transitory computer-readable storage medium are provided for determining one or more terms of a complete dataset. In an example embodiment, a method, apparatus and non-transitory computer-readable storage medium may be provided that receive partial datasets that are used to determine one or more terms of the complete dataset. In this regard, the method, apparatus, and non-transitory computer-readable storage medium of an example embodiment, may allow for data relating to vehicle protection plans to be collected and aggregated without requiring manual input of a complete dataset. The method, apparatus, and non-transitory computer-readable storage medium of an example embodiment may allow for maintaining vehicle condition.

In an example embodiment, an apparatus is provided that includes at least one processor and at least one non-transitory memory including computer program code instructions, the computer program code instructions configured to, when executed, cause the apparatus to determine one or more terms of a complete dataset. The computer program code instructions may be configured to, when executed, cause the apparatus to receive a partial dataset for a certain type of dataset. The partial dataset may include a partial dataset indicator. The partial dataset indicator may provide an indication of the one or more terms of a complete dataset. The computer program instructions may be further configured to, when executed, cause the apparatus to provide at least one complete dataset indicator. The at least one complete dataset indicator may provide an indication of one or more terms of the complete dataset. The computer program instructions may also be configured to, when executed, cause the apparatus to determine at least one of the one or more terms of the complete dataset based on a comparison of the partial dataset indicator and at least one of the at least one complete dataset indicator. The computer program instructions may be further configured to, when executed, cause the apparatus to cause the transmission of at least one of the one or more determined terms of the complete dataset for use by an application.

In an example embodiment, the complete dataset relates to a vehicle protection plan for a vehicle. In such an embodiment, the one or more terms of the complete dataset may include at least one of a contract start date, a contract end date, a mileage limitation, an original vehicle mileage, or a scope of coverage. In an example embodiment, the computer program computer program instructions may be configured to, when executed, cause the apparatus to receive a signal relating to the vehicle indicating a type of malfunction and determine a remedial measure based on the type of malfunction and at least one of the one or more terms of the complete dataset. In an example embodiment, the determination of the remedial measure may include determining if the type of malfunction is covered by the vehicle protection plan. In some embodiments, the signal may be received from an On-Board Diagnostics receiver connected to the vehicle.

In an example embodiment, the computer program code instructions may be further configured to, when executed, cause the apparatus to receive, from a user, information relating to the complete dataset, wherein the user inputs at least one or more terms of the complete dataset. In some embodiments, the partial dataset may be an insurance policy, a manufacturer warranty, an extended vehicle protection plan, a GAP insurance plan, a tire and wheel coverage plan, or a prepaid maintenance plan. In an example embodiment, the computer program code instructions may be further configured to, when executed, cause the apparatus to receive a plurality of partial dataset indicators for a vehicle, wherein the plurality of partial dataset indicators provide an indication of one or more terms of a plurality of complete datasets.

In an example embodiment, the computer program code instructions are further configured to, when executed, cause the apparatus to cause the transmission of one or more default terms of the complete dataset based on the certain type of dataset. In some embodiments, the computer program code instructions are further configured to, when executed, cause the apparatus to transform the partial dataset indicator using optimal character recognition before comparing the partial dataset indicator and at least one of the at least one complete dataset indicator. In such an embodiment, the transformed partial dataset indicator is used to determine at least one of the one or more terms of the complete dataset.

In another example embodiment, a method is provided for determining one or more terms of a complete dataset. The method may include receiving a partial dataset for a certain type of dataset. The partial dataset may include a partial dataset indicator. The partial dataset indicator may provide an indication of the one or more terms of a complete dataset. The method may include providing at least one complete dataset indicator. The at least one complete dataset indicator may provide an indication of one or more terms of the complete dataset. The method may further include determining at least one of the one or more terms of the complete dataset based on a comparison of the partial dataset indicator and at least one of the at least one complete dataset indicator. The method may still further include causing the transmission of at least one of the one or more determined terms of the complete dataset for use by an application.

In an example embodiment, the complete dataset relates to a vehicle protection plan for a vehicle. In such an embodiment, the one or more terms of the complete dataset includes at least one of a contract start date, a contract end date, a mileage limitation, an original vehicle mileage, or a scope of coverage. In an example embodiment, the method also includes receiving a signal relating to the vehicle indicating a type of malfunction and determine a remedial measure based on the type of malfunction and at least one of the one or more terms of the complete dataset. In an example embodiment, the determination of the remedial measure includes determining if the type of malfunction is covered by the vehicle protection plan. In some embodiments, the signal is received from an On-Board Diagnostics receiver connected to the vehicle.

In an example embodiment, the method also includes receiving, from a user, information relating to the complete dataset, wherein the user inputs at least one or more terms of the complete dataset. In some embodiments, the partial dataset is an insurance policy, a manufacturer warranty, an extended vehicle protection plan, a GAP insurance plan, a tire and wheel coverage plan, or a prepaid maintenance plan. In an example embodiment, the method also includes receiving a plurality of partial dataset indicators for a vehicle, wherein the plurality of partial dataset indicators provide an indication of one or more terms of a plurality of complete datasets.

In an example embodiment, the method also includes receiving the transmission of one or more default terms of the complete dataset based on the certain type of dataset. In some embodiments, the method also includes transforming the partial dataset indicator using optimal character recognition before comparing the partial dataset indicator and at least one of the at least one complete dataset indicator. In such an embodiment, the transformed partial dataset indicator is used to determine at least one of the one or more terms of the complete dataset.

In yet another example embodiment, a non-transitory computer-readable storage medium is provided that includes at least one non-transitory computer-readable storage medium having computer-executable program code portions stored therein with the computer-executable program code portions including program code instructions configured to determine one or more terms of a complete dataset. The computer-executable program code portions may include program code instructions configured to receive a partial dataset for a certain type of dataset. The partial dataset may include a partial dataset indicator. The partial dataset indicator may provide an indication of the one or more terms of a complete dataset. The computer-executable program code portions may also include program code instructions configured to provide at least one complete dataset indicator. The at least one complete dataset indicator provides an indication of one or more terms of the complete dataset. The computer-executable program code portions may further include program code instructions configured to determine at least one of the one or more terms of the complete dataset based on a comparison of the partial dataset indicator and at least one of the at least one complete dataset indicator. The computer-executable program code portions may still further include program code instructions configured to cause the transmission of at least one of the one or more determined terms of the complete dataset for use by an application.

In an example embodiment, the complete dataset relates to a vehicle protection plan for a vehicle. In such an embodiment, the one or more terms of the complete dataset includes at least one of a contract start date, a contract end date, a mileage limitation, an original vehicle mileage, or a scope of coverage. In an example embodiment, the computer code instructions are further configured to receive a signal relating to the vehicle indicating a type of malfunction and determine a remedial measure based on the type of malfunction and at least one of the one or more terms of the complete dataset. In an example embodiment, the determination of the remedial measure includes determining if the type of malfunction is covered by the vehicle protection plan. In some embodiments, the signal may be received from an On-Board Diagnostics receiver connected to the vehicle.

In an example embodiment, the computer code instructions are further configured to receive, from a user, information relating to the complete dataset, wherein the user inputs at least one or more terms of the complete dataset. In some embodiments, the partial dataset is an insurance policy, a manufacturer warranty, an extended vehicle protection plan, a GAP insurance plan, a tire and wheel coverage plan, or a prepaid maintenance plan. In an example embodiment, the computer code instructions are further configured to receive a plurality of partial dataset indicators for a vehicle, wherein the plurality of partial dataset indicators provide an indication of one or more terms of a plurality of complete datasets.

In an example embodiment, the computer code instructions are further configured to cause the transmission of one or more default terms of the complete dataset based on the certain type of dataset. In some embodiments, the computer code instructions are further configured to transform the partial dataset indicator using optimal character recognition before comparing the partial dataset indicator and at least one of the at least one complete dataset indicator. In such an embodiment, the transformed partial dataset indicator is used to determine at least one of the one or more terms of the complete dataset.

In still another example embodiment, an apparatus is provided for determining one or more terms of a complete dataset. The apparatus may include means for receiving a partial dataset for a certain type of dataset. The partial dataset may include a partial dataset indicator. The partial dataset indicator may provide an indication of the one or more terms of a complete dataset. The apparatus may also include means for providing at least one complete dataset indicator. The at least one complete dataset indicator may provide an indication of one or more terms of the complete dataset. The apparatus may further include means for determining at least one of the one or more terms of the complete dataset based on a comparison of the partial dataset indicator and at least one of the at least one complete dataset indicator. The apparatus may still further include means for causing the transmission of at least one of the one or more determined terms of the complete dataset for use by an application.

In an example embodiment, the complete dataset may relate to a vehicle protection plan for a vehicle. In such an embodiment, the one or more terms of the complete dataset may include at least one of a contract start date, a contract end date, a mileage limitation, an original vehicle mileage, or a scope of coverage. In an example embodiment, the apparatus may also include means for receiving a signal relating to the vehicle indicating a type of malfunction and determine a remedial measure based on the type of malfunction and at least one of the one or more terms of the complete dataset. In an example embodiment, the determination of the remedial measure includes determining if the type of malfunction is covered by the vehicle protection plan. In some embodiments, the signal is received from an On-Board Diagnostics receiver connected to the vehicle.

In an example embodiment, the apparatus may also include means for receiving, from a user, information relating to the complete dataset, wherein the user inputs at least one or more terms of the complete dataset. In some embodiments, the partial dataset is an insurance policy, a manufacturer warranty, an extended vehicle protection plan, a GAP insurance plan, a tire and wheel coverage plan, or a prepaid maintenance plan. In an example embodiment, the apparatus also includes means for receiving a plurality of partial dataset indicators for a vehicle, wherein the plurality of partial dataset indicators provide an indication of one or more terms of a plurality of complete datasets.

In an example embodiment, the apparatus also includes means for receiving the transmission of one or more default terms of the complete dataset based on the certain type of dataset. In some embodiments, the apparatus also includes means for transforming the partial dataset indicator using optimal character recognition before comparing the partial dataset indicator and at least one of the at least one complete dataset indicator. In such an embodiment, the transformed partial dataset indicator is used to determine at least one of the one or more terms of the complete dataset.

In an example embodiment, an apparatus is provided that includes at least one processor and at least one non-transitory memory including computer program code instructions, the computer program code instructions configured to, when executed, cause the apparatus to determine a recommended remedial measure for a vehicle malfunction. The computer program code instructions may be configured to, when executed, cause the apparatus to provide at least one term of one or more contracts relating to the vehicle. The computer program code instructions may also be configured to, when executed, cause the apparatus to receive a signal relating to a type of malfunction from a vehicle. The computer program code instructions may further be configured to, when executed, cause the apparatus to determine the recommended remedial measure for the vehicle based on the at least one term and the type of malfunction. In such an embodiment, the recommended remedial measure includes one or more options to remedy the type of malfunction. The computer program code instructions may still further be configured to, when executed, cause the apparatus to cause the transmission of a malfunction indicator to a user. In such an embodiment, the malfunction indicator may be based on at least one of the recommended remedial measure or the type of malfunction.

In another example embodiment, an apparatus is provided for determining a recommended remedial measure for a vehicle malfunction. The apparatus may include means for providing at least one term of one or more contracts relating to the vehicle. The apparatus may also include means for receiving a signal relating to a type of malfunction from a vehicle. The apparatus may further include means for determining the recommended remedial measure for the vehicle based on the at least one term and the type of malfunction. In such an embodiment, the recommended remedial measure may include one or more options to remedy the type of malfunction. The apparatus may still further include means for causing the transmission of a malfunction indicator to a user. In such an embodiment, the malfunction indicator may be based on at least one of the recommended remedial measure or the type of malfunction.

In another example embodiment, a method of flexibly scaling vehicle monitoring system functionality is provided. The method includes receiving vehicle data from an on-board vehicle computing system. The method also includes determining, via a processor, whether the vehicle data includes a vehicle identification data object. The method further includes determining a first operational level from a plurality of operational levels in an instance in which the vehicle data includes a vehicle identification data object. The method still further includes receiving first vehicle data from the on-board vehicle computing system. The method also includes causing rendering of a graphical user interface including one or more first renderable data objects associated with the first operational level. The one or more first renderable data objects are based on the first vehicle data.

In some embodiments, the method also includes causing rendering of an input graphical user interface including a request for input of the vehicle identification data object in an instance in which the vehicle data does not include the vehicle identification data object. In some embodiments, the method also includes receiving the manual input of the vehicle identification data object via the input graphical user interface. In some embodiments, the method also includes in an instance in which the vehicle data does not include the vehicle identification data object, determining a second operational level of the plurality of operational levels, receiving second vehicle data from the on-board vehicle computing system. In such an embodiment, the method further includes causing rendering of a second graphical user interface including one or more second renderable data objects associated with the second operational level with the one or more second renderable data objects are based on the second vehicle data. In some embodiments, the second operational level is defeatured relative to the first operational level.

In some embodiments, determining the first operational level from the plurality of operational levels includes comparing the vehicle identification data object with a predetermined vehicle identification data object associated with a registered account; determining whether the vehicle identification data object matches the predetermined vehicle identification object associated with the registered account; and in an instance in which the vehicle identification data object matches the predetermined vehicle identification object associated with the registered account, retrieving supplemental data associated with the predetermined vehicle identification data object or the registered account, the one or more first renderable data objects are further based on the supplemental data; and in an instance in which the vehicle identification data object does not match the predetermined vehicle identification data object associated with the registered account, the one or more first renderable data objects are not based on the supplemental data. In some embodiments, a vehicle apparatus, including the processor, is in electrical communication with the on-board vehicle computing system, and the registered account is associated with the vehicle apparatus and the predetermined vehicle identification data object.

In some embodiments, a vehicle apparatus, including the processor, is in electrical communication with the on-board vehicle computing system. In some embodiments, the vehicle apparatus is configured to cause the graphical user interface to be rendered on a user mobile device.

In still another example embodiment, a non-transitory computer-readable storage medium is provided for flexibly scaling vehicle monitoring system functionality. The non-transitory computer-readable storage medium includes at least one non-transitory computer-readable storage medium having computer program code stored thereon, the computer program code configured, in execution with at least one processor, to receive vehicle data from an on-board vehicle computing system. The computer program code is also configured, in execution with at least one processor, to determine, via a processor, whether the vehicle data includes a vehicle identification data object. The computer program code is further configured, in execution with at least one processor, to determine a first operational level from a plurality of operational levels in an instance in which the vehicle data includes a vehicle identification data object. The computer program code is still further configured, in execution with at least one processor, to receive first vehicle data from the on-board vehicle computing system. The computer program code is also configured, in execution with at least one processor, to cause rendering of a graphical user interface including one or more first renderable data objects associated with the first operational level. The one or more first renderable data objects are based on the first vehicle data.

In some embodiments, in an instance in which the vehicle data does not include the vehicle identification data object, the computer program code is configured to cause rendering of an input graphical user interface including a request for input of the vehicle identification data object. In some embodiments, the computer program code is further configured to receive the manual input of the vehicle identification data object via the input graphical user interface. In some embodiments, in an instance in which the vehicle data does not include the vehicle identification data object, the computer program code is configured to determine a second operational level of the plurality of operational levels, receiving second vehicle data from the on-board vehicle computing system. In such an embodiment, the computer program code is also configured to cause rendering of a second graphical user interface including one or more second renderable data objects associated with the second operational level with one or more second renderable data objects are based on the second vehicle data. In some embodiments, the second operational level is defeatured relative to the first operational level.

In some embodiments, determining the first operational level from the plurality of operational levels includes comparing the vehicle identification data object with a predetermined vehicle identification data object associated with a registered account; determining whether the vehicle identification data object matches the predetermined vehicle identification object associated with the registered account; in an instance in which the vehicle identification data object matches the predetermined vehicle identification object associated with the registered account, retrieving supplemental data associated with the predetermined vehicle identification data object or the registered account, the one or more first renderable data objects are further based on the supplemental data; and in an instance in which the vehicle identification data object does not match the predetermined vehicle identification data object associated with the registered account, the one or more first renderable data objects are not based on the supplemental data.

In some embodiments, a vehicle apparatus, including the processor, is in electrical communication with the on-board vehicle computing system and the registered account is associated with the vehicle apparatus and the predetermined vehicle identification data object. In some embodiments, a vehicle apparatus, including the processor, is in electrical communication with the on-board vehicle computing system. In some embodiments, the vehicle apparatus is configured to cause the graphical user interface to be rendered on a user mobile device.

In still another example embodiment, an apparatus for flexibly scaling vehicle monitoring system functionality is provided. The apparatus including at least one processor and at least one non-transitory memory, the at least one non-transitory memory having computer-coded instructions stored thereon, wherein the computer-coded instructions, in execution with the at least one processor, configure the apparatus to receive vehicle data from an on-board vehicle computing system. The computer-coded instructions, in execution with the at least one processor, also configure the apparatus to determine whether the vehicle data includes a vehicle identification data object. The computer-coded instructions, in execution with the at least one processor, further configure the apparatus to determine a first operational level from a plurality of operational levels in an instance in which the vehicle data includes a vehicle identification data object. The computer-coded instructions, in execution with the at least one processor, still further configure the apparatus to receive first vehicle data from the on-board vehicle computing system. The computer-coded instructions, in execution with the at least one processor, also configure the apparatus to cause rendering of a graphical user interface including one or more first renderable data objects associated with the first operational level. The one or more first renderable data objects are based on the first vehicle data.

In some embodiments, the computer-coded instructions, in execution with the at least one processor, configure the apparatus to cause rendering of an input graphical user interface including a request for input of the vehicle identification data object in an instance in which the vehicle data does not include the vehicle identification data object. In some embodiments, the computer-coded instructions, in execution with the at least one processor, further configure the apparatus to receive the manual input of the vehicle identification data object via the input graphical user interface. In some embodiments, in an instance in which the vehicle data does not include the vehicle identification data object, the computer-coded instructions, in execution with the at least one processor, configure the apparatus to determine a second operational level of the plurality of operational levels, receiving second vehicle data from the on-board vehicle computing system and cause rendering of a second graphical user interface including one or more second renderable data objects associated with the second operational level. In such an embodiment, the one or more second renderable data objects are based on the second vehicle data. In some embodiments, the second operational level is defeatured relative to the first operational level.

In some embodiments, determining the first operational level from the plurality of operational levels includes comparing the vehicle identification data object with a predetermined vehicle identification data object associated with a registered account; determining whether the vehicle identification data object matches the predetermined vehicle identification object associated with the registered account; in an instance in which the vehicle identification data object matches the predetermined vehicle identification object associated with the registered account, retrieving supplemental data associated with the predetermined vehicle identification data object or the registered account, the one or more first renderable data objects are further based on the supplemental data; and in an instance in which the vehicle identification data object does not match the predetermined vehicle identification data object associated with the registered account, the one or more first renderable data objects are not based on the supplemental data.

In some embodiments, a vehicle apparatus, including the processor, is in electrical communication with the on-board vehicle computing system and the registered account is associated with the vehicle apparatus and the predetermined vehicle identification data object. In some embodiments, a vehicle apparatus, including the processor, is in electrical communication with the on-board vehicle computing system. In some embodiments, the vehicle apparatus is configured to cause the graphical user interface to be rendered on a user mobile device.

In another example embodiment, a method of providing vehicle diagnostics and maintenance is provided. The method includes receiving vehicle data from an on-board vehicle computing system on a first vehicle. The method also includes generating a vehicle diagnostic data object based on the vehicle data. The vehicle diagnostic data object includes one or more maintenance actions associated with the first vehicle. The method further includes associating, via a processor, the vehicle diagnostic data object and one or more provider incentive data objects to generate a maintenance offer associated with the first vehicle. The method still further includes causing rendering of a graphical user interface including one or more first renderable data objects associated with the maintenance offer.

In some embodiments, generating the vehicle diagnostic data object includes generating a trained model based on one or more aggregated vehicle data sets including second vehicle data from each of a plurality of vehicles and inputting at least a portion of the vehicle data into the trained model to generate the vehicle diagnostic data object. In some embodiments, the trained model is trained using the one or more aggregated vehicle data sets including historical maintenance data associated with the plurality of vehicles.

In some embodiments, the method also includes retrieving the aggregated vehicle data sets from an insurance claim database. In some embodiments, the plurality of vehicles include at least two different makes of vehicle. In some embodiments, the method also includes receiving diagnostic trigger indication with the indication being based on at least one of a diagnostic trigger event or a user input; and causing at least the rendering of the graphical user interface based on the indication.

In some embodiments, the method also includes generating the one or more provider incentive data objects based on provider offering data. In some embodiments, the provider offering data includes metadata associated with the provider, including one or more of provider location, provider time of operation, and provider service offerings. In some embodiments, the vehicle diagnostic data object includes metadata associated with the first vehicle, and the associating the vehicle diagnostic data object and the one or more provider incentive data objects includes comparing the metadata associated with the first vehicle and the metadata associated with the provider. In some embodiments, the metadata associated with the first vehicle includes a vehicle location received from the first vehicle with the metadata associated with the provider includes the provider location. In such an embodiment, comparing the metadata associated with the first vehicle and the metadata associated with the provider includes determining that the vehicle location and the provider location are within a threshold distance of each other. In some embodiments, the provider offering data includes one or more provider incentives, and associating the vehicle diagnostic data object and the one or more provider incentive data objects includes matching the one or more provider incentives with the vehicle diagnostic data object.

In some embodiments, the method also includes updating the graphical user interface to display second renderable data objects associated with scheduling data, and transmitting the scheduling data to a first provider based on an acceptance of the maintenance offer the user. In some embodiments, the vehicle diagnostic data object includes data indicative of at least one potential fault with the first vehicle based on the vehicle data. In some embodiments, the at least one potential fault is predicted to occur but has not yet occurred with the first vehicle.

In some embodiments, the one or more provider incentive data objects are associated with the vehicle diagnostic data object based on at least one triggering event detected in the vehicle diagnostic data object or vehicle data. In some embodiments, the at least one triggering event includes at least one fault detected by a sensor on the first vehicle. In some embodiments, the at least one triggering event includes at least one potential fault with the first vehicle. In such an embodiment, the at least one potential fault is predicted based on a trained model generated based on one or more aggregated vehicle data sets including second vehicle data from each of a plurality of vehicles.

In some embodiments, the one or more provider incentive data objects are agnostic of the vehicle diagnostic data object. In some embodiments, the one or more provider incentive data objects are based on metadata associated with the first vehicle. In some embodiments, the vehicle diagnostic data object is generated by retrieving third-party maintenance data associated with the first vehicle and comparing the third-party maintenance data with the vehicle data. In some embodiments, the one or more provider incentive data objects are stored in association with a user profile associated with the first vehicle, such that generating the maintenance offer includes comparing the stored one or more provider incentive data objects with the vehicle diagnostic data object.

In still another example embodiment, a non-transitory computer-readable storage medium is provided for providing vehicle diagnostics and maintenance. The non-transitory computer-readable storage medium includes at least one non-transitory computer-readable storage medium having computer program code stored thereon, the computer program code configured, in execution with at least one processor, to receive vehicle data from an on-board vehicle computing system on a first vehicle. The computer program code is also configured, in execution with at least one processor, to generate a vehicle diagnostic data object based on the vehicle data. The vehicle diagnostic data object includes one or more maintenance actions associated with the first vehicle. The computer program code is further configured, in execution with at least one processor, to associate the vehicle diagnostic data object and one or more provider incentive data objects to generate a maintenance offer associated with the first vehicle. The computer program code is still further configured, in execution with at least one processor, to cause rendering of a graphical user interface including one or more first renderable data objects associated with the maintenance offer.

In some embodiments, generating the vehicle diagnostic data object includes generating a trained model based on one or more aggregated vehicle data sets including second vehicle data from each of a plurality of vehicles; and inputting at least a portion of the vehicle data into the trained model to generate the vehicle diagnostic data object. In some embodiments, the trained model is trained using the one or more aggregated vehicle data sets including historical maintenance data associated with the plurality of vehicles. In some embodiments, the computer program code is further configured to retrieve the aggregated vehicle data sets from an insurance claim database. In some embodiments, the plurality of vehicles include at least two different makes of vehicle. In some embodiments, the computer program code is further configured to receive diagnostic trigger indication, wherein the indication is based on at least one of a diagnostic trigger event or a user input; and cause at least the rendering of the graphical user interface based on the indication.

In some embodiments, the computer program code is further configured to generate the one or more provider incentive data objects based on provider offering data. In some embodiments, the provider offering data includes metadata associated with the provider, including one or more of provider location, provider time of operation, and provider service offerings. In some embodiments, the vehicle diagnostic data object includes metadata associated with the first vehicle, and associating the vehicle diagnostic data object and the one or more provider incentive data objects includes comparing the metadata associated with the first vehicle and the metadata associated with the provider. In some embodiments, the metadata associated with the first vehicle includes a vehicle location received from the first vehicle. In such an embodiment, the metadata associated with the provider includes the provider location, and comparing the metadata associated with the first vehicle and the metadata associated with the provider includes determining that the vehicle location and the provider location are within a threshold distance of each other. In some embodiments, the provider offering data includes one or more provider incentives, and associating the vehicle diagnostic data object and the one or more provider incentive data objects includes matching the one or more provider incentives with the vehicle diagnostic data object.

In some embodiments, the computer program code is further configured to update the graphical user interface to display second renderable data objects associated with scheduling data, and transmit the scheduling data to a first provider based on an acceptance of the maintenance offer the user. In some embodiments, the vehicle diagnostic data object includes data indicative of at least one potential fault with the first vehicle based on the vehicle data. In some embodiments, the at least one potential fault is predicted to occur but has not yet occurred with the first vehicle. In some embodiments, the one or more provider incentive data objects are associated with the vehicle diagnostic data object based on at least one triggering event detected in the vehicle diagnostic data object or vehicle data. In some embodiments, the at least one triggering event includes at least one fault detected by a sensor on the first vehicle. In some embodiments, the at least one triggering event includes at least one potential fault with the first vehicle. In such an embodiment, the at least one potential fault is predicted based on a trained model generated based on one or more aggregated vehicle data sets including second vehicle data from each of a plurality of vehicles.

In some embodiments, the one or more provider incentive data objects are agnostic of the vehicle diagnostic data object. In some embodiments, the one or more provider incentive data objects are based on metadata associated with the first vehicle. In some embodiments, the vehicle diagnostic data object is generated by retrieving third-party maintenance data associated with the first vehicle and comparing the third-party maintenance data with the vehicle data. In some embodiments, the one or more provider incentive data objects are stored in association with a user profile associated with the first vehicle, such that generating the maintenance offer includes comparing the stored one or more provider incentive data objects with the vehicle diagnostic data object.

In yet another example embodiment, an apparatus is provided for providing vehicle diagnostics and maintenance. The apparatus including at least one processor and at least one non-transitory memory, the at least one non-transitory memory having computer-coded instructions stored thereon, wherein the computer-coded instructions, in execution with the at least one processor, configure the apparatus to receive vehicle data from an on-board vehicle computing system on a first vehicle. The computer-coded instructions, in execution with the at least one processor, also configure the apparatus to generate a vehicle diagnostic data object based on the vehicle data. The vehicle diagnostic data object includes one or more maintenance actions associated with the first vehicle. The computer-coded instructions, in execution with the at least one processor, further configure the apparatus to associate the vehicle diagnostic data object and one or more provider incentive data objects to generate a maintenance offer associated with the first vehicle. The computer-coded instructions, in execution with the at least one processor, still further configure the apparatus to cause rendering of a graphical user interface including one or more first renderable data objects associated with the maintenance offer.

In some embodiments, generating the vehicle diagnostic data object includes generating a trained model based on one or more aggregated vehicle data sets including second vehicle data from each of a plurality of vehicles; and inputting at least a portion of the vehicle data into the trained model to generate the vehicle diagnostic data object. In some embodiments, the trained model is trained using the one or more aggregated vehicle data sets including historical maintenance data associated with the plurality of vehicles. In some embodiments, the computer-coded instructions further configure the apparatus to retrieve the aggregated vehicle data sets from an insurance claim database. In some embodiments, the plurality of vehicles include at least two different makes of vehicle.

In some embodiments, the computer-coded instructions further configure the apparatus to receive diagnostic trigger indication with the indication is based on at least one of a diagnostic trigger event or a user input; and cause at least the rendering of the graphical user interface based on the indication. In some embodiments, the computer-coded instructions further configure the apparatus to generate the one or more provider incentive data objects based on provider offering data. In some embodiments, the provider offering data includes metadata associated with the provider, including one or more of provider location, provider time of operation, and provider service offerings. In some embodiments, the vehicle diagnostic data object includes metadata associated with the first vehicle, and associating the vehicle diagnostic data object and the one or more provider incentive data objects includes comparing the metadata associated with the first vehicle and the metadata associated with the provider. In some embodiments, the metadata associated with the first vehicle includes a vehicle location received from the first vehicle. In such an embodiment, the metadata associated with the provider includes the provider location, and comparing the metadata associated with the first vehicle and the metadata associated with the provider includes determining that the vehicle location and the provider location are within a threshold distance of each other.

In some embodiments, the provider offering data includes one or more provider incentives, and associating the vehicle diagnostic data object and the one or more provider incentive data objects includes matching the one or more provider incentives with the vehicle diagnostic data object. In some embodiments, the computer-coded instructions further configure the apparatus to update the graphical user interface to display second renderable data objects associated with scheduling data, and transmit the scheduling data to a first provider based on an acceptance of the maintenance offer the user.

In some embodiments, the vehicle diagnostic data object includes data indicative of at least one potential fault with the first vehicle based on the vehicle data. In some embodiments, the at least one potential fault is predicted to occur but has not yet occurred with the first vehicle. In some embodiments, the one or more provider incentive data objects are associated with the vehicle diagnostic data object based on at least one triggering event detected in the vehicle diagnostic data object or vehicle data. In some embodiments, the at least one triggering event includes at least one fault detected by a sensor on the first vehicle. In some embodiments, the at least one triggering event includes at least one potential fault with the first vehicle. In such an embodiment, the at least one potential fault is predicted based on a trained model generated based on one or more aggregated vehicle data sets including second vehicle data from each of a plurality of vehicles.

In some embodiments, the one or more provider incentive data objects are agnostic of the vehicle diagnostic data object. In some embodiments, the one or more provider incentive data objects are based on metadata associated with the first vehicle. In some embodiments, the vehicle diagnostic data object is generated by retrieving third-party maintenance data associated with the first vehicle and comparing the third-party maintenance data with the vehicle data. In some embodiments, the one or more provider incentive data objects are stored in association with a user profile associated with the first vehicle, such that generating the maintenance offer includes comparing the stored one or more provider incentive data objects with the vehicle diagnostic data object.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
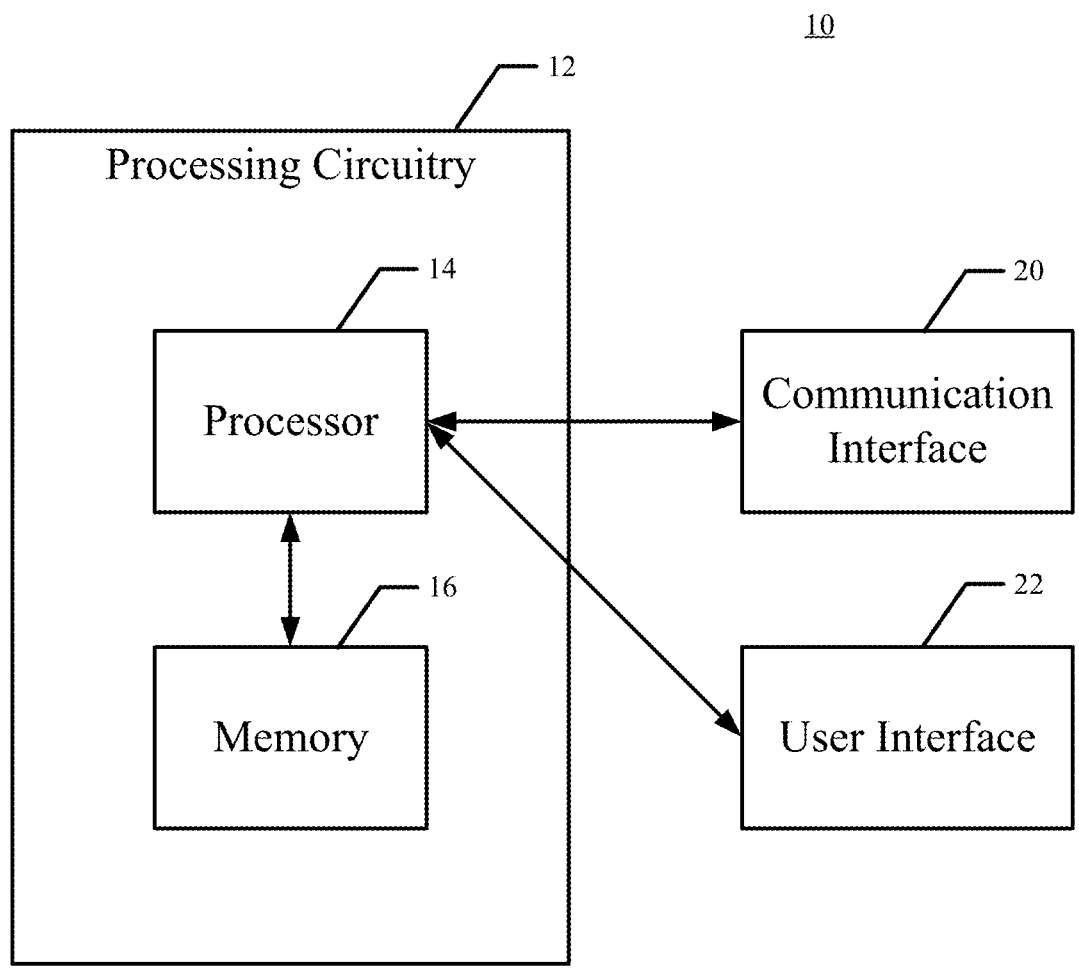
Figure 2:
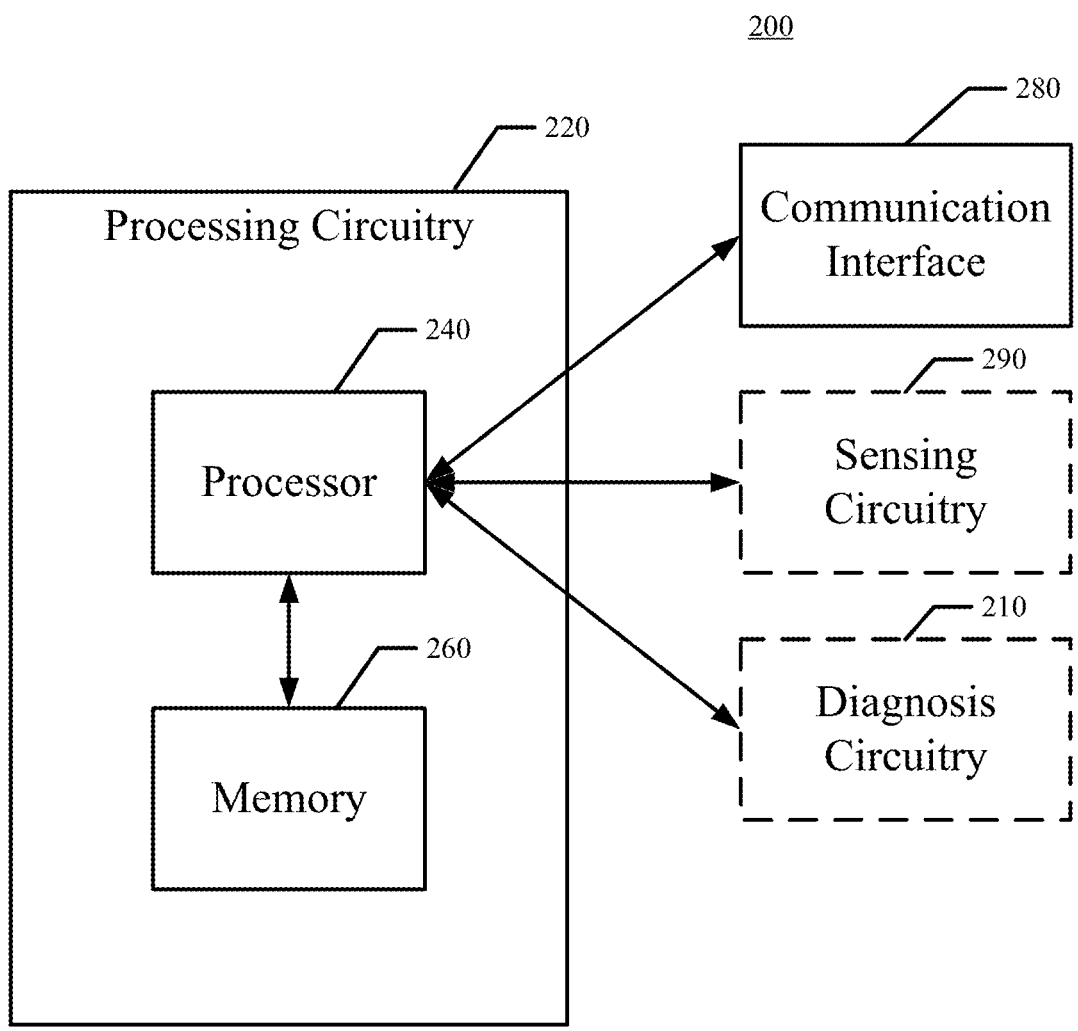
Figure 3:
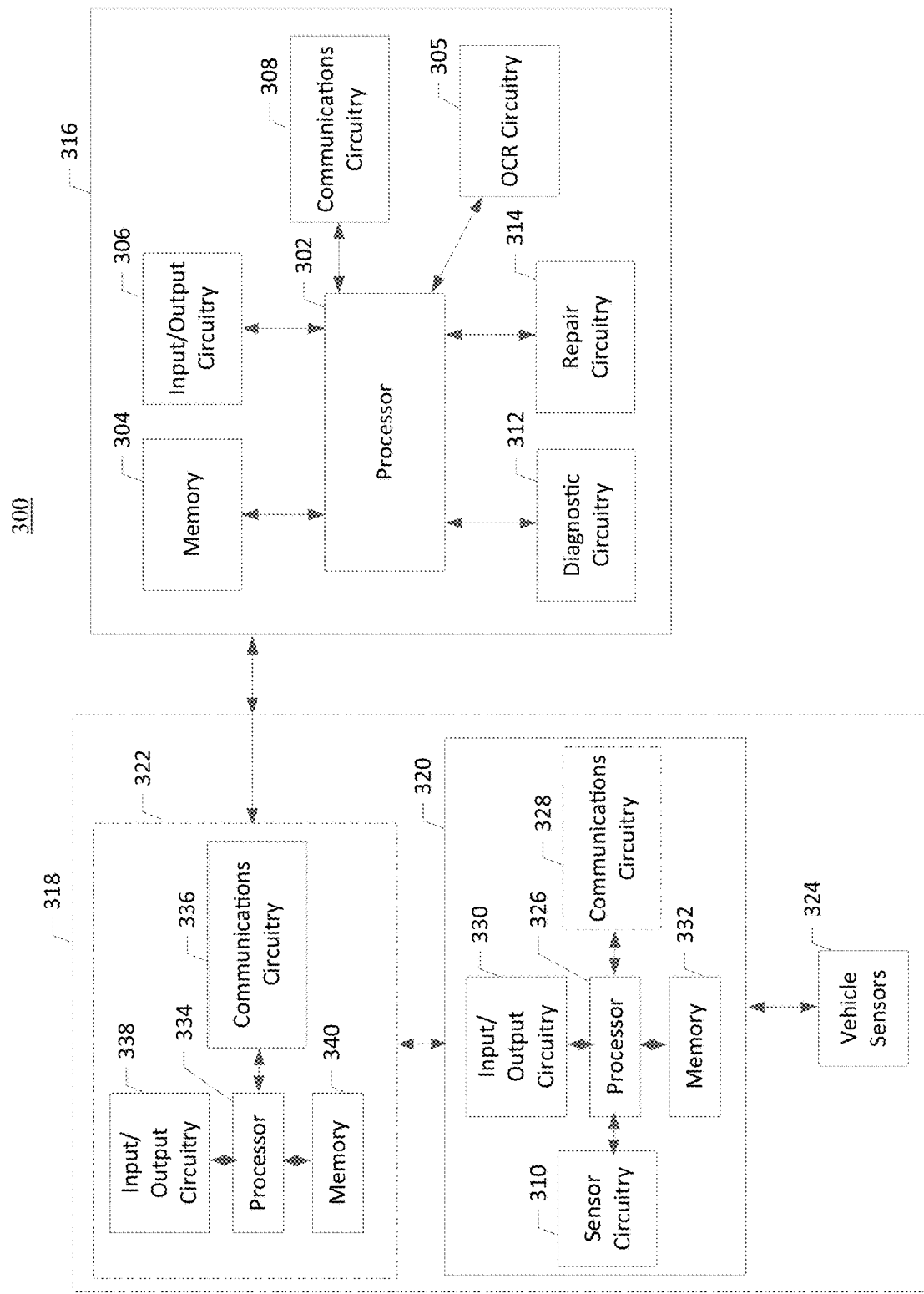
Figure 4:
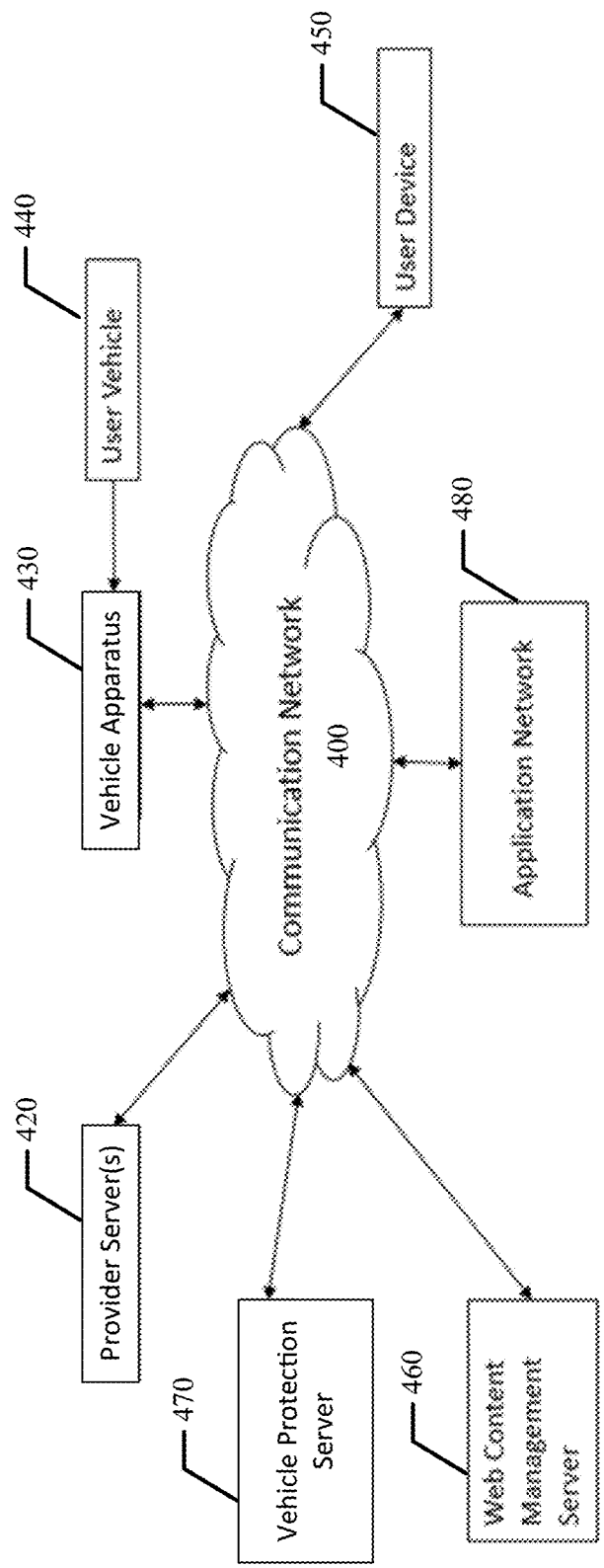
Figure 5:
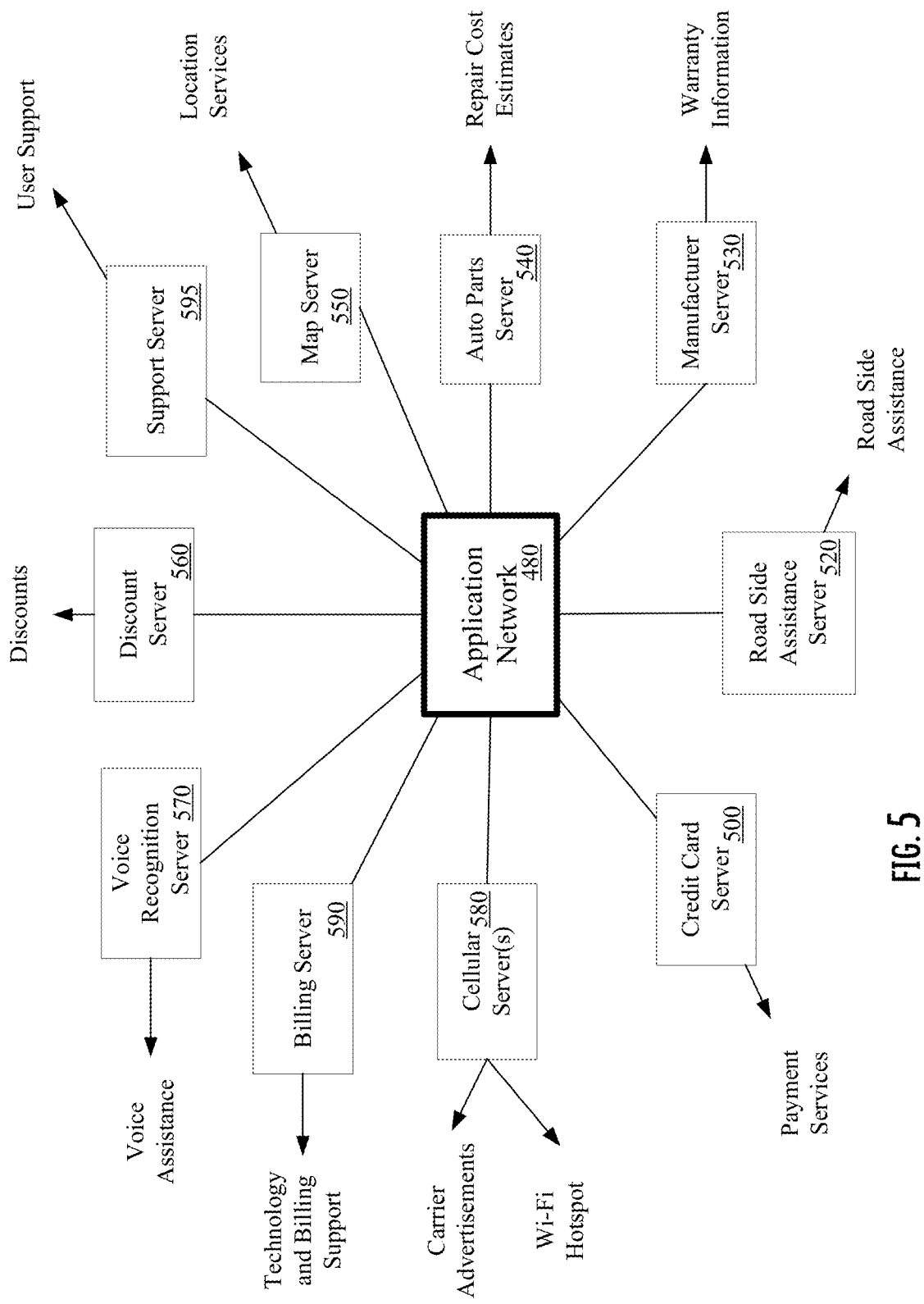
Figure 6:
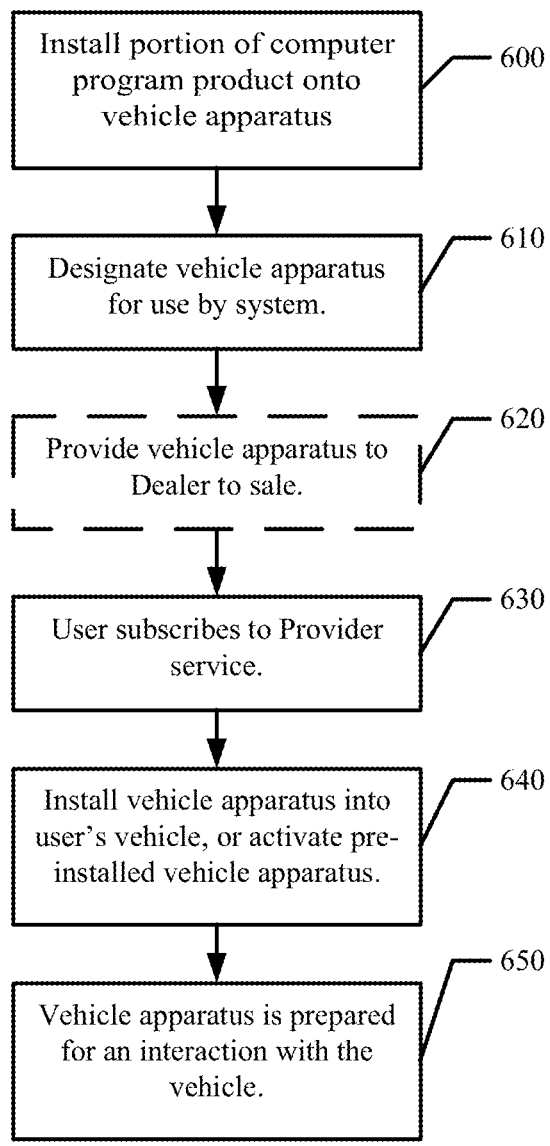
Figure 7:
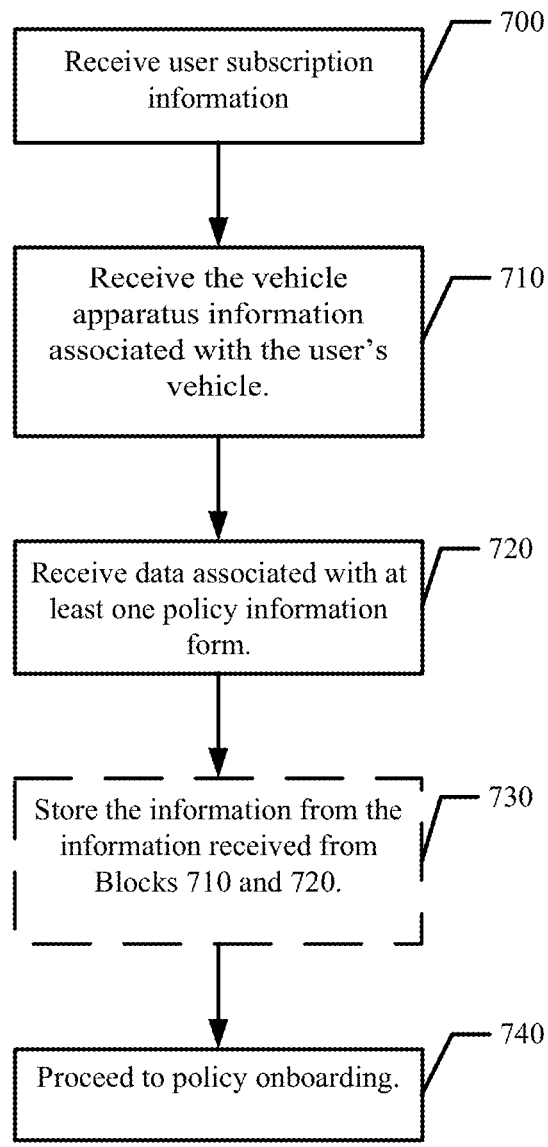
Figure 8:
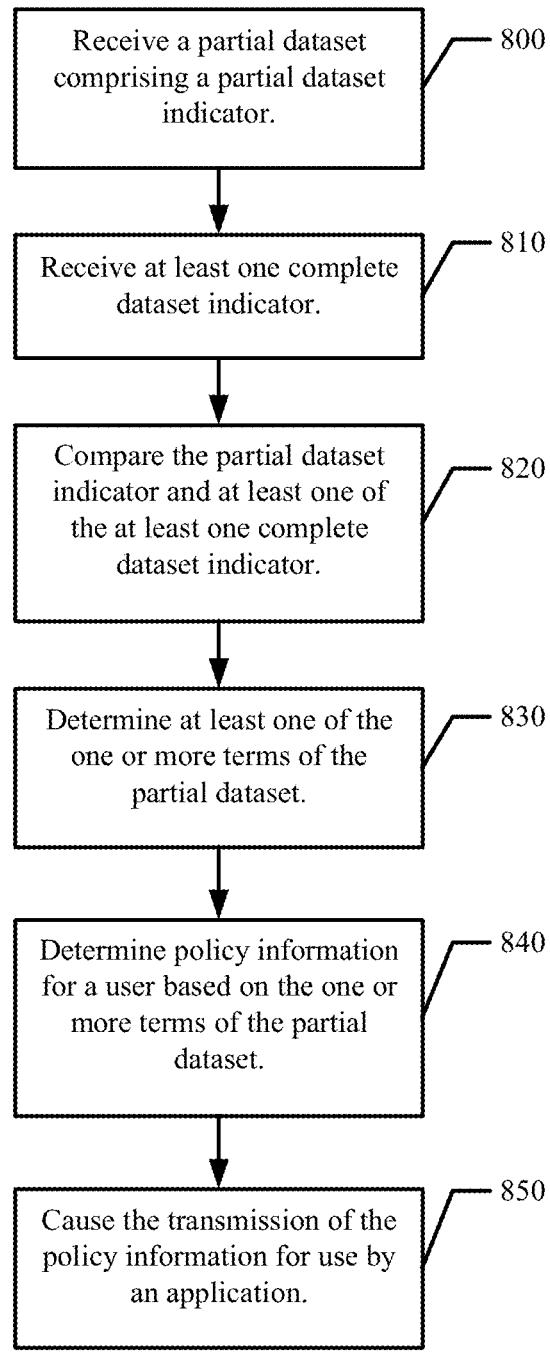
Figure 9:
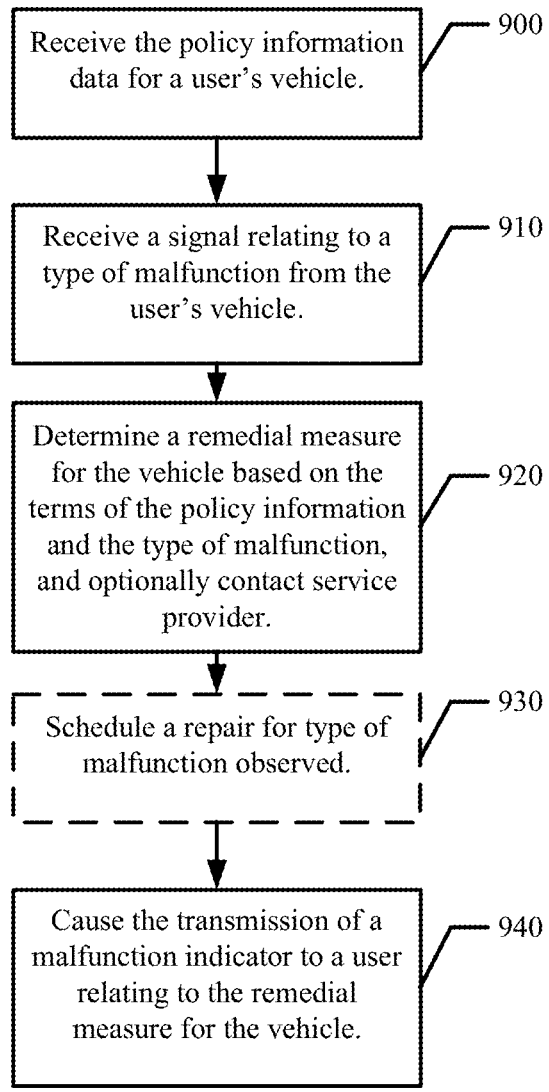
Figure 10:
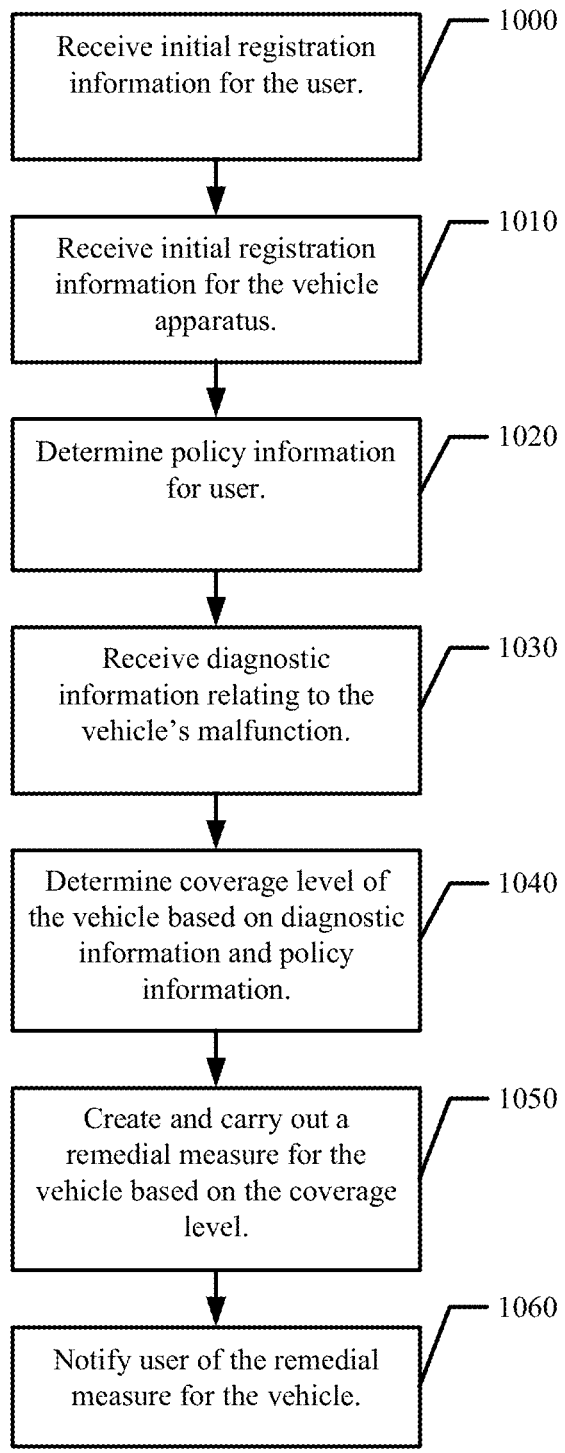
Figure 11A:
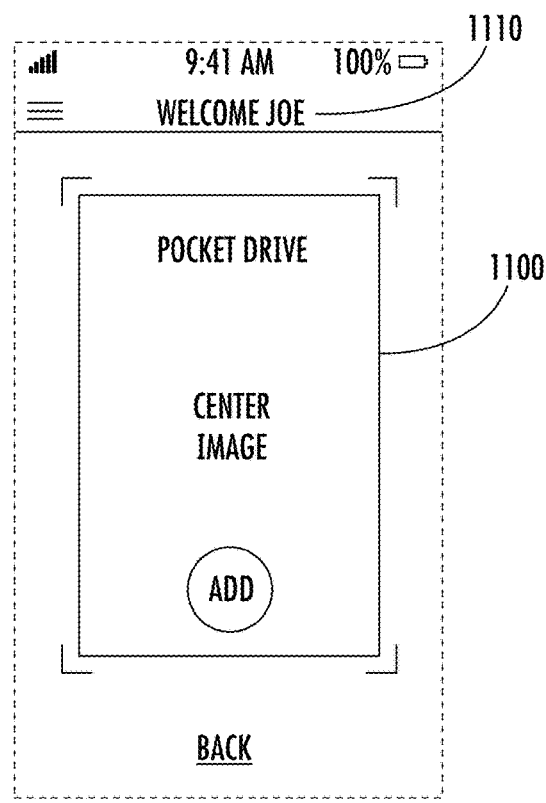
Figure 11B:
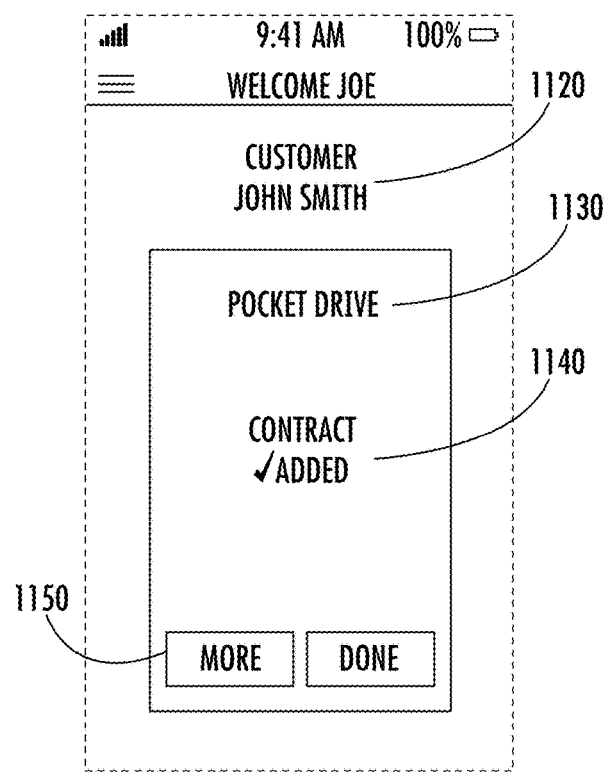
Figure 12A:
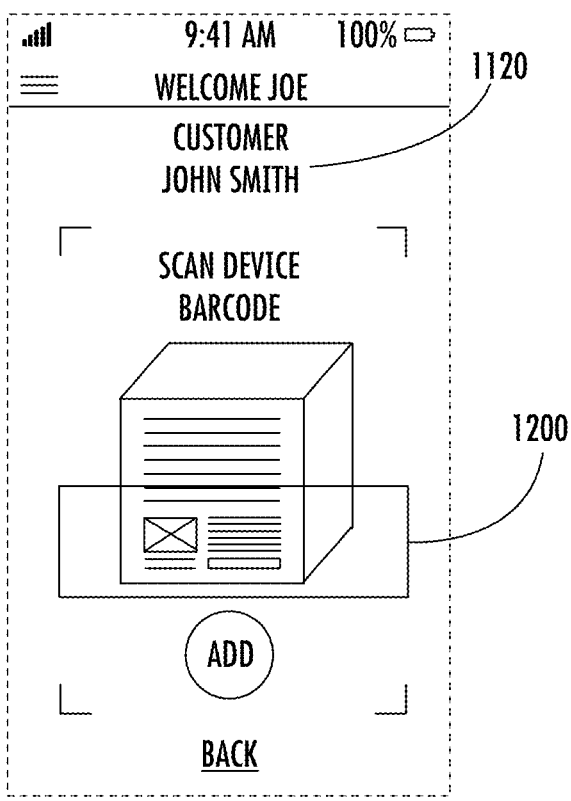
Figure 12B:
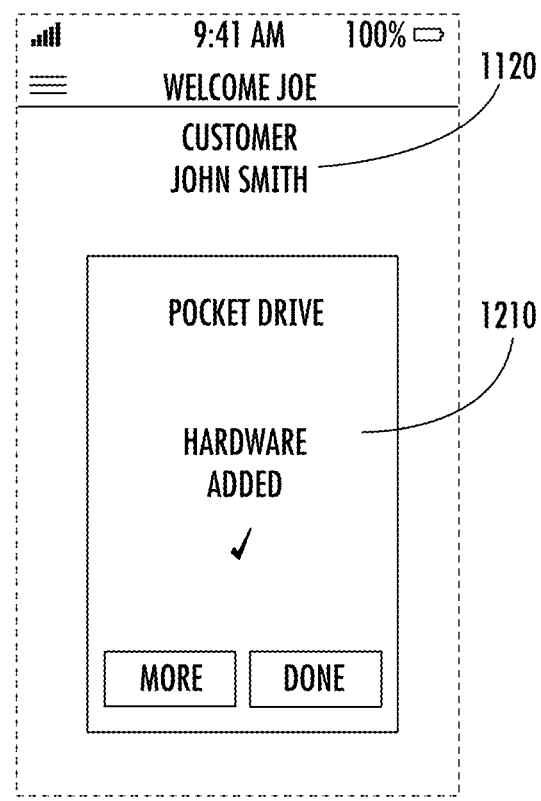
Figure 13:
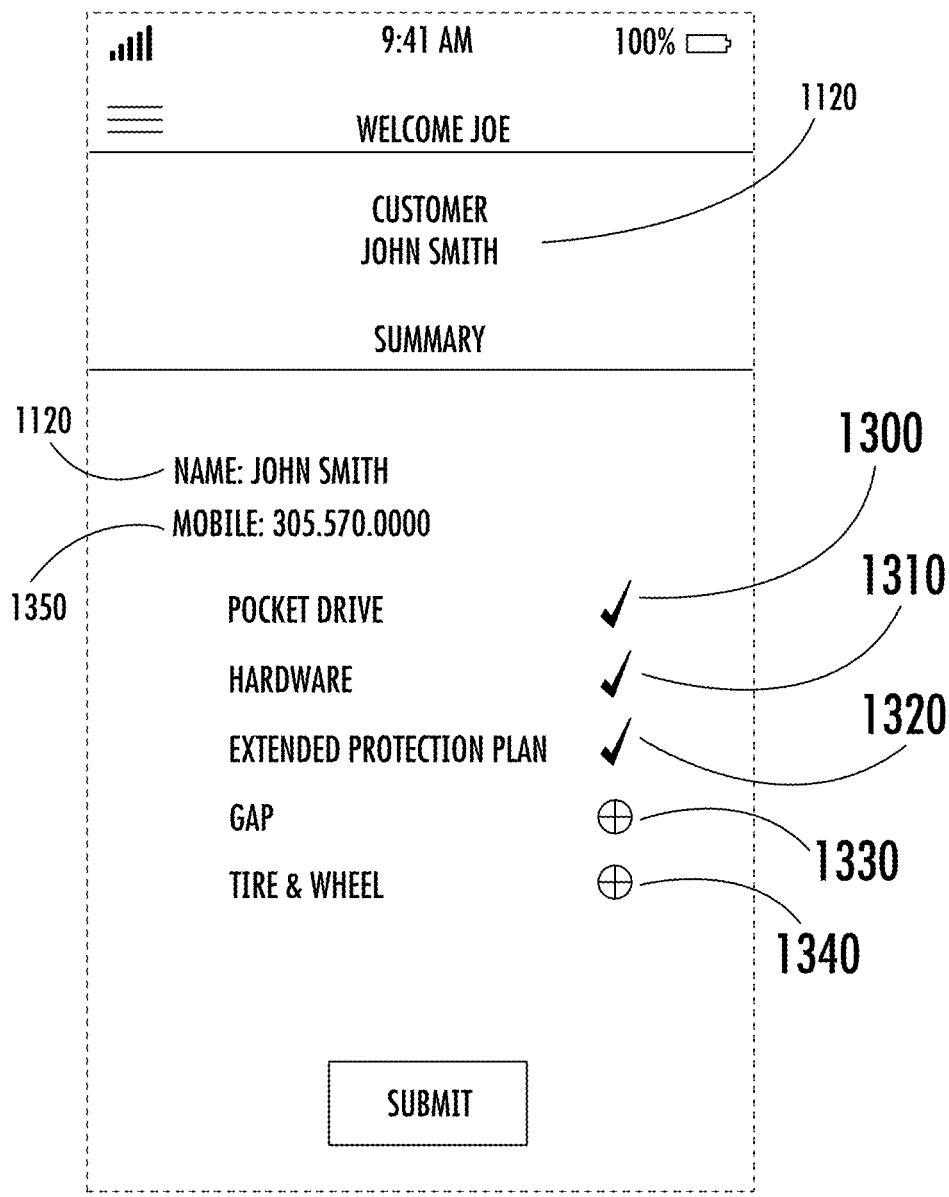
Figure 14:
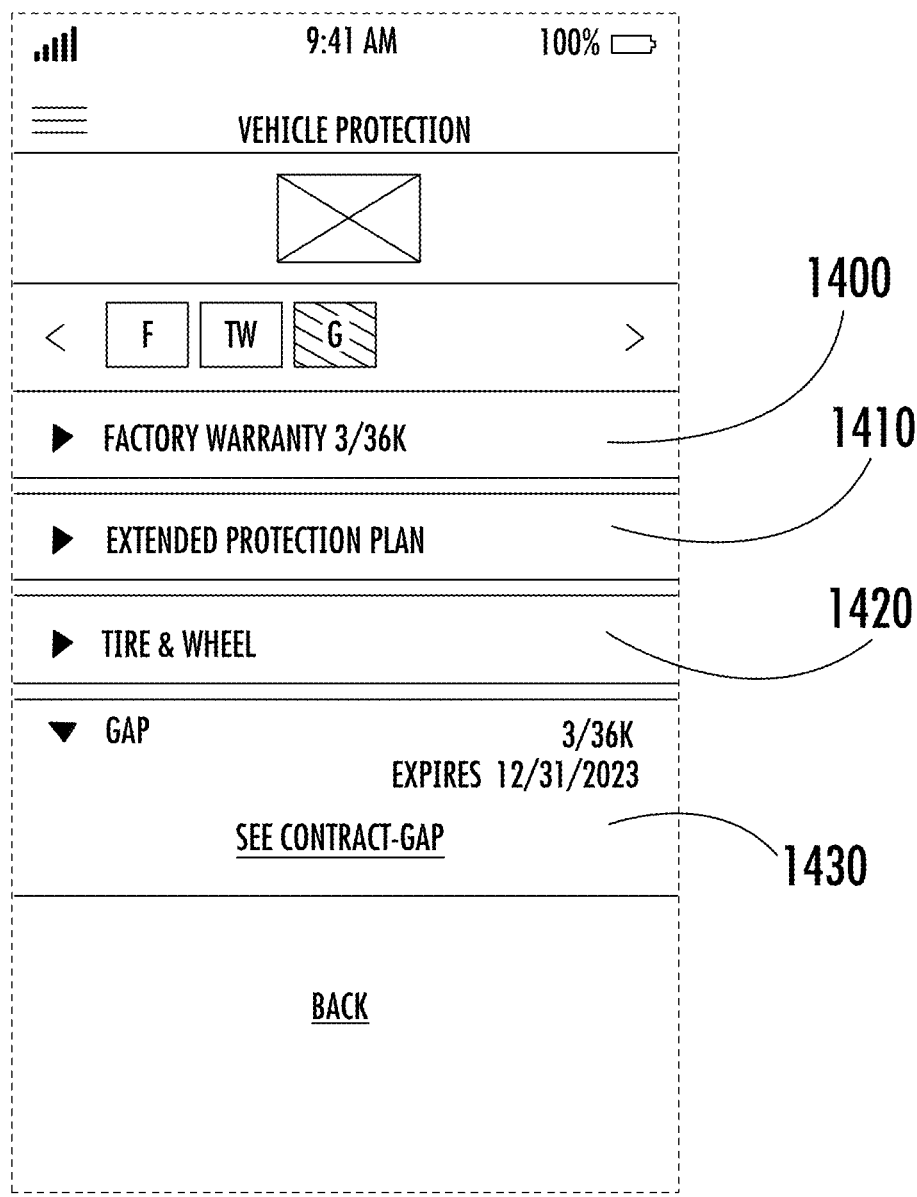
Figure 15:
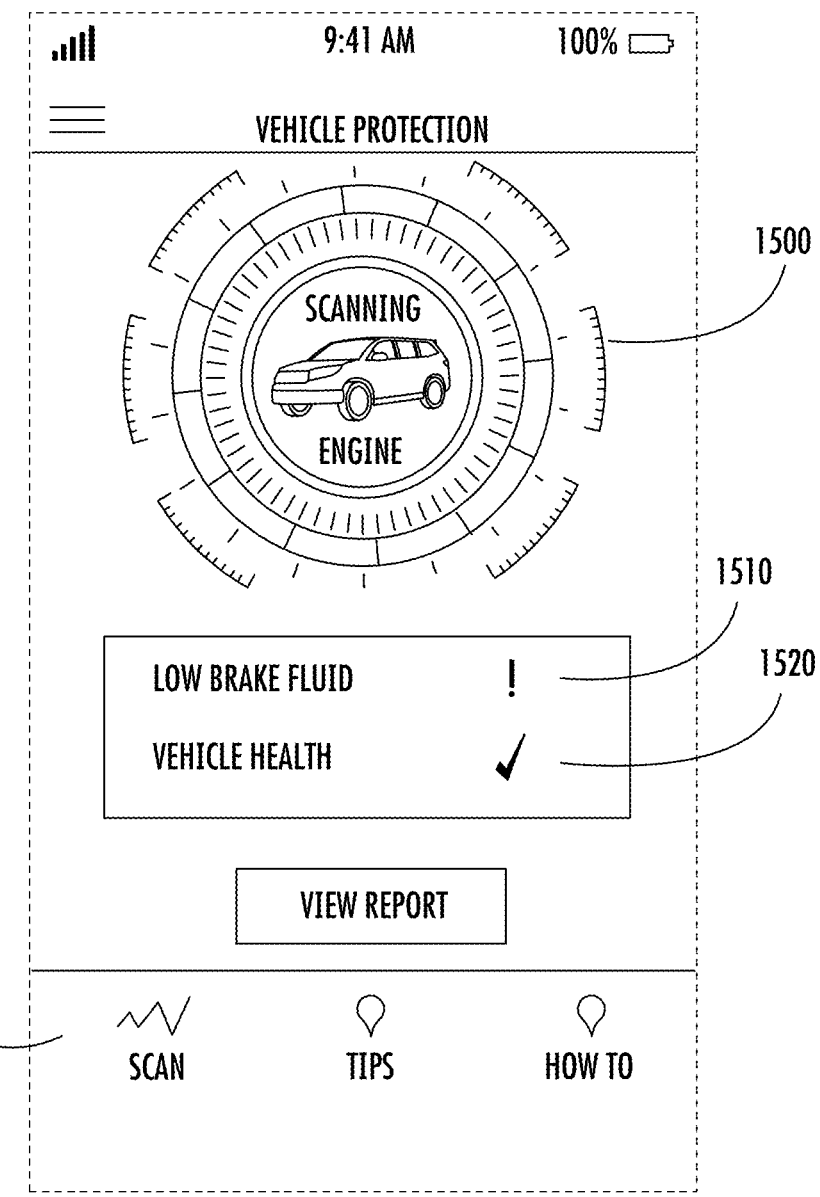
Figure 16:
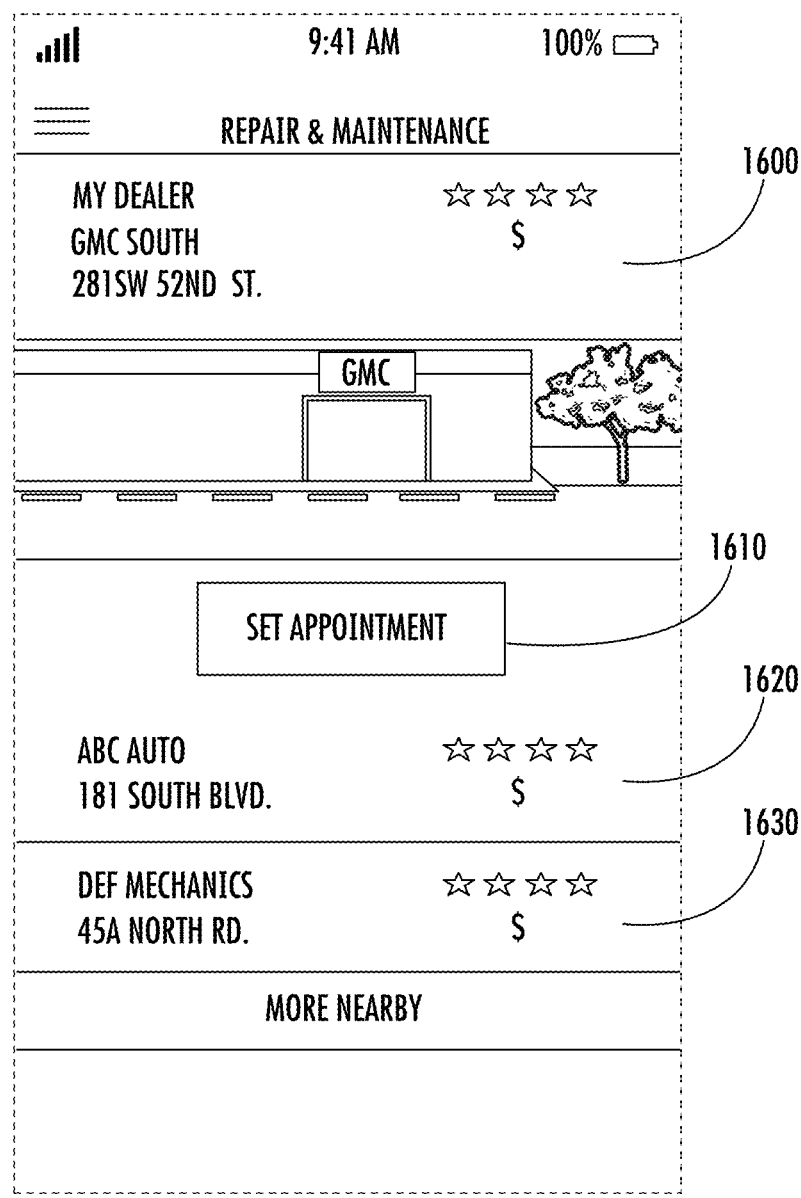
Figure 17A:
Figure 17B:
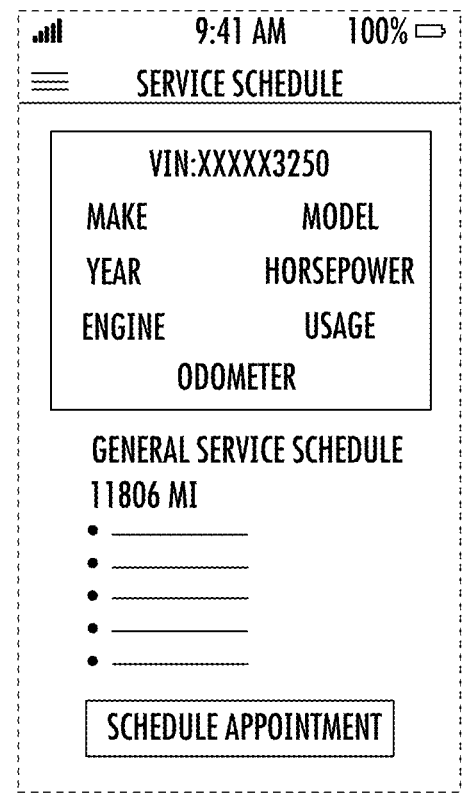
Figure 18:
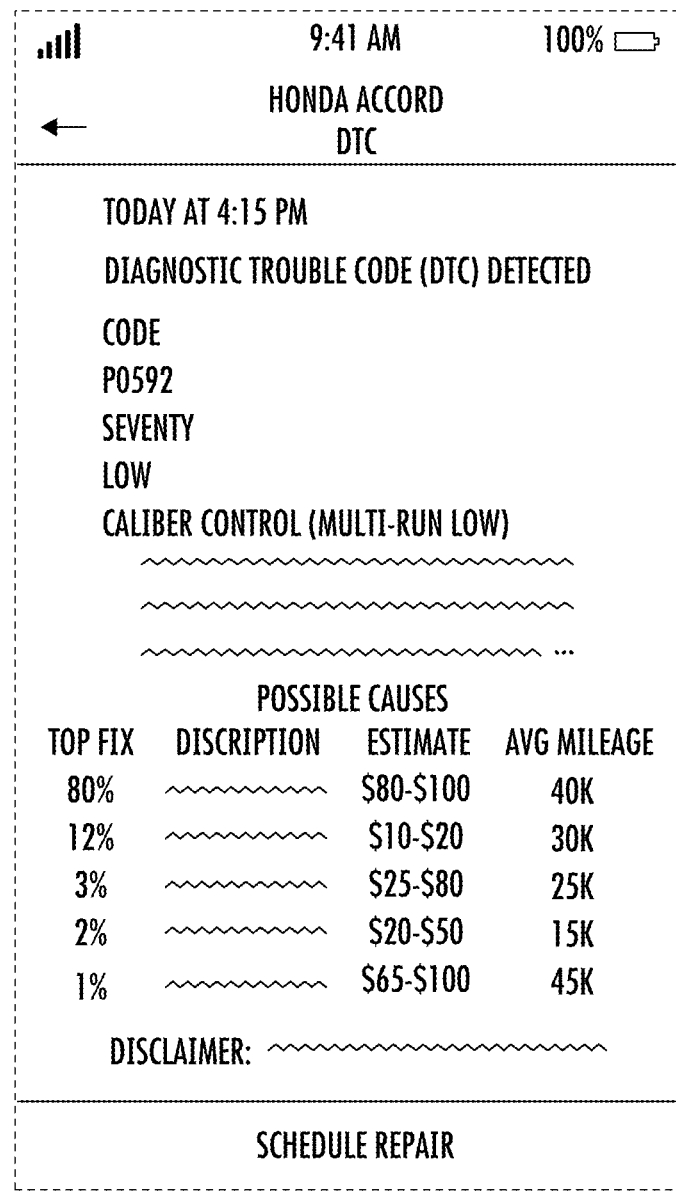
Figure 19:
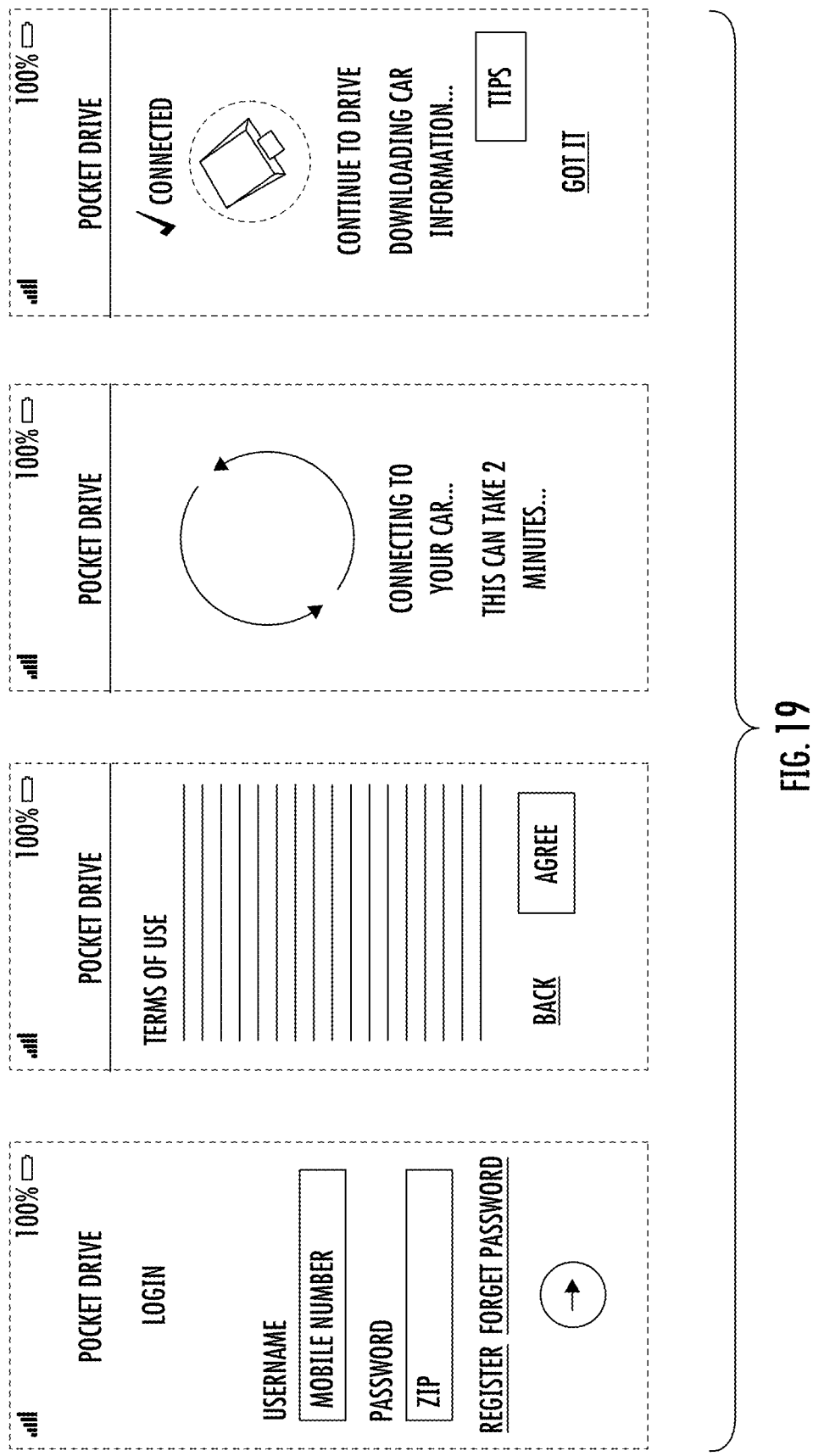
Figure 20:
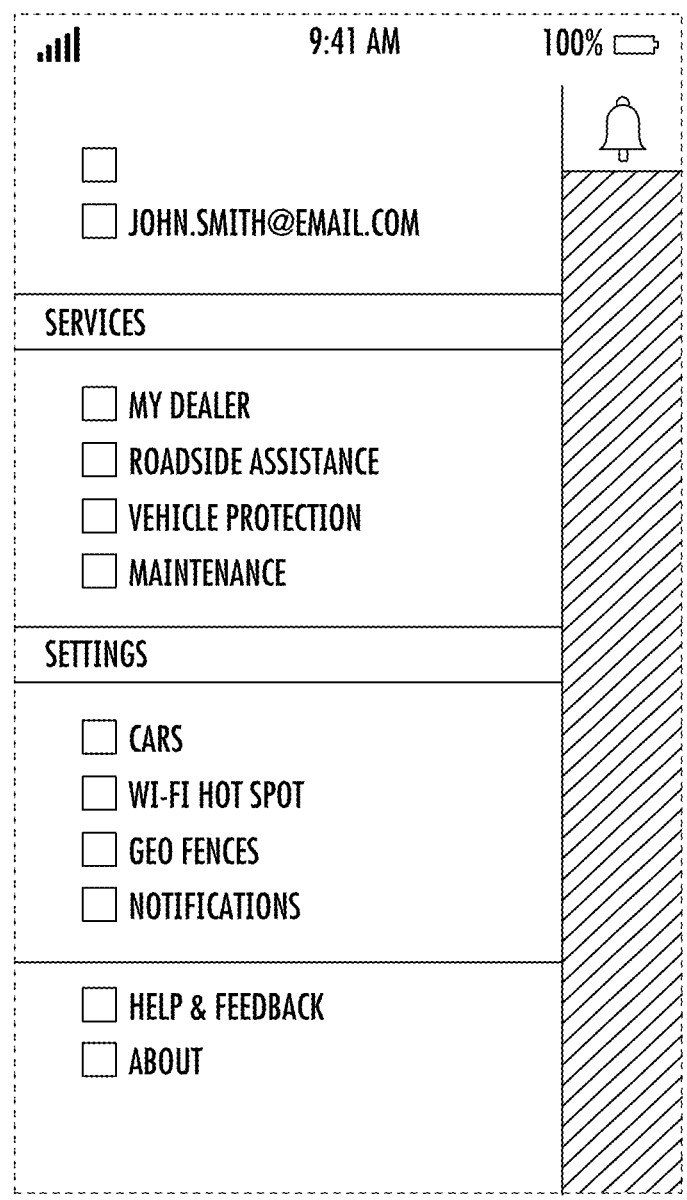
Figure 21:
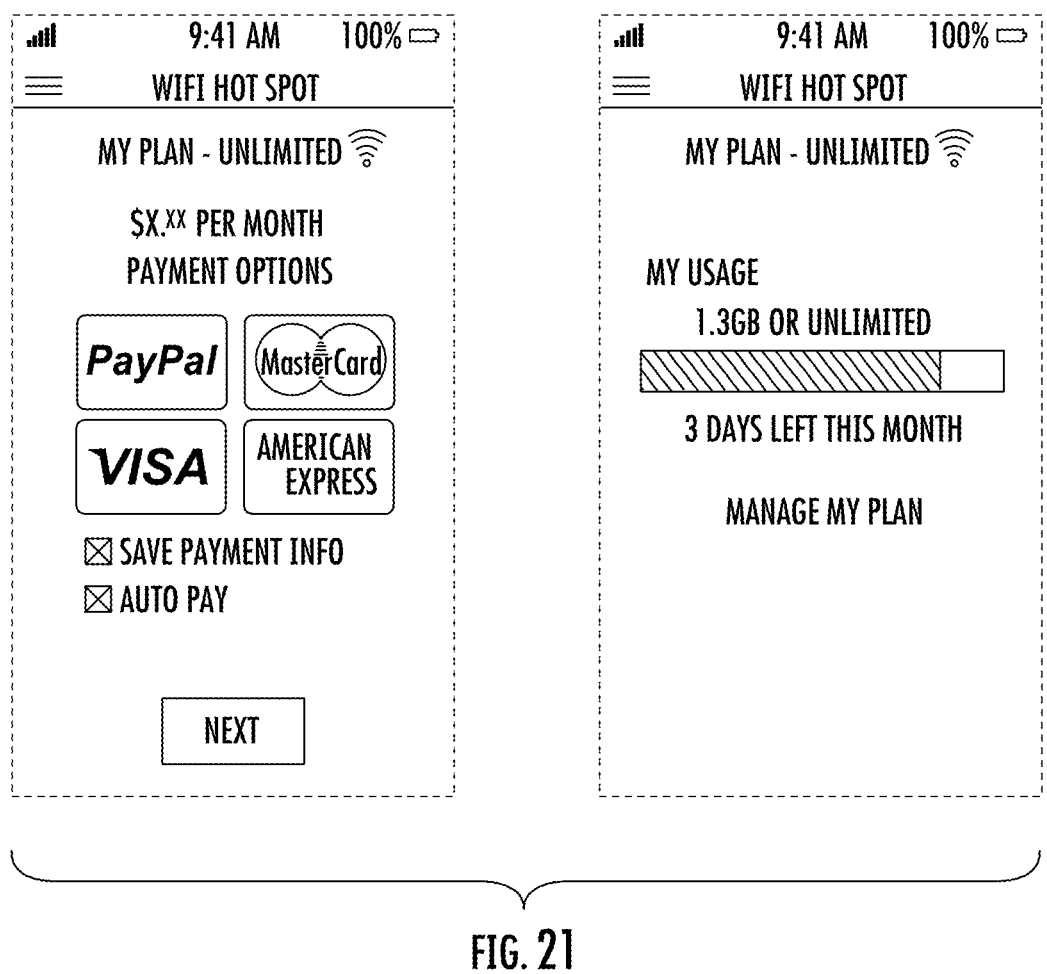
Figure 22:
Figure 23:
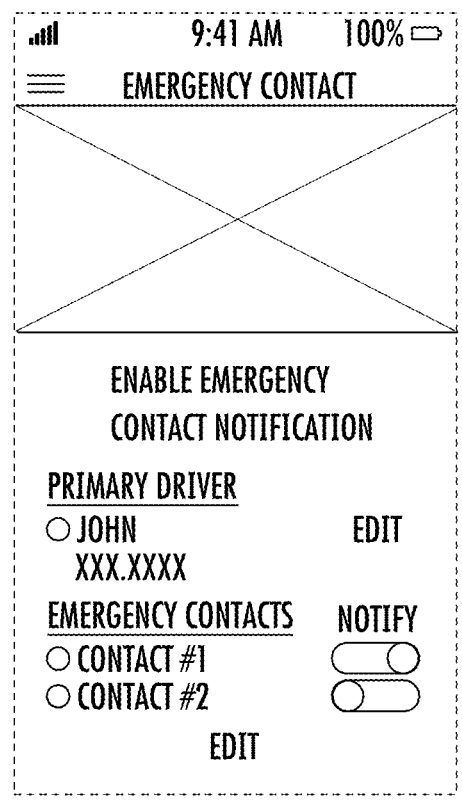
Figure 24:
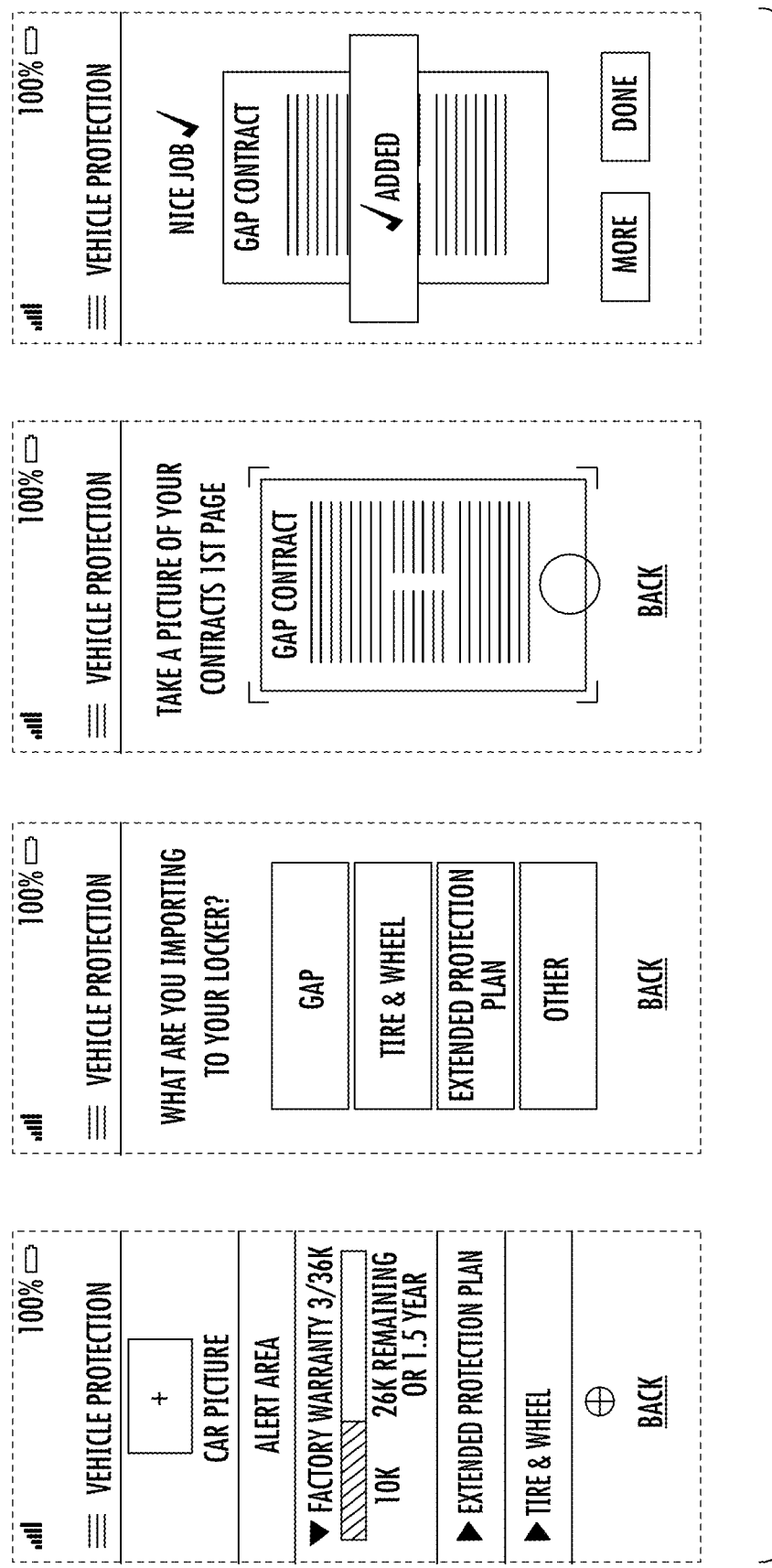
Figure 25:
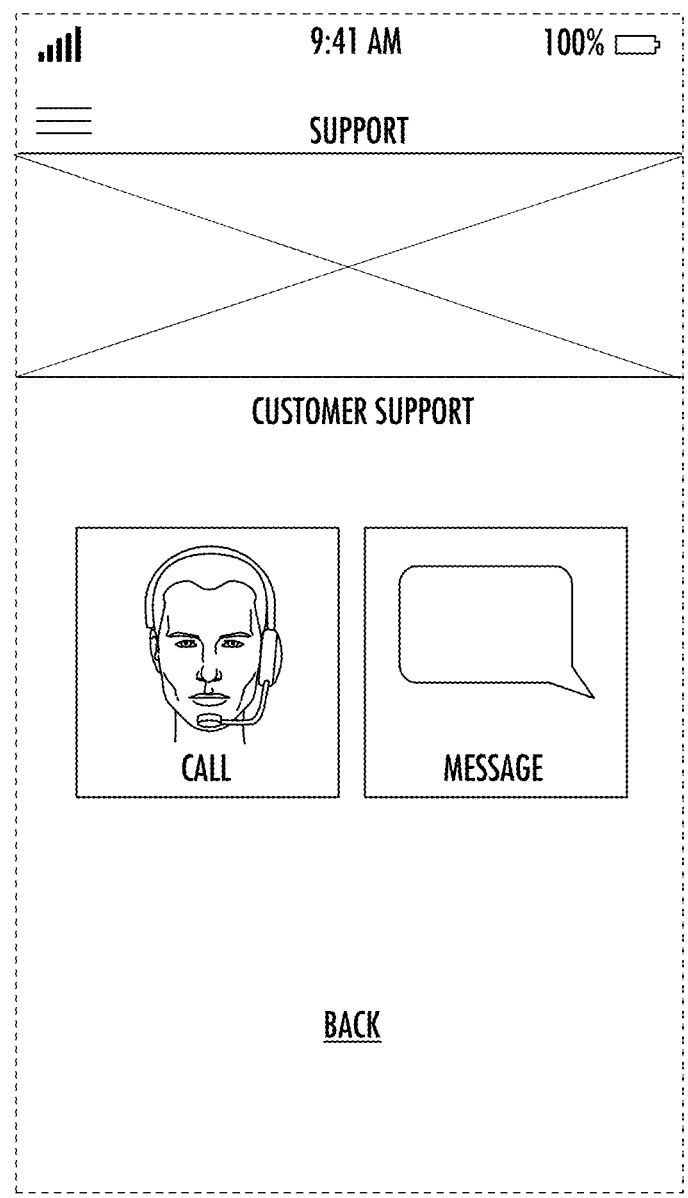
Figure 26A:
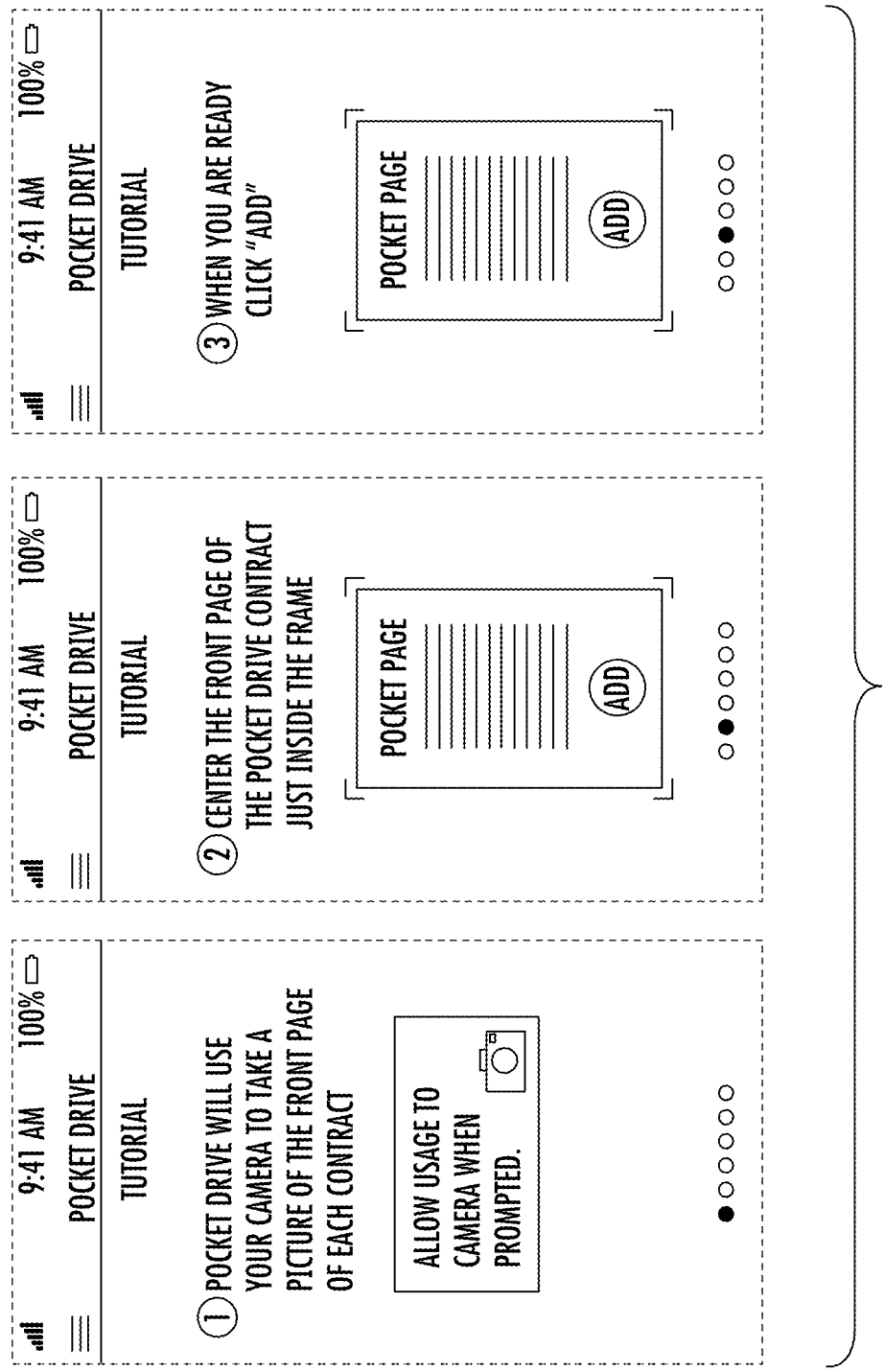
Figure 26B:
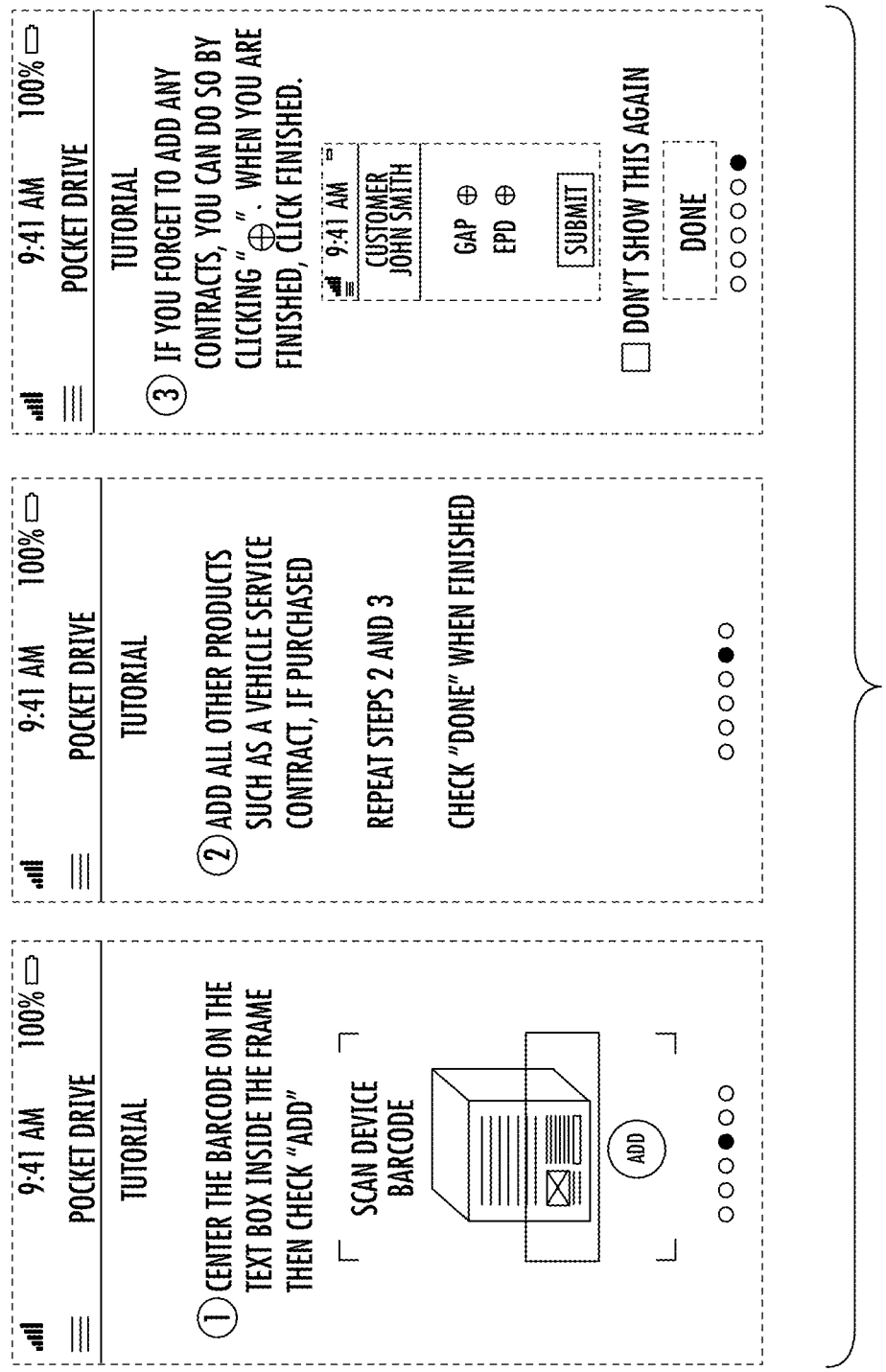
Figure 27:
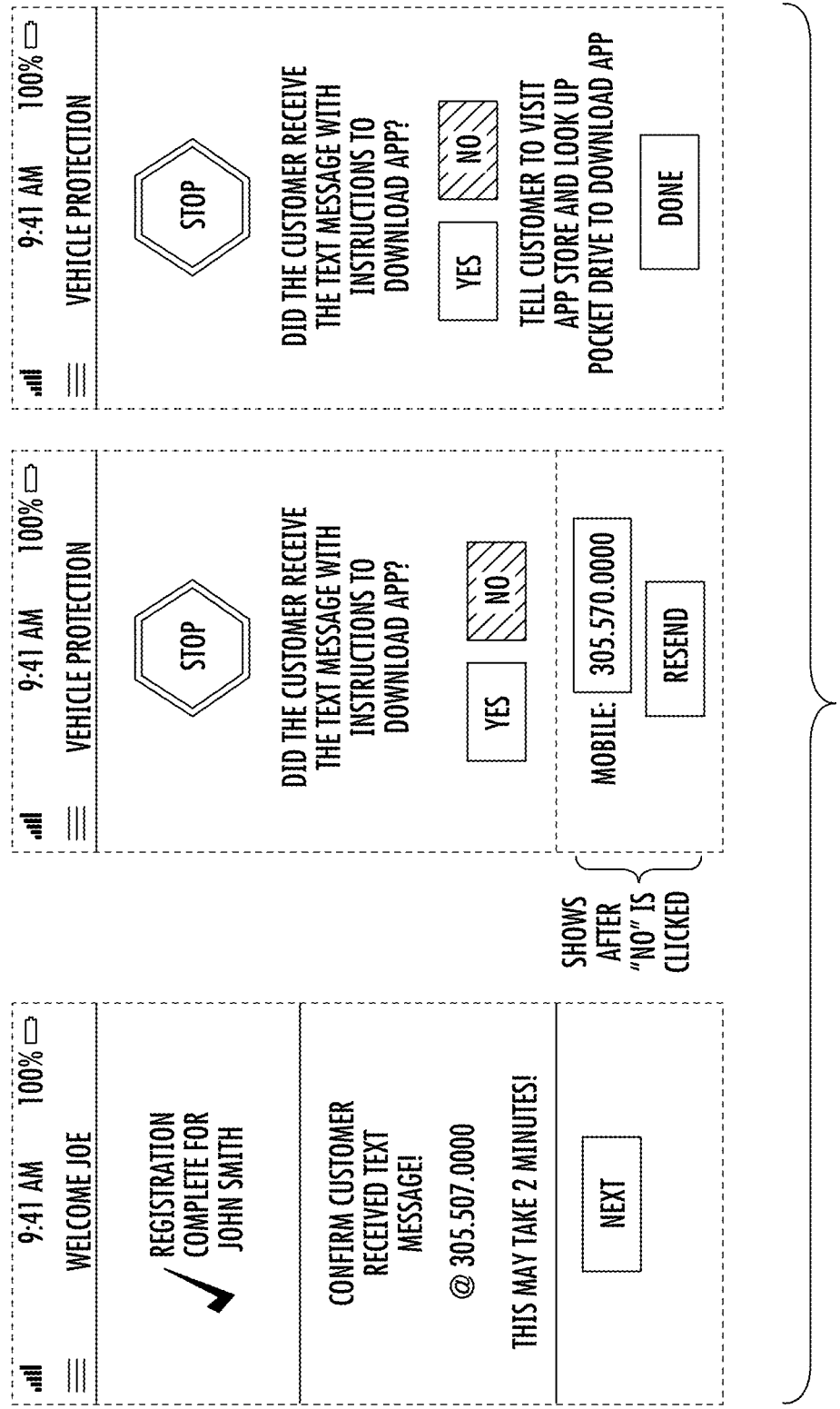
Figure 28:
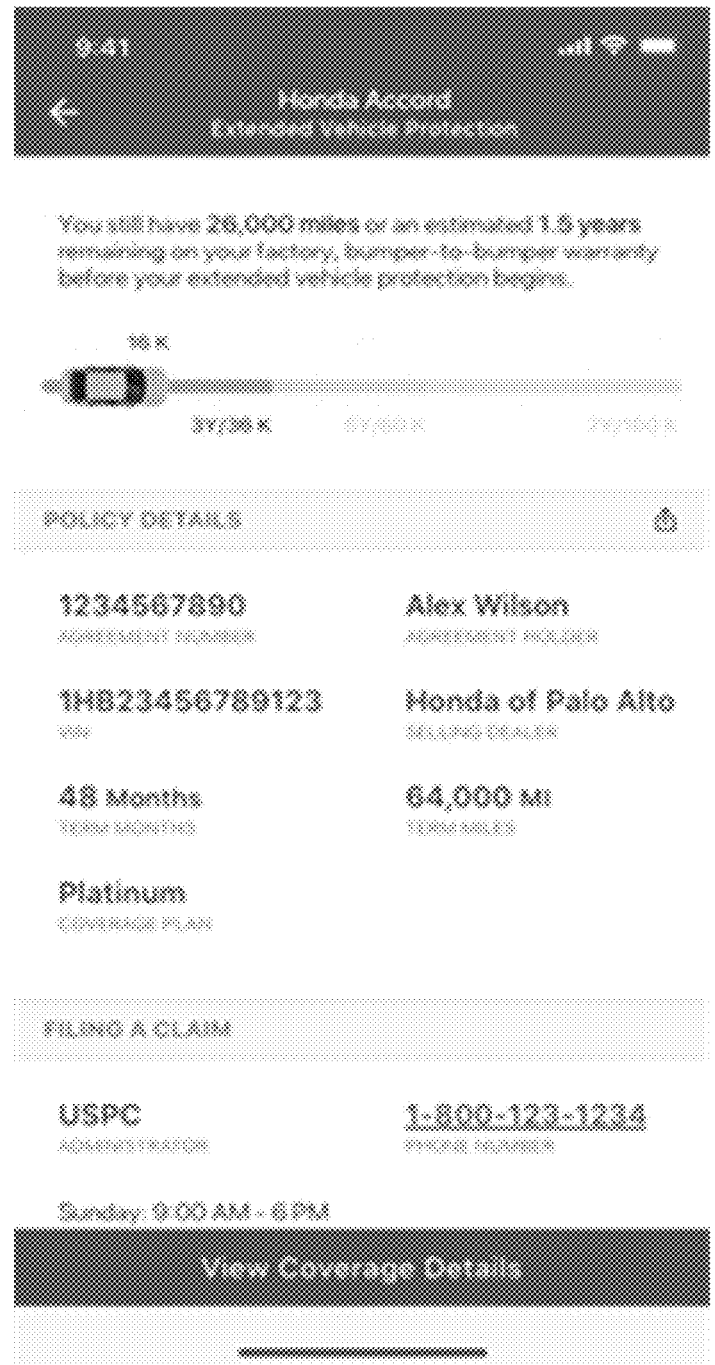
Figure 29:
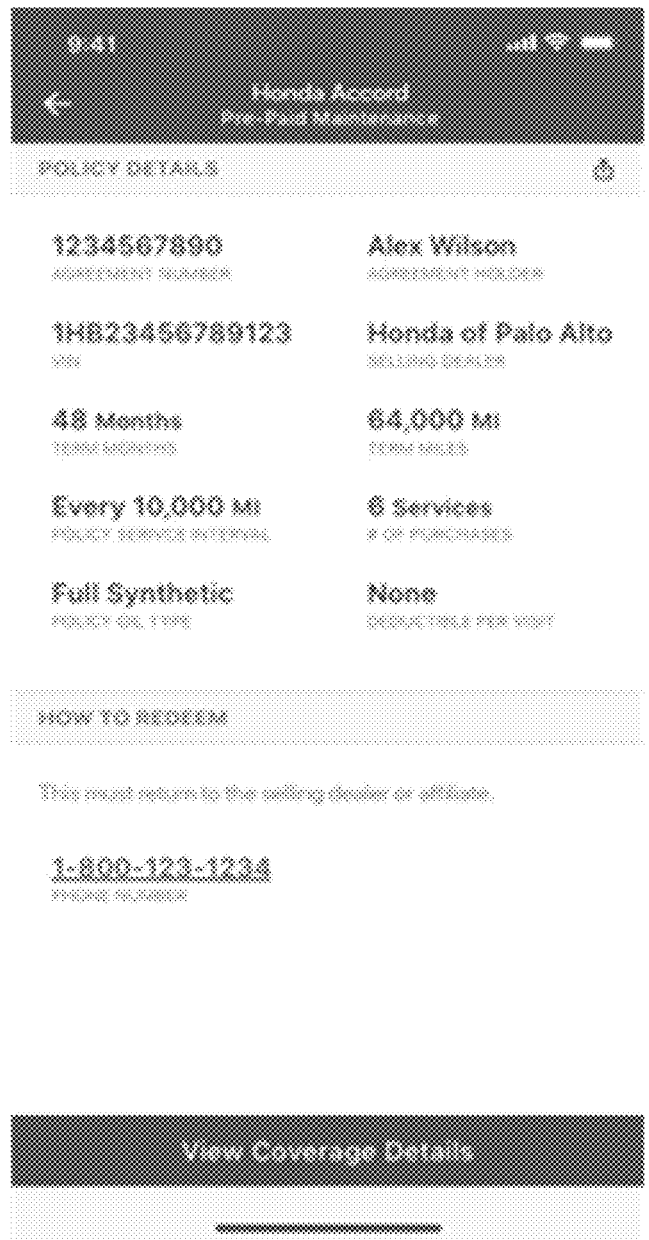
Figure 30:
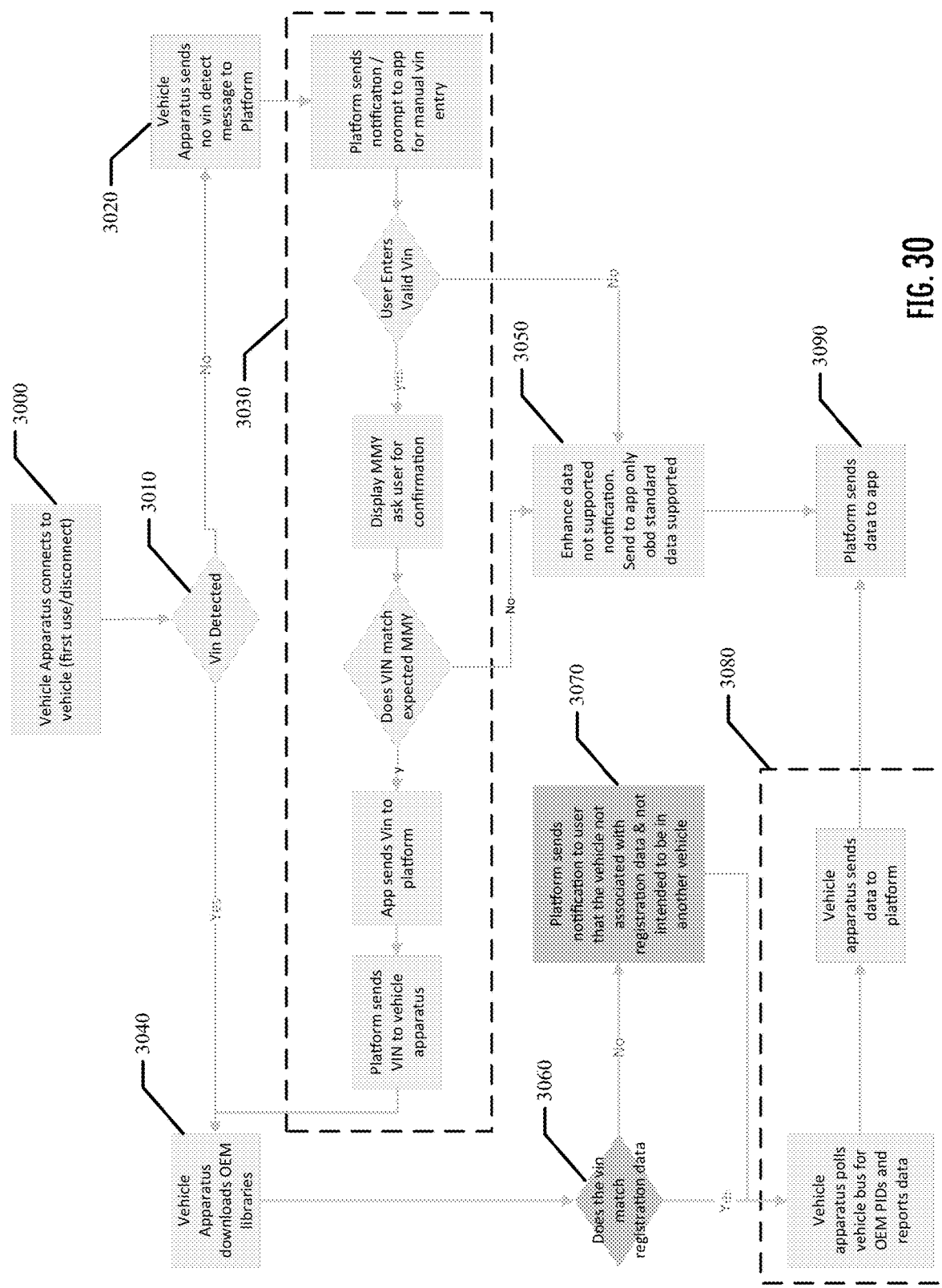
Figure 31:
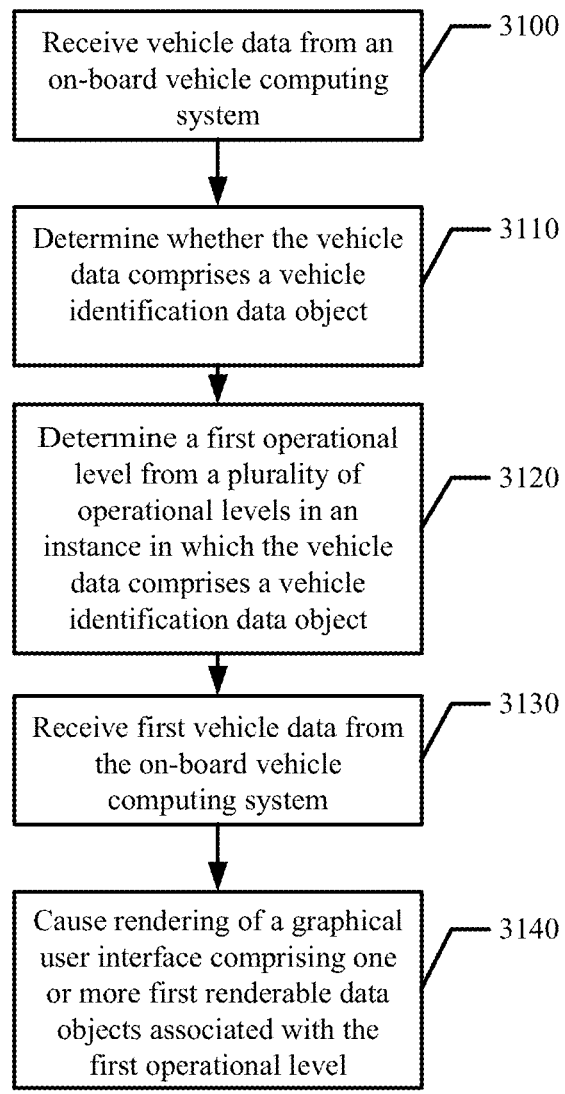
Figure 32:
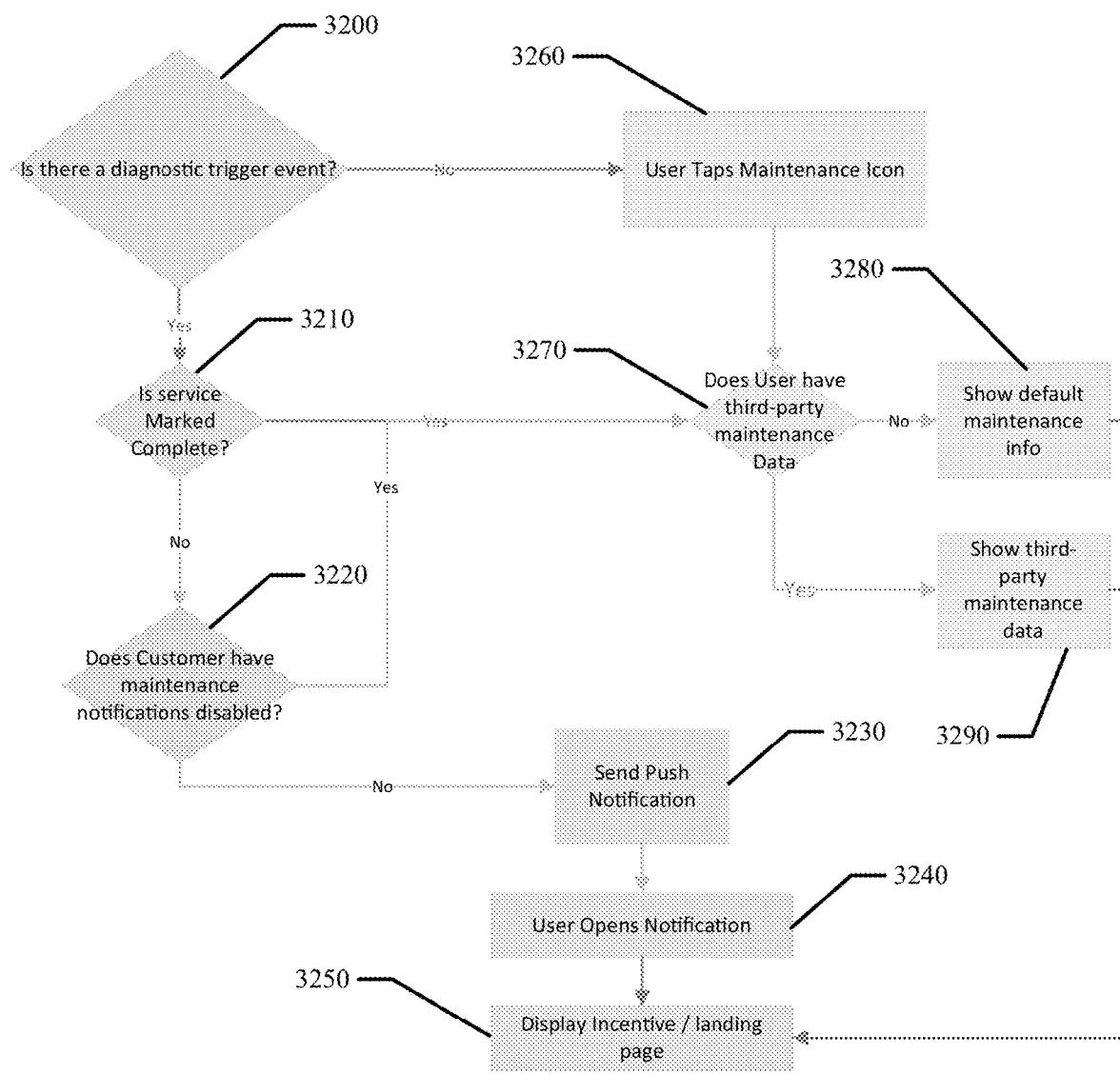
Figure 33:
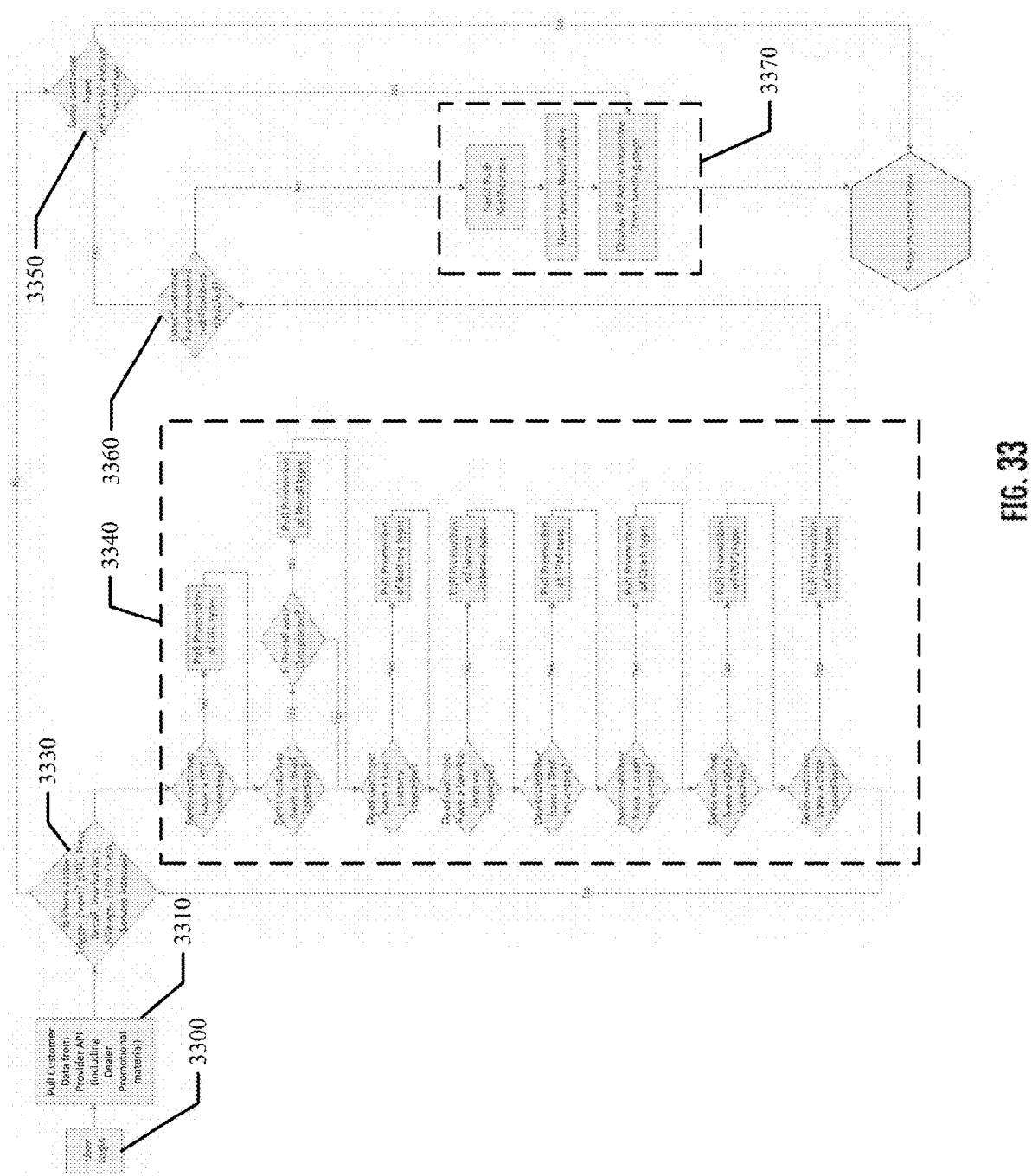
Figure 34:
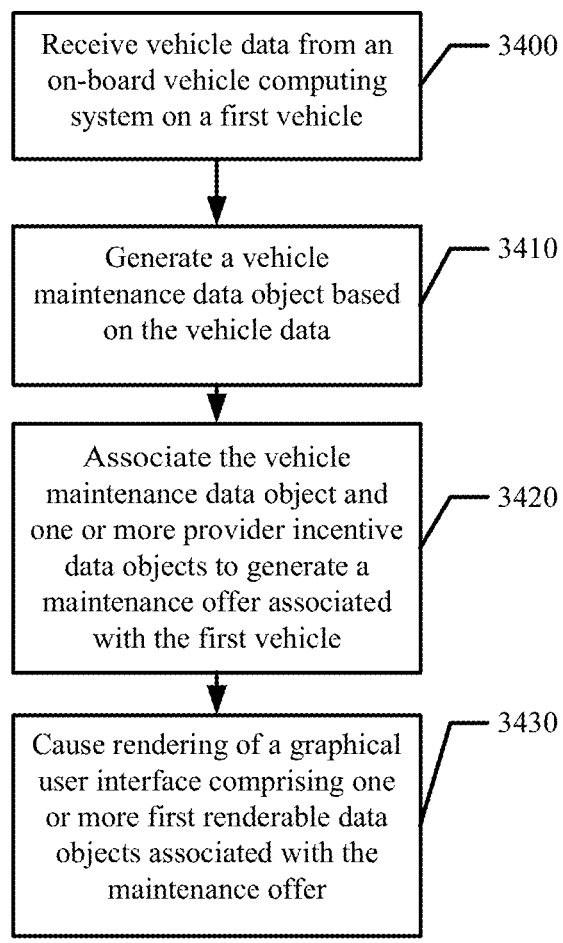
Figure 37:
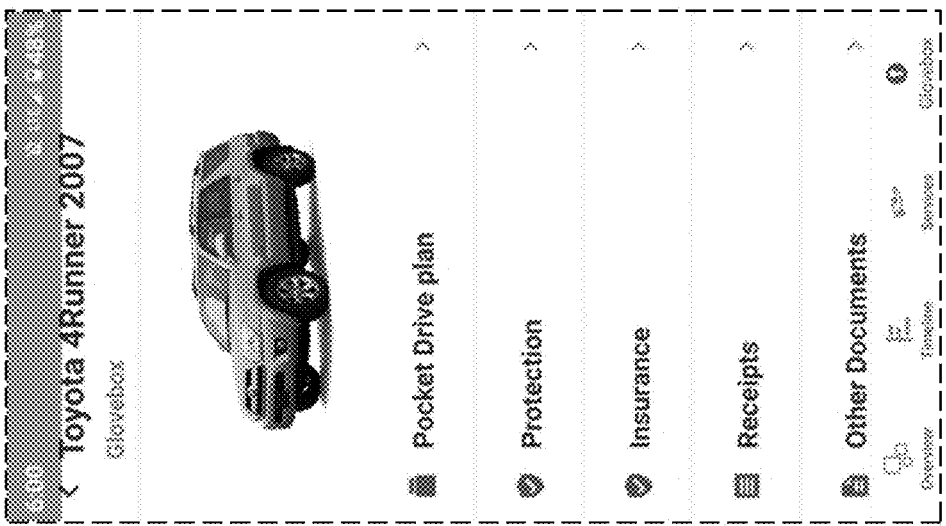
Figure 36:
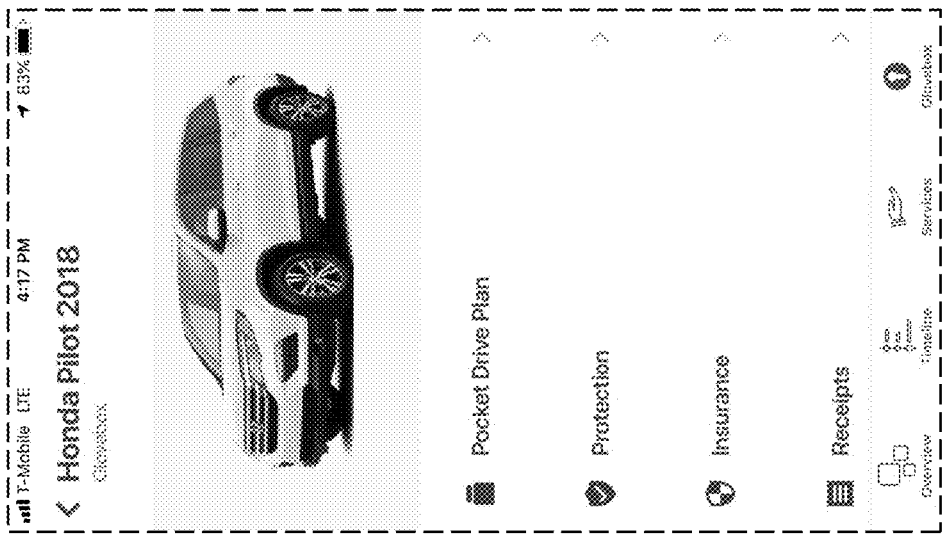
Figure 35:
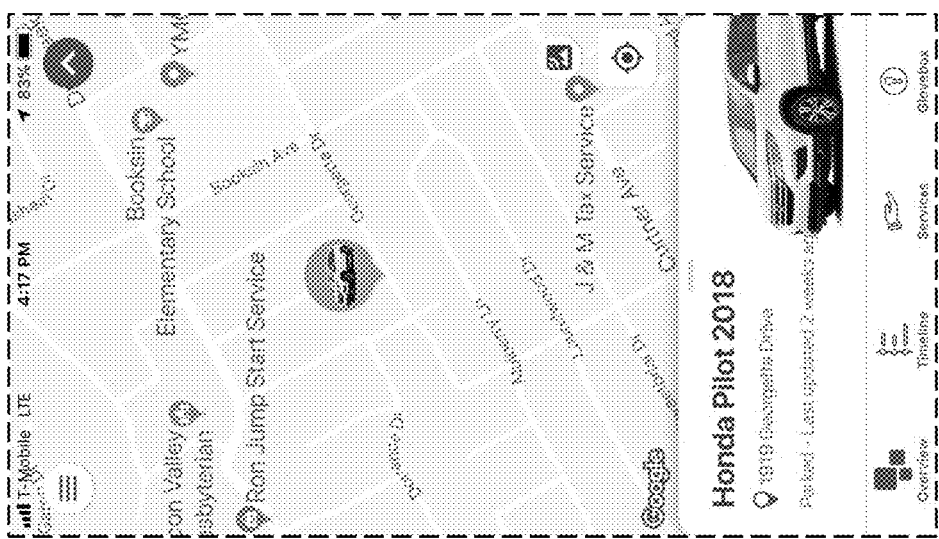
Figure 40:
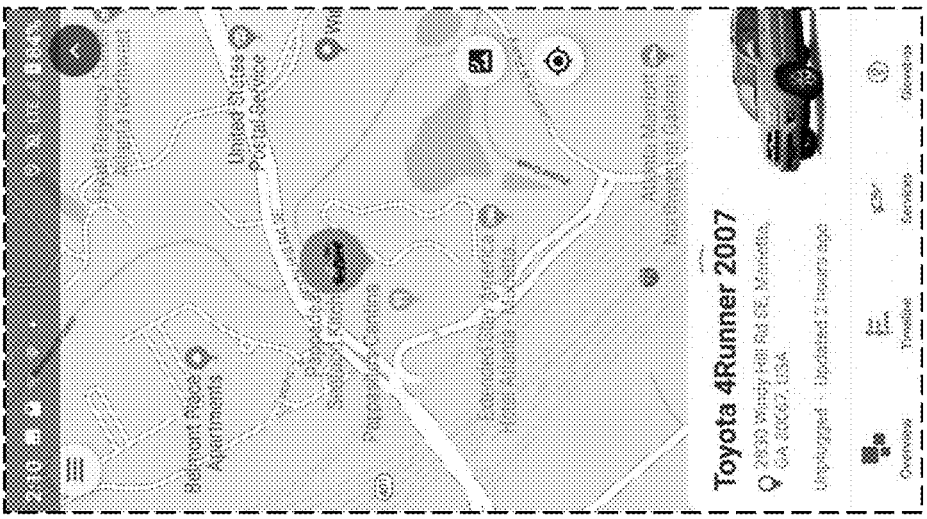
Figure 39:
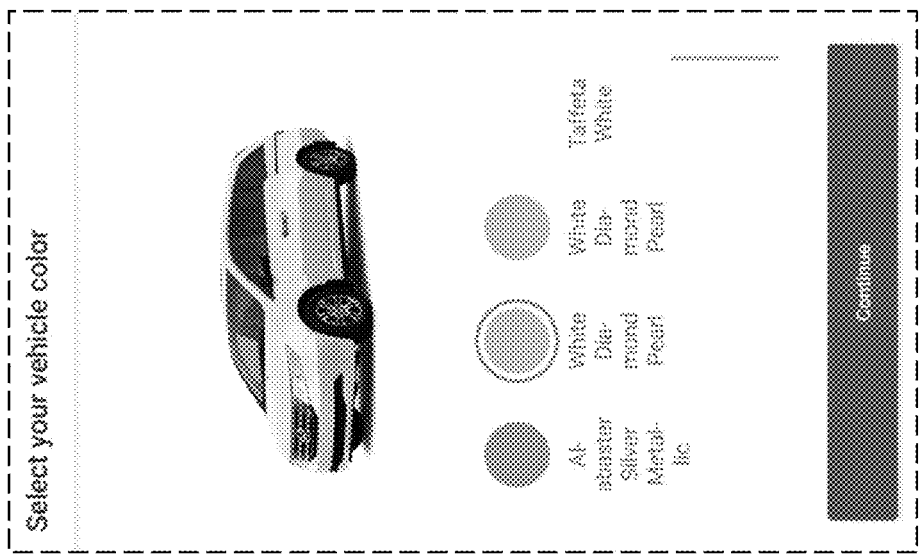
Figure 38:
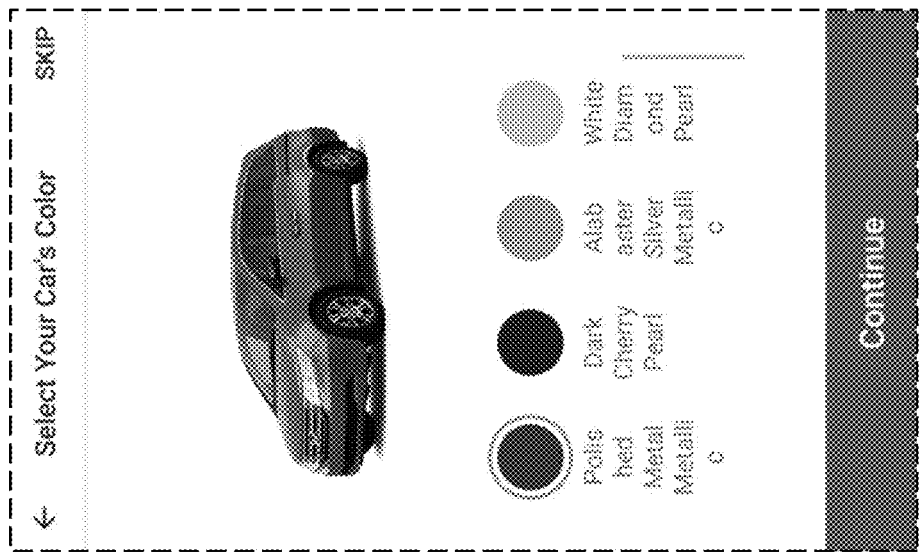
Figure 43:
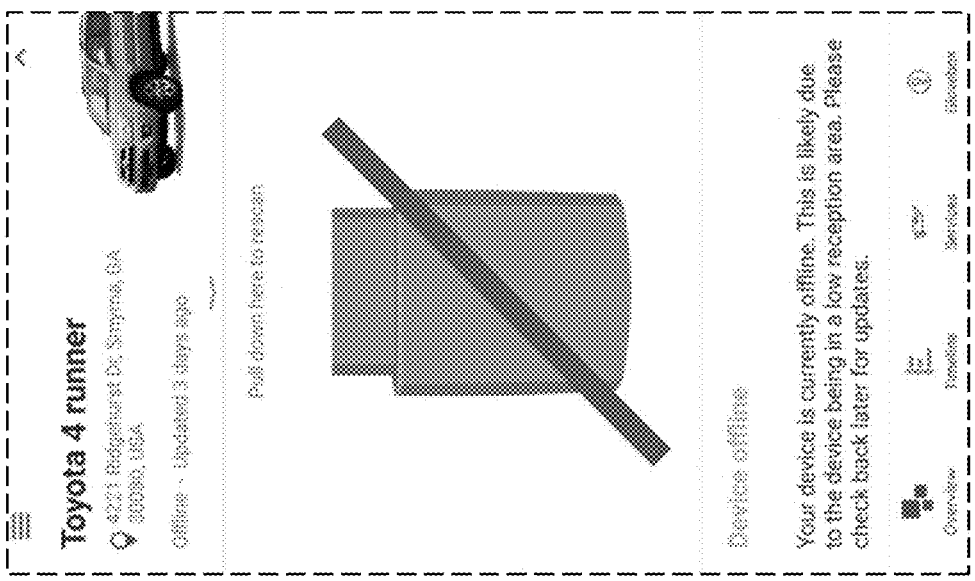
Figure 42:
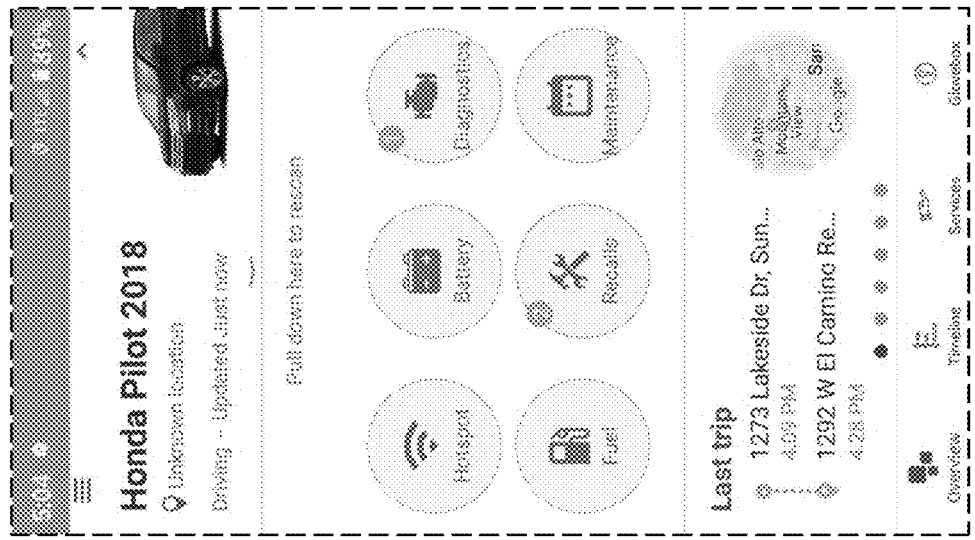
Figure 41:
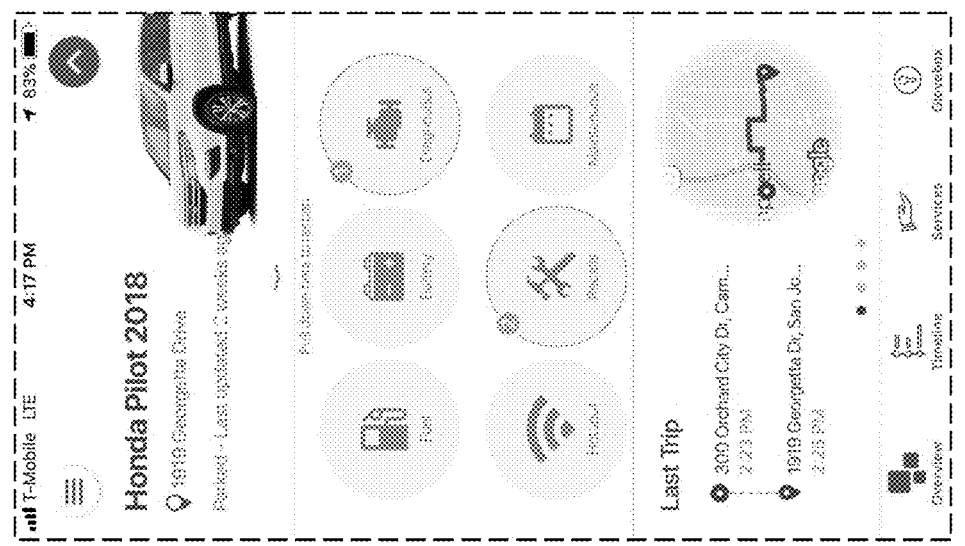
Figure 46:
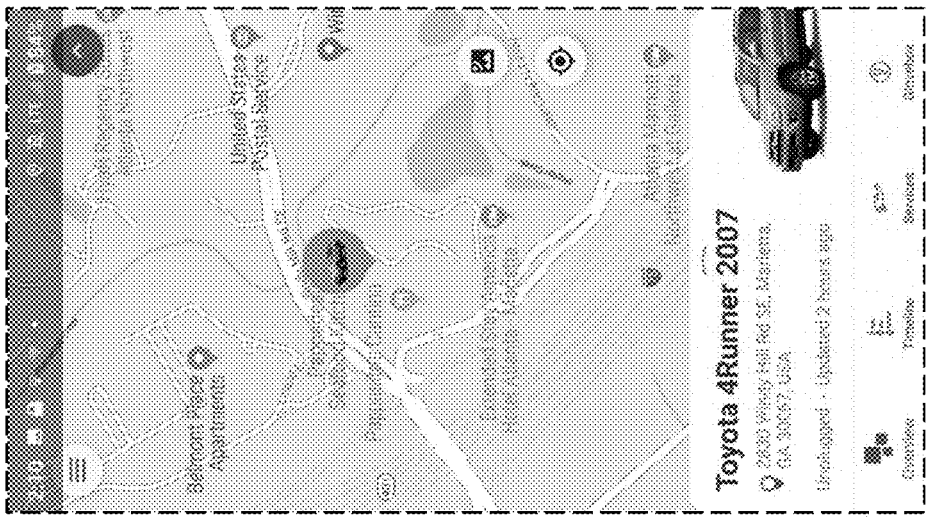
Figure 45:
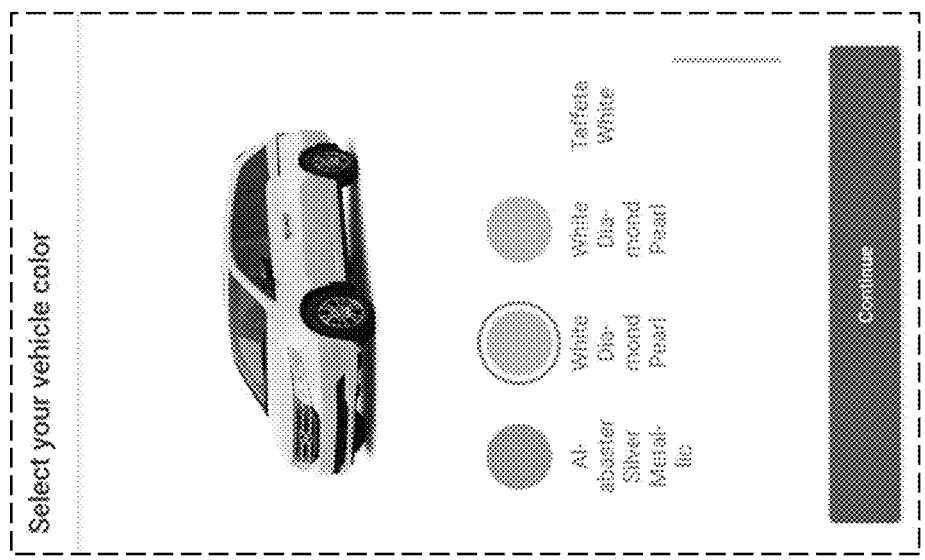
Figure 44:
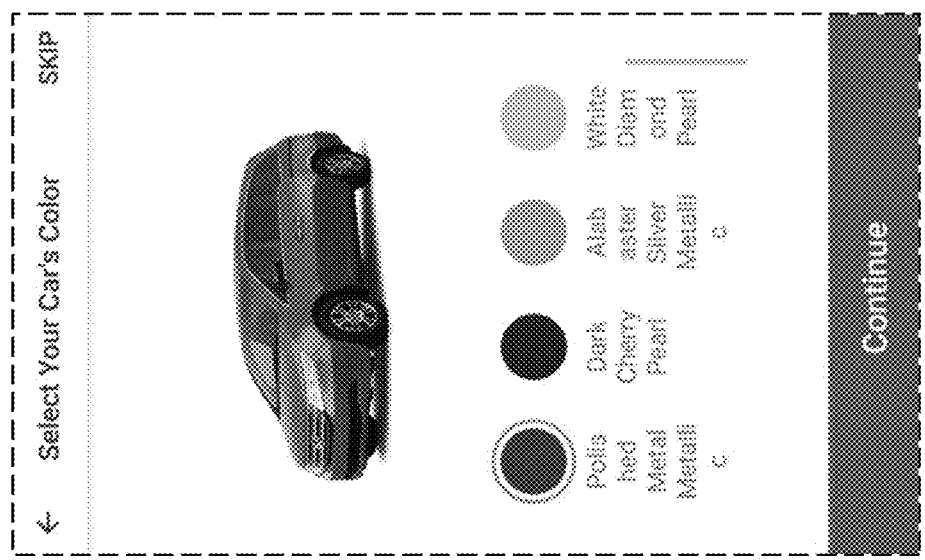
Figure 49:
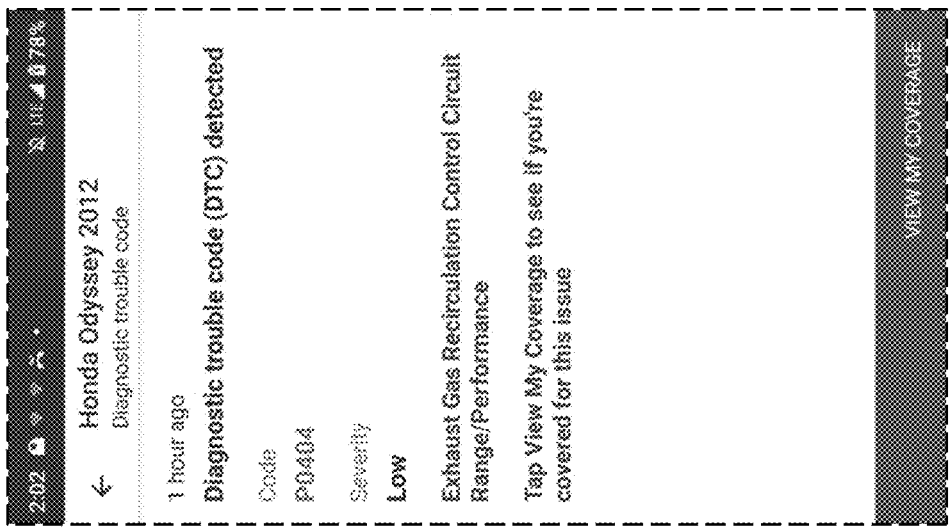
Figure 48:
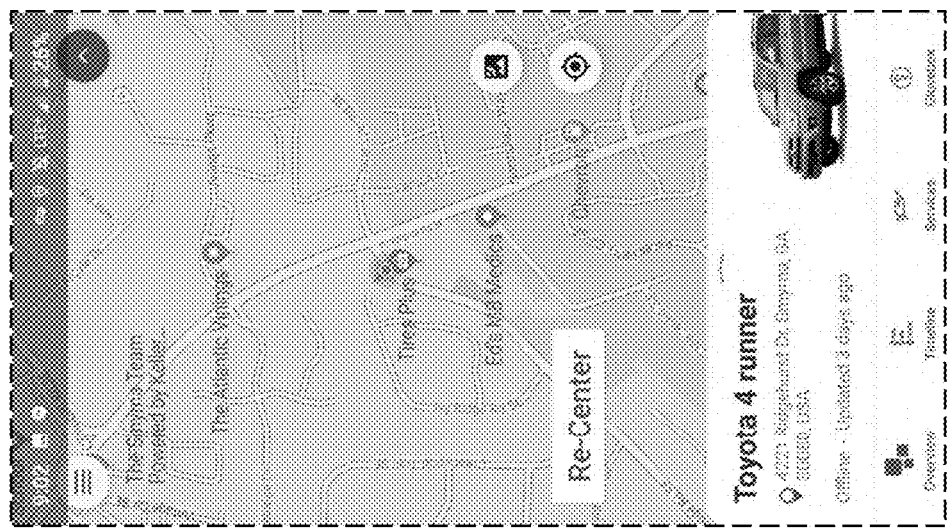
Figure 47:
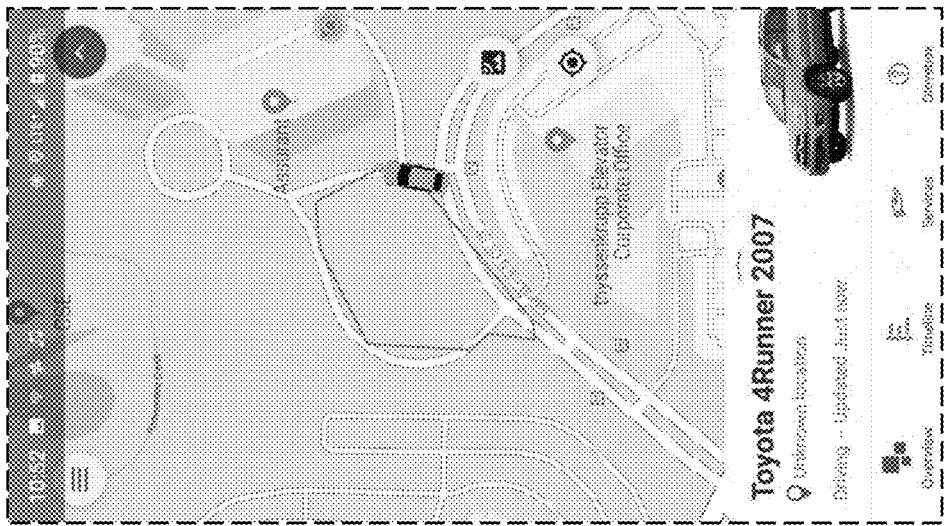
Figure 50:
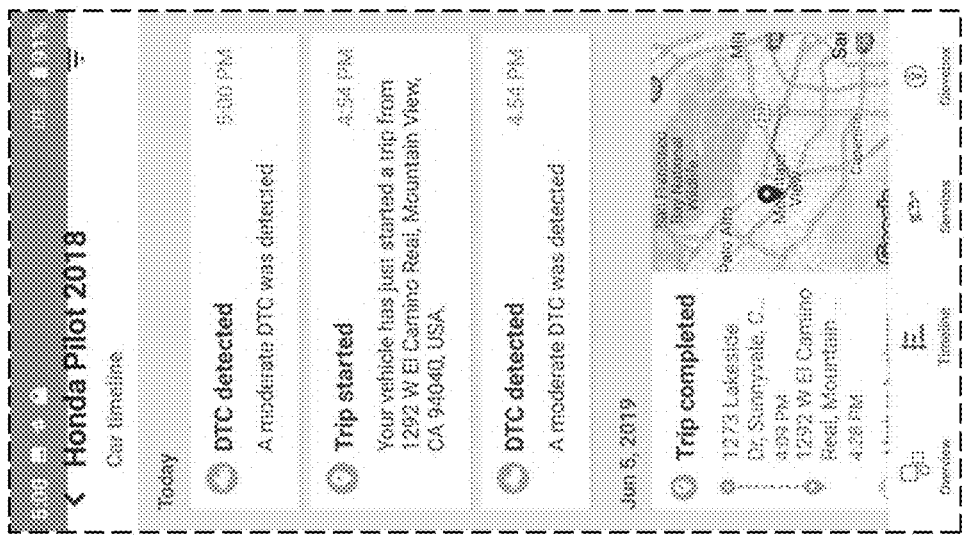
Figure 51:
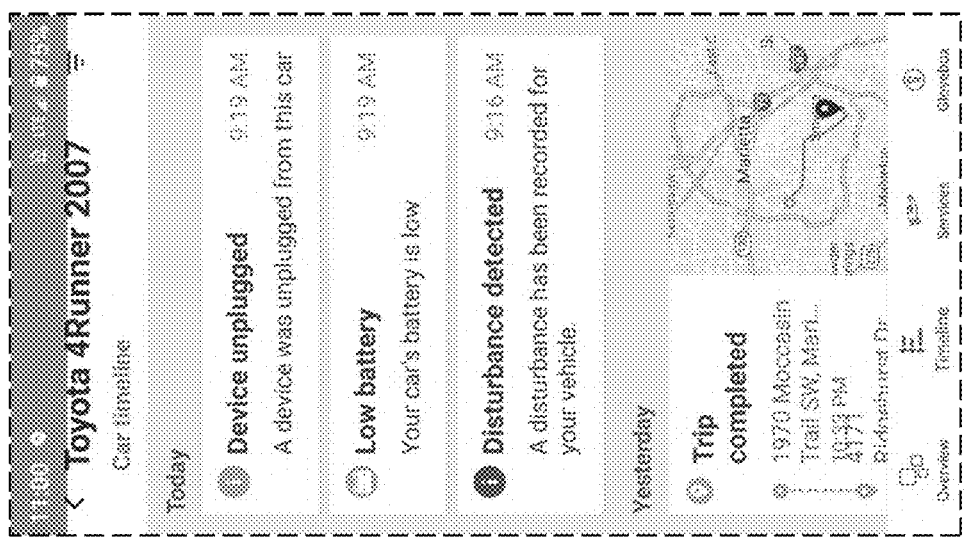
Figure 52:
Figure 55:
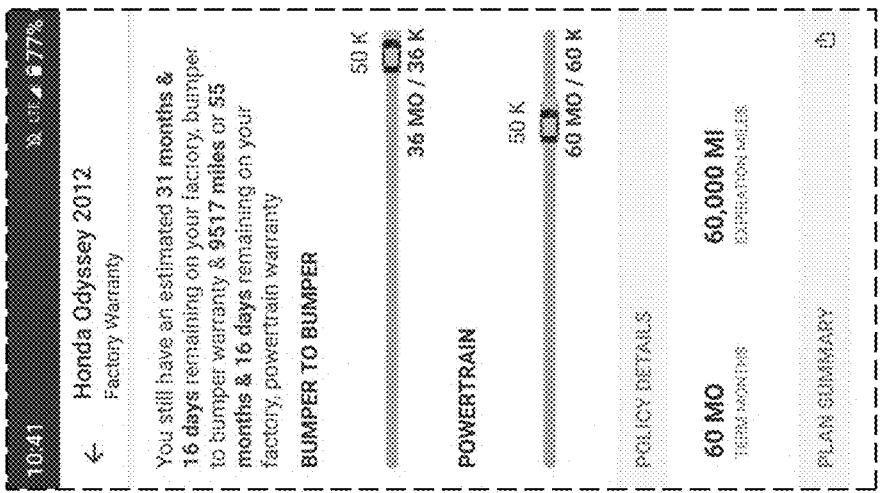
Figure 54:
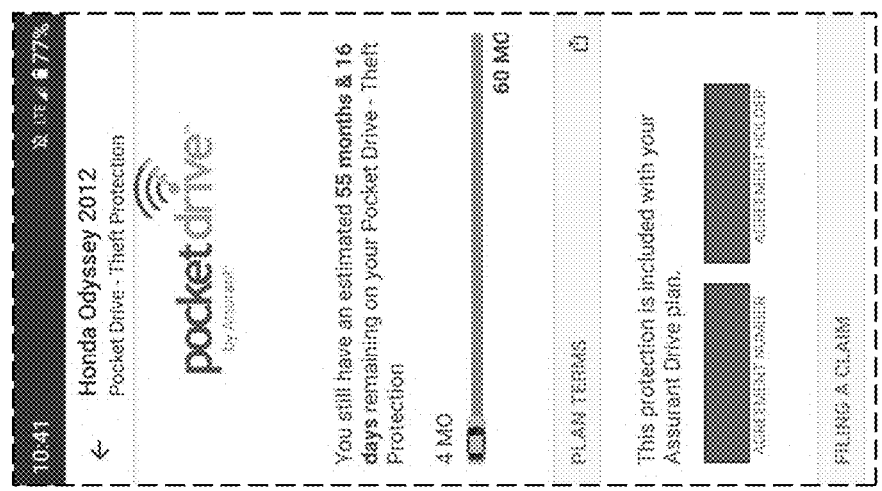
Figure 53:
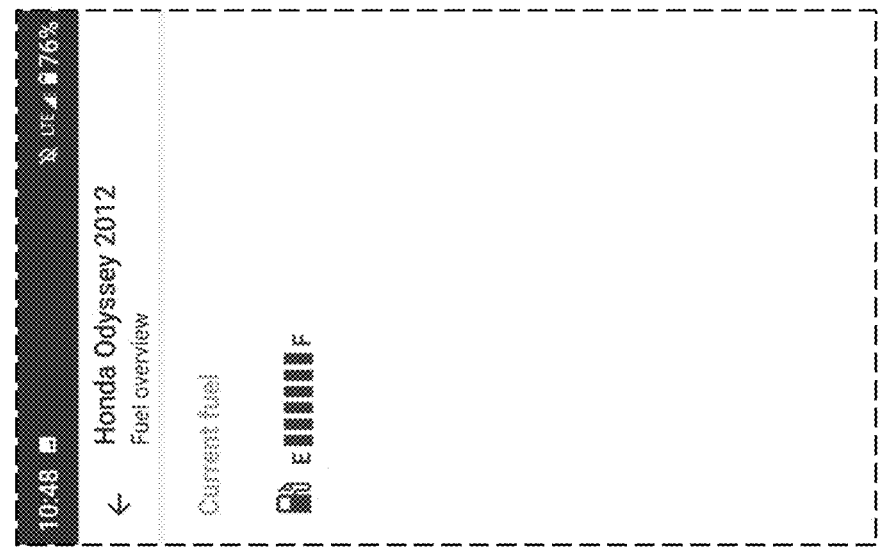
Figure 58:
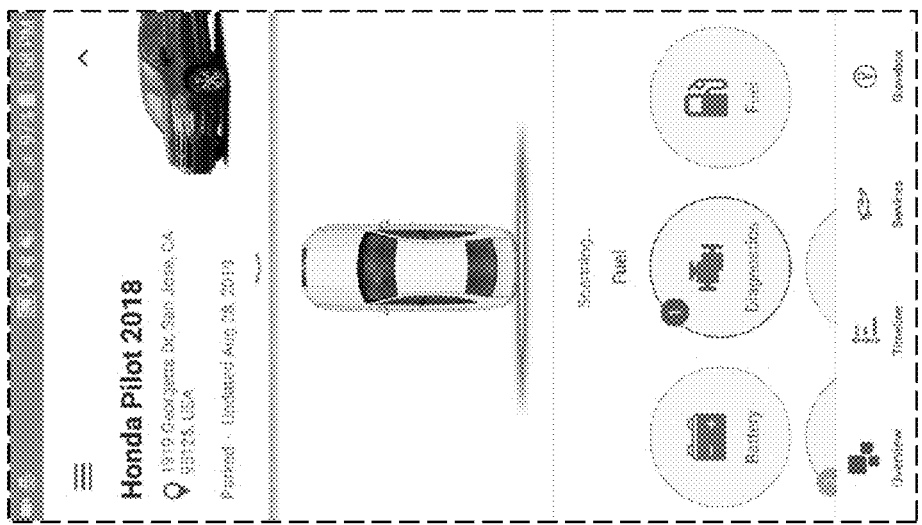
Figure 57:
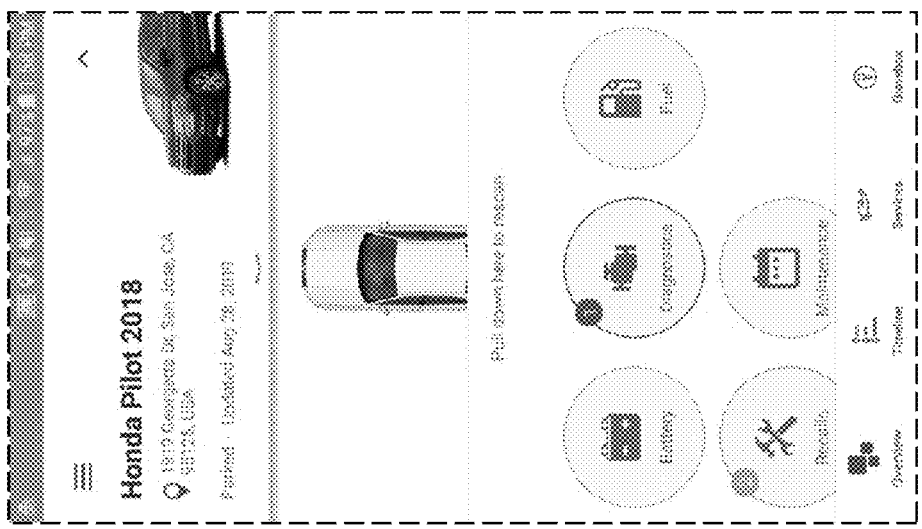
Figure 56:
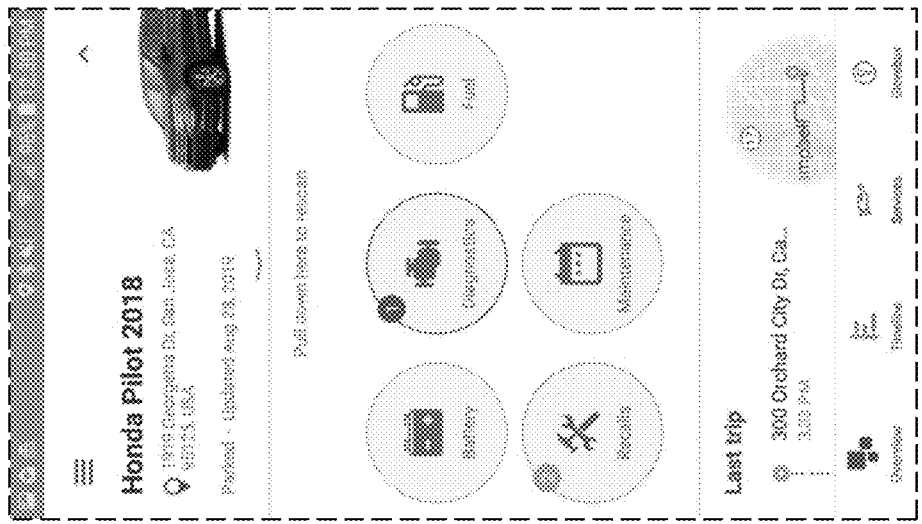
Figure 59:
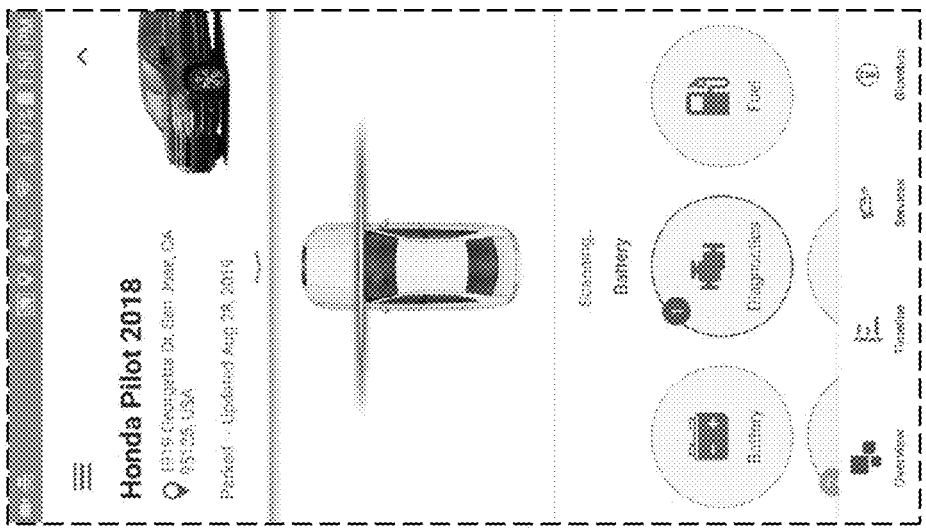
Figure 60:
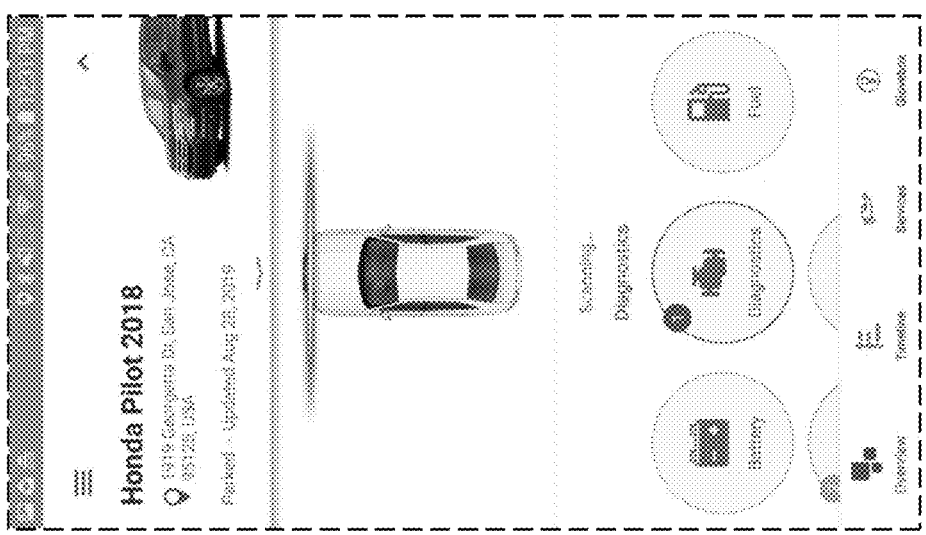
Figure 61:
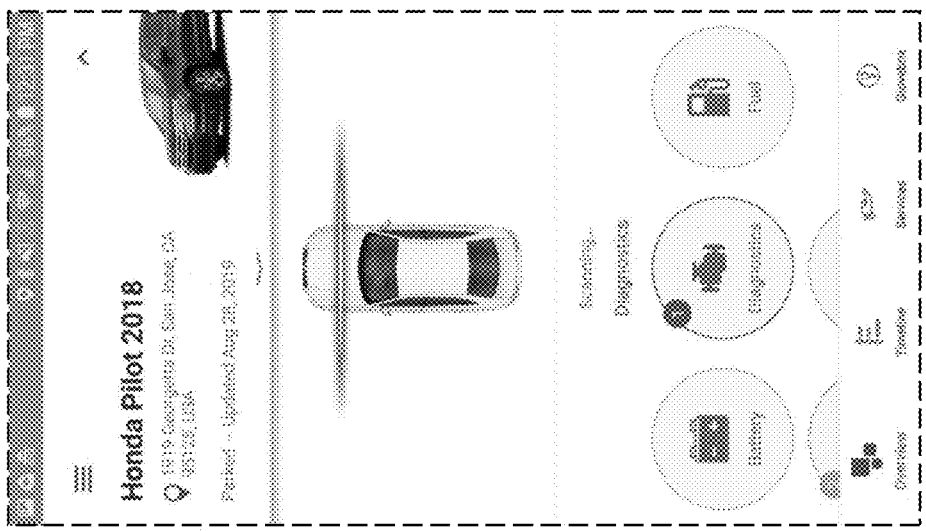
Figure 64:
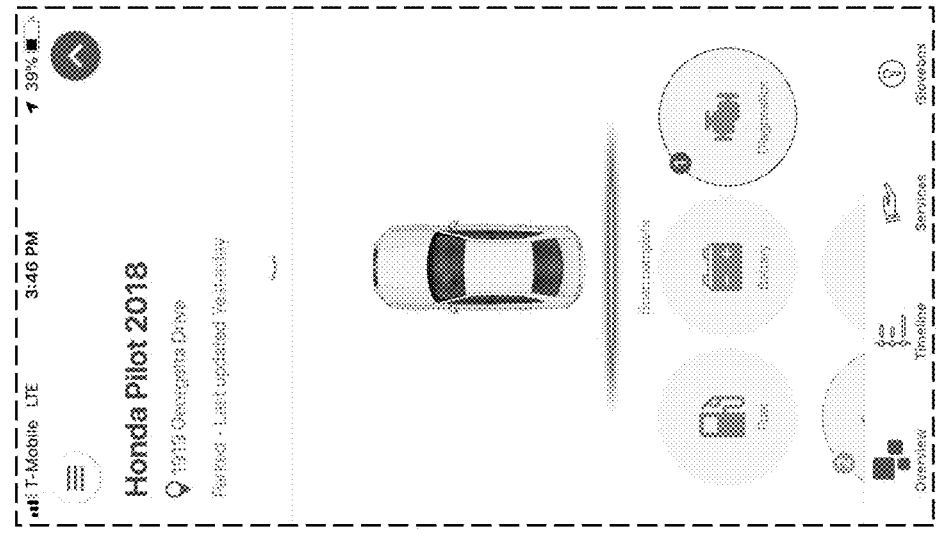
Figure 63:
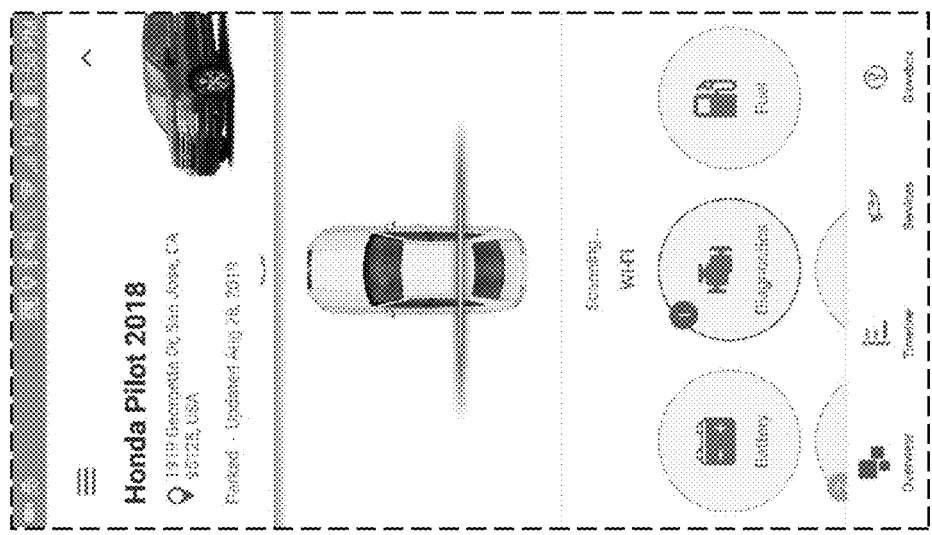
Figure 62:
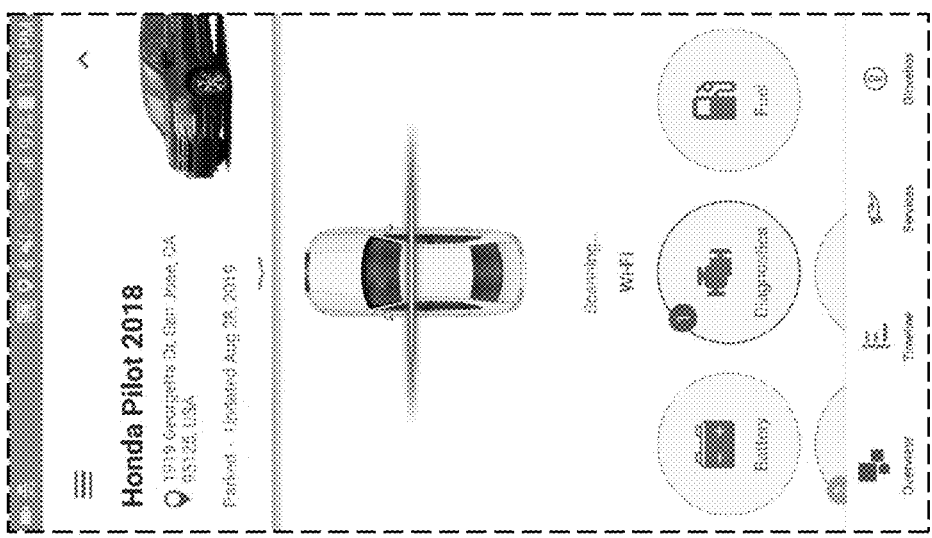
Figures 65, 66, 67:
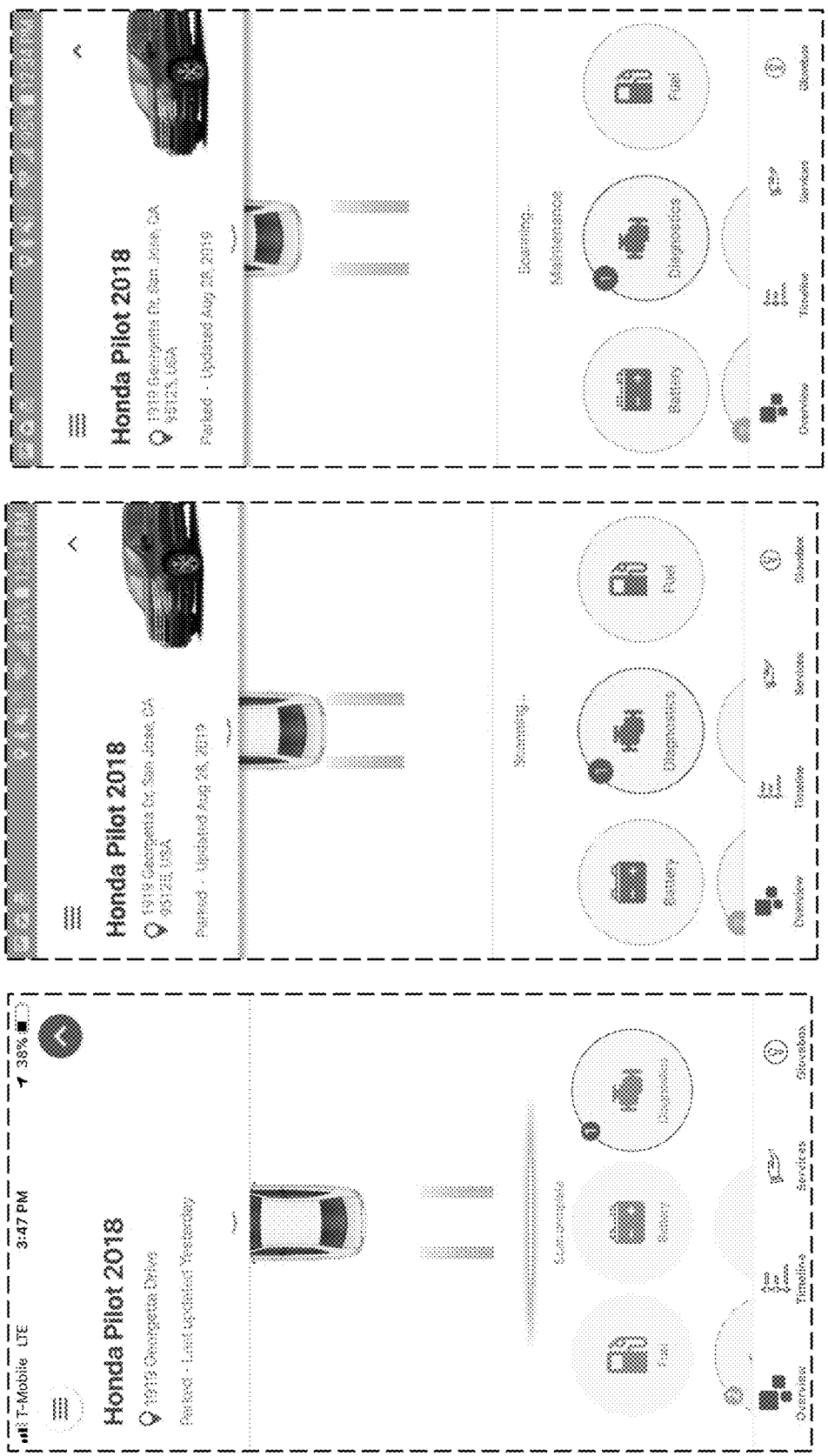
Figure 69:
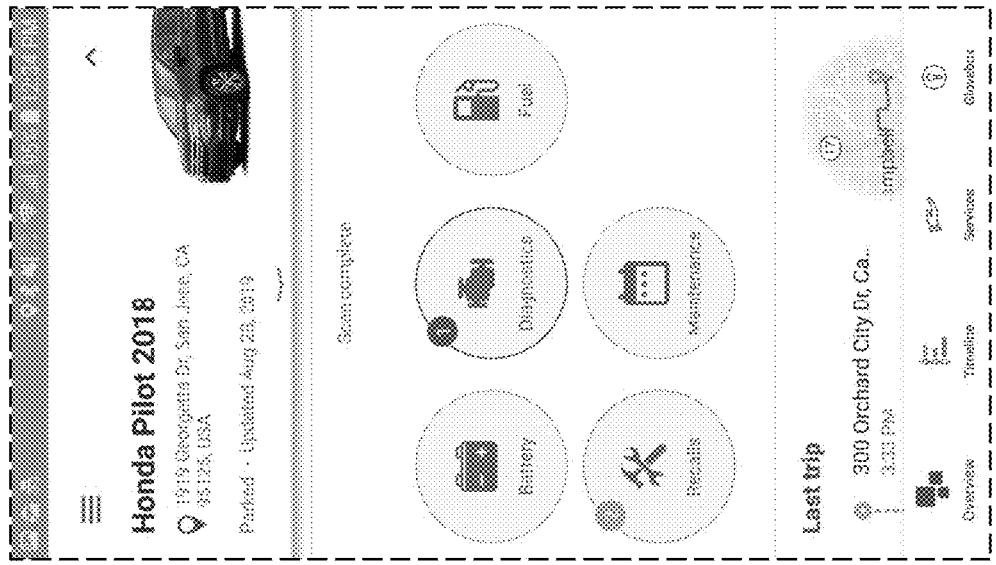
Figure 68:
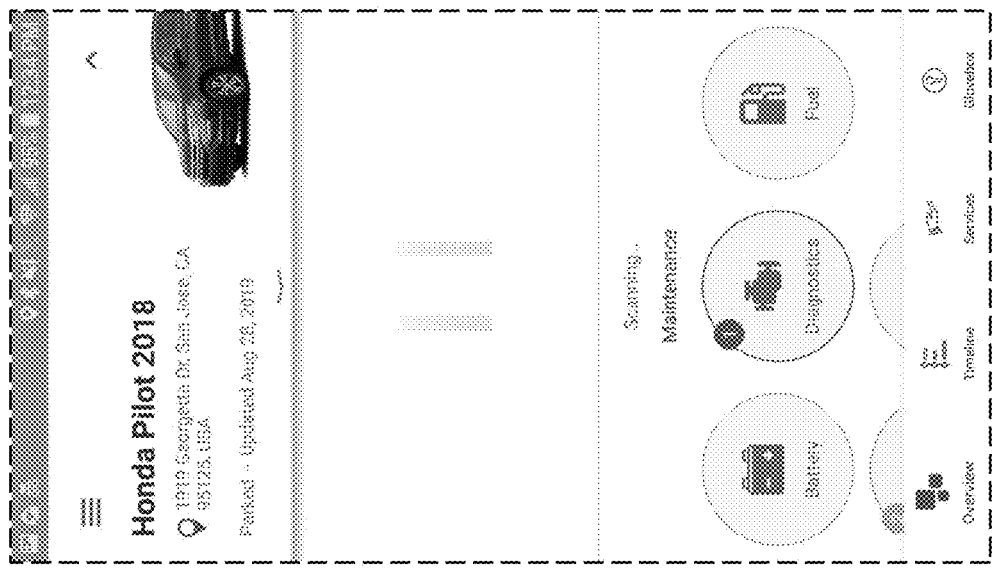
Figures 70, 71, 72:
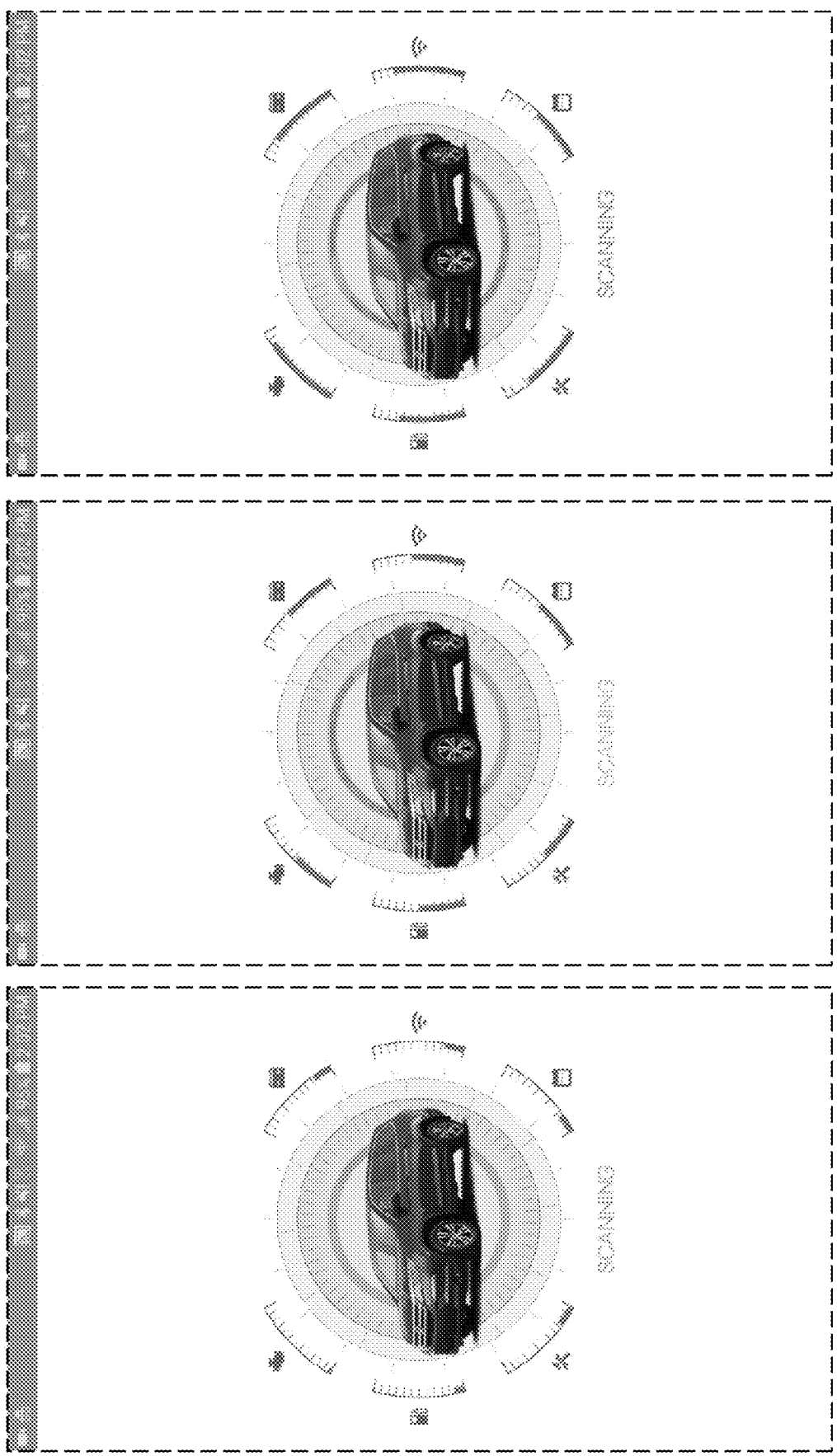
Figure 74:
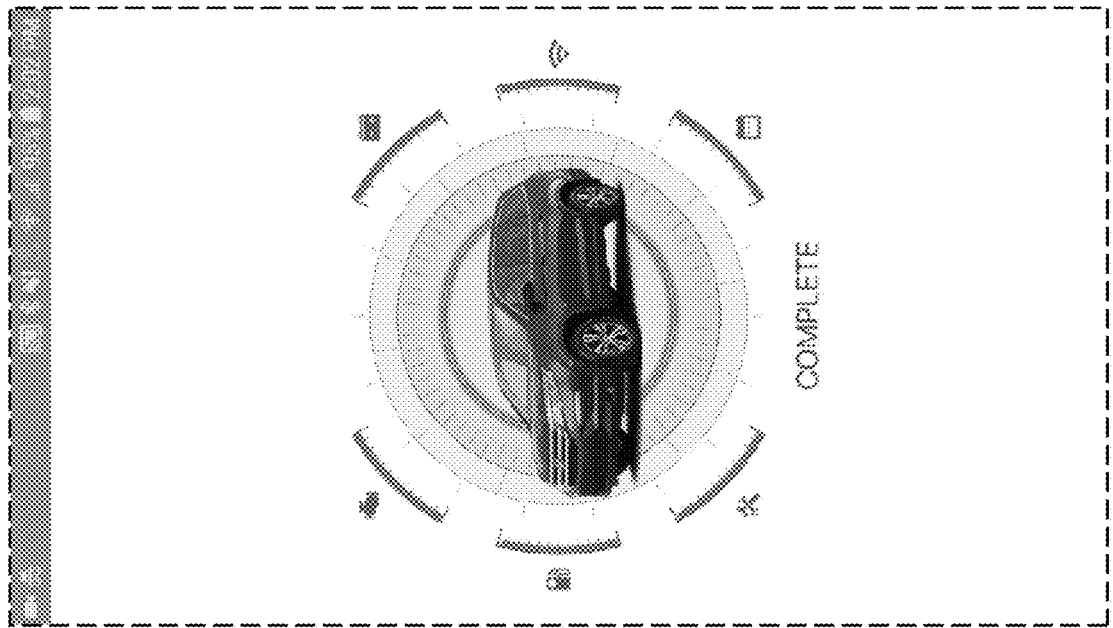
Figure 73:
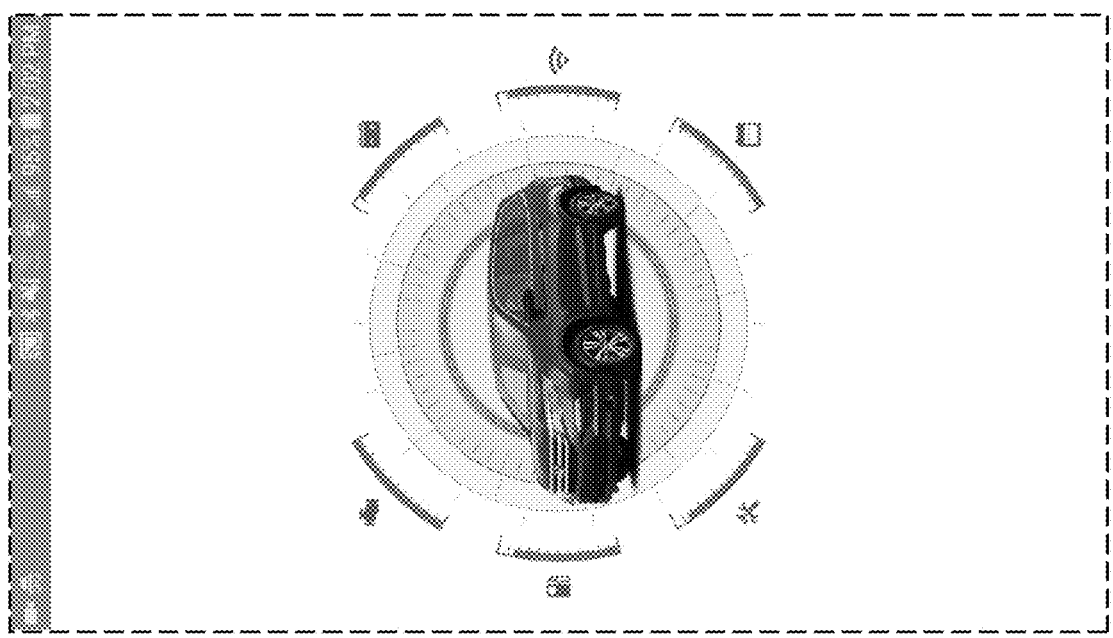
Figure 77:
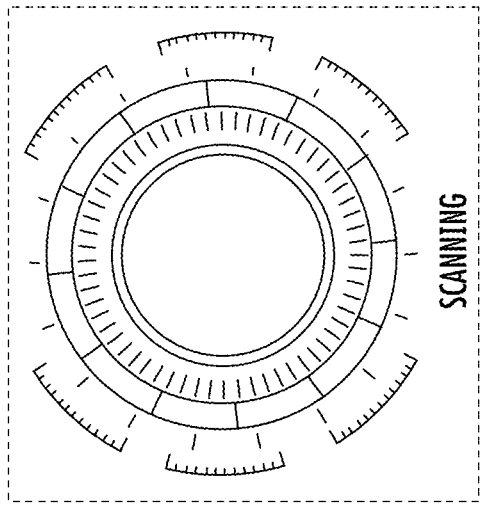
Figure 76:
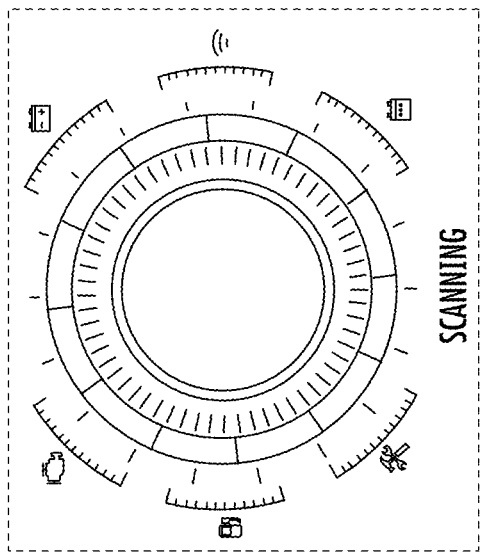
Figure 75:
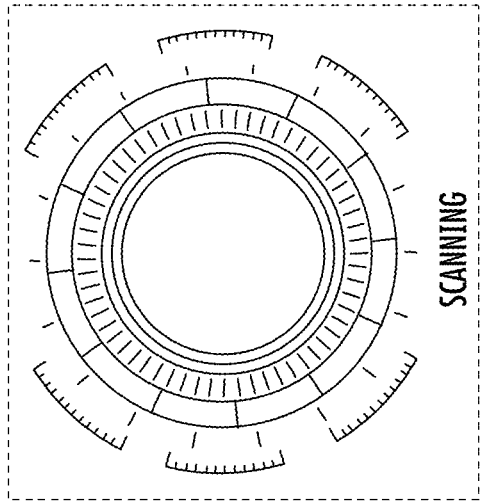
Figure 80:
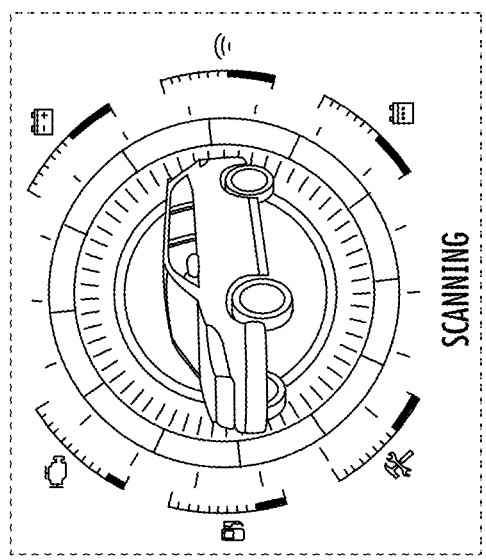
Figure 79:
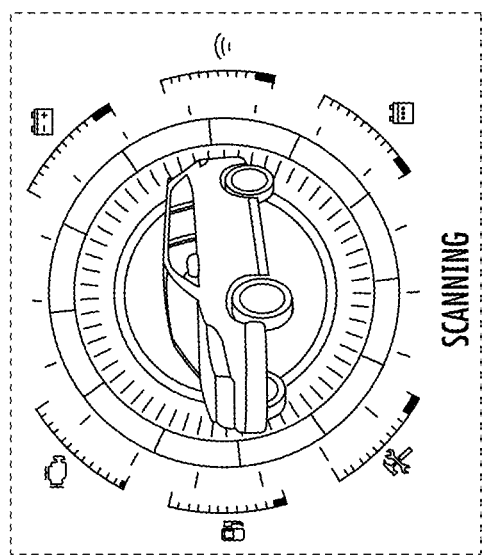
Figure 78:
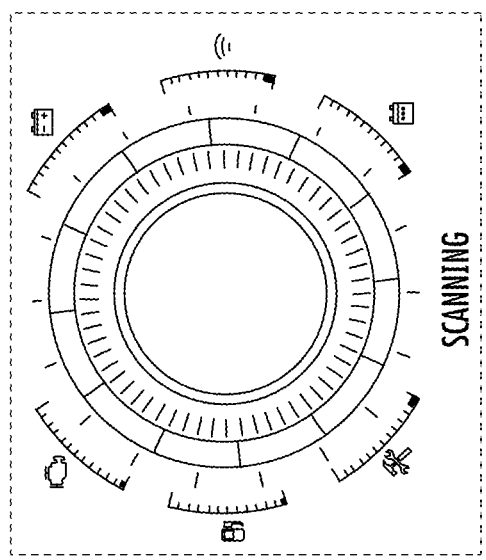
Figure 84:
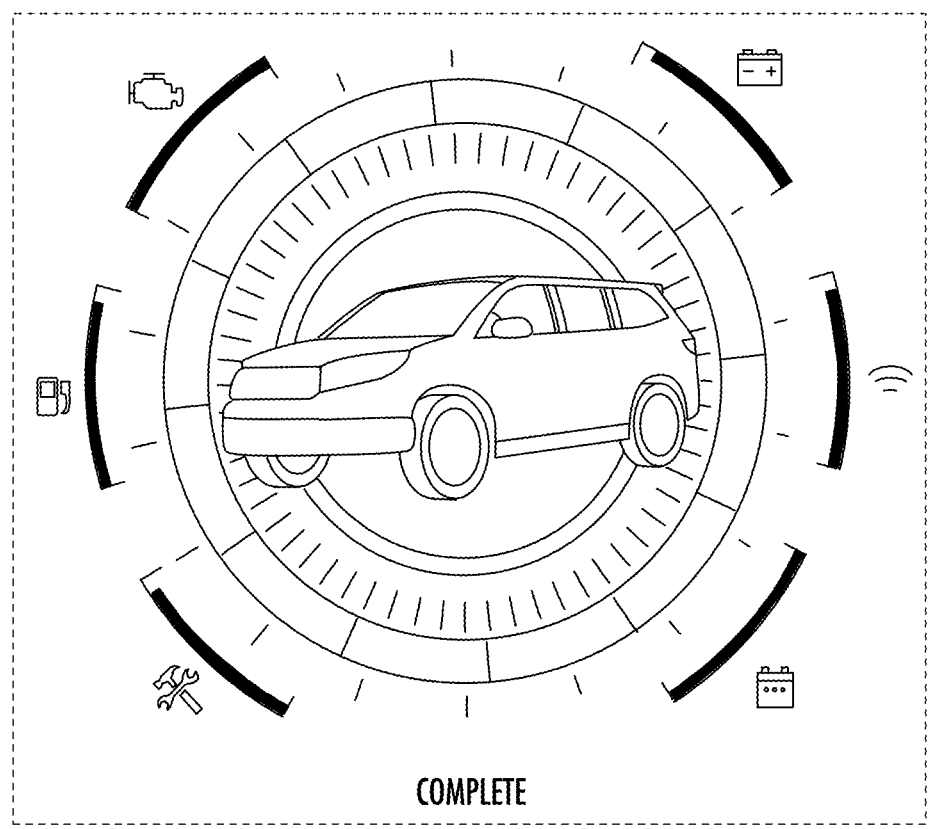

Having thus described certain example embodiments of the present disclosure in general terms, reference will now be made to the accompanying drawings, which are not necessarily drawn to scale, and wherein:

FIG. 1 is a block diagram of a subscriber device that may be configured to determine policy information in accordance with an example embodiment of the present disclosure;

FIG. 2 is a block diagram of an apparatus that may be configured to detect and/or diagnose a vehicle malfunction in accordance with an example embodiment of the present disclosure;

FIG. 3 is a block diagram of a system that may be configured to determine a remedial measure for a vehicle malfunction in accordance with an example embodiment of the present disclosure;

FIG. 4 is an example communication network used by example embodiments of the present disclosure;

FIG. 5 is an example application network, such as the one shown in FIG. 4, which may be incorporated into an example embodiment of an apparatus according to the present disclosure;

FIG. 6 is a flowchart of the operations included in the vehicle apparatus distribution in accordance with an example embodiment of the present disclosure;

FIG. 7 is a flowchart of the operations included in the registration of a vehicle apparatus with an apparatus in accordance with the present disclosure;

FIG. 8 is a flowchart of the operations included in the policy onboarding process for the apparatus in accordance with the present disclosure;

FIG. 9 is a flowchart of the operations performed by or in connection with the sensor circuitry of an example embodiment of an apparatus in accordance with the present disclosure;

FIG. 10 is a flowchart of the operations of an example system in accordance with the present disclosure;

FIGS. 11A and 11B are examples of the user interface during an example initial user registration process in accordance with the present disclosure;

FIGS. 12A and 12B are examples of the user interface during the registration of the vehicle apparatus in accordance with the present disclosure;

FIG. 13 is an example of the user interface confirming the registration of the policy information and hardware in accordance with the present disclosure;

FIG. 14 is an example of the user interface of a vehicle protection locker that a user would be able to view relating to their policy information in accordance with the present disclosure;

FIG. 15 is an example of the user interface when the sensor circuitry is in operation determining whether a malfunction is present in accordance with the present disclosure;

FIG. 16 is an example of the user interface during the selection of the mechanic or dealer that will be handling a service or repair in accordance with the present disclosure;

FIGS. 17A and 17B are examples of the user interface notifying the user of a service appointment in accordance with the present disclosure;

FIG. 18 is an example of a remedial measure presented on a user interface in accordance with the present disclosure;

FIG. 19 is an example user registration process on a user interface in accordance with the present disclosure;

FIG. 20 is an example menu of a non-transitory computer-readable storage medium executed comprising instructions executable on an apparatus in accordance with the present disclosure;

FIG. 21 is a Wi-Fi hotspot interface in accordance with an embodiment of the present disclosure;

FIG. 22 is a roadside assistance interface in accordance with an embodiment of the present disclosure;

FIG. 23 is an emergency contact interface in accordance with an embodiment of the present disclosure;

FIG. 24 is a policy import process in accordance with an embodiment of the present disclosure;

FIG. 25 is a support interface in accordance with an embodiment of the present disclosure;

FIGS. 26A and 26B are an example tutorial in accordance with the present disclosure;

FIG. 27 is an example dealer interface for a user registration process in accordance with the present disclosure;

FIG. 28 is an example protection locker interface for a vehicle extended protection plan in accordance with the present disclosure;

FIG. 29 is an example protection locker interface for a pre-paid maintenance plan in accordance with the present disclosure;

FIG. 30 is a flow chart illustrating the operations of a flexibly scaling monitoring system in accordance with an embodiment of the present disclosure;

FIG. 31 is a flow chart of the simplified operations of the flexibly scaling monitoring system in accordance with an embodiment of the present disclosure;

FIG. 32 is flow chart illustrating the operations of car specific maintenance diagnostics in accordance with an embodiment of the present disclosure;

FIG. 33 is flow chart illustrating the operations of an incentive mechanism based on the car specific maintenance diagnostics in accordance with an embodiment of the present disclosure;

FIG. 34 is a flow chart of the simplified operations of car specific maintenance diagnostics in accordance with an embodiment of the present disclosure;

FIG. 35 shows an example graphical user interface depicting a map within a home screen interface in accordance with an embodiment of the present disclosure;

FIG. 36 shows an example home screen interface including a user dashboard in accordance with an embodiment of the present disclosure;

FIG. 37 shows an example home screen interface including a user dashboard in accordance with an embodiment of the present disclosure;

FIGS. 38-40 show example maintenance data interfaces of a home screen interface in accordance with an embodiment of the present disclosure;

FIGS. 41-42 show an example user home screen including a home screen interface in accordance with embodiments of the present disclosure;

FIG. 43 shows an example home screen interface with a device offline indication in accordance with an embodiment of the present disclosure;

FIGS. 44-45 show an example home screen interface with a vehicle customization interface in accordance with some embodiments of the present disclosure;

FIGS. 46-48 show an example navigation interface of a home screen interface configured to, for example, navigate a user to a maintenance location in accordance with some embodiments of the present disclosure;

FIGS. 49-53 show examples of a home screen interface presenting vehicle status and diagnostic data in accordance with some embodiments of the present disclosure;

FIG. 54 shows an example of a home screen interface presenting a theft protection program information page in accordance with an example embodiment of the present disclosure;

FIG. 55 shows an example of a home screen interface presenting a factory warranty information page in accordance with an example embodiment of the present disclosure;

FIGS. 56-69 show an example of a home screen interface defining a vehicle scan animation in accordance with an example embodiment of the present disclosure; and FIGS. 70-84 show an example of a home screen interface defining another vehicle scan animation in accordance with an example embodiment of the present disclosure.

DETAILED DESCRIPTION

Various embodiments of the present disclosure are directed to apparatuses, methods, computer-readable storage media, and systems for monitoring and maintaining vehicle condition. In this regard, embodiments may digitally determine the type and extent of malfunction and then prepare a remedial measure to remedy said malfunction. The monitoring also includes providing reminders and/or scheduling maintenance appointments for user. In addition, in some embodiments, the policy information for a given vehicle may be determined. In this regard, the information provided by the dealer, user, or otherwise may not be complete and therefore the present disclosure allows for said terms to be determined based on the partial terms provided. The term "protection data object" refers to vehicle protection information other than a manufacturer warranty. Examples of vehicle protection information included in a protection data object may be vehicle extended protection plan information, insurance plan information, GAP insurance plan information, tire and wheel coverage plan information, prepaid maintenance plan information, and/or the like.

Overview

Embodiments of the present disclosure include improved apparatus, systems, and methods for diagnosing and repairing a vehicle malfunction. As described herein, a vehicle and user may have numerous coverage policies that protect some or all of the vehicle in the event of a malfunction. In some embodiments, the apparatuses, systems, and methods disclosed herein may include hardware and software in the vehicle that generate signals indicative of a vehicle malfunction. The signals may be identified as a particular vehicle malfunction, and the system, apparatus, and methods may correlate the vehicle malfunction with one or more coverage policies to improve performance of the vehicle and its components, reduce unnecessary diagnostic tests and equipment, and minimize the processing requirement for the user, which along with the costs may deter repairing the malfunction and result in an unsafe vehicle.

In some embodiments, an onboarding process is provided which generates a user profile, including vehicle, vehicle sensor, and policy data. In some embodiments, the systems, apparatus, and methods described herein may receive a partial dataset corresponding to one or more of the above identified data. In such embodiments, the systems, apparatus, and methods may extrapolate the partial dataset into a complete dataset to complete the data. In some embodiments, one or more of the user, vehicle, vehicle apparatus, and policy may be identified and captured via still image (e.g., scan or camera capture), converted into computer readable form, and onboarded as part of the data described herein.

FIG. 1: Subscriber Device Architecture

Referring now to FIG. 1, a block diagram of a subscriber device that may be specifically configured to determine and/or retrieve policy information in accordance with an example embodiment is provided. Subscriber device 10 may be embodied by or associated with any of a variety of computing devices that include or are otherwise associated with a device configured for managing the maintenance of a vehicle. In some embodiments, the subscriber device itself may be embodied or partially embodied as a mobile terminal, such as a personal digital assistant (PDA), mobile telephone, smart phone, personal navigation device, smart watch, tablet computer, camera or any combination of the aforementioned and other types of voice and text communications systems. The subscriber device 10 may be a fixed computing device (e.g., fixed within a vehicle, a building, or a remote structure).

Optionally, the subscriber device may be embodied by or associated with a plurality of computing devices that are in communication with or otherwise networked with one another such that the various functions performed by the subscriber device may be divided between the plurality of computing devices that operate in collaboration with one another.

The subscriber device 10 may include, be associated with, or may otherwise be in communication with a processing circuitry 12, which includes a processor 14 and a memory device 16, a communication interface 20, and a user interface 22. In some embodiments, the processor 14 (and/or co-processors or any other processing circuitry assisting or otherwise associated with the processor) may be in communication with the memory device 16 via a bus for passing information among components of the subscriber device. The memory device 16 may be non-transitory and may include, for example, one or more volatile and/or non-volatile memories. In other words, for example, the memory device 16 may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the subscriber device to carry out various functions in accordance with an example embodiment of the present invention. For example, the memory device could be configured to buffer input data for processing by the processor. Additionally or alternatively, the memory device could be configured to store instructions for execution by the processor.

The processor 14 may be embodied in a number of different ways. For example, the processor 14 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 14 may be configured to execute instructions stored in the memory device 16 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The subscriber device 10 of an example embodiment may also include or otherwise be in communication with a user interface 22. The user interface 22 may include a touch screen display, a speaker, physical buttons, and/or other input/output mechanisms. In an example embodiment, the processor 14 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 16, and/or the like). The user interface may be embodied in the same housing as the processing circuitry. Alternatively, the user interface may be separate from the processing circuitry 12, such as a mobile phone. For example, the user interface may be a part of a mobile device with the processing circuitry located remotely communicating through a network.

The subscriber device 10 of an example embodiment may also optionally include a communication interface 20 that may be any means such as a device or circuitry embodied in either hardware or a combination of hardware and software that is configured to receive and/or transmit data from/to other electronic devices in communication with the subscriber device 10, such as by near field communication (NFC) or other proximity-based techniques, such as Bluetooth. Additionally or alternatively, the communication interface 20 may be configured to communicate via cellular or other wireless protocols including Global System for Mobile Communications (GSM), such as but not limited to 4G, 5G, and Long Term Evolution (LTE). In this regard, the communication interface 20 may include, for example, an antenna (or multiple antennas) and supporting hardware and/or software for enabling communications with a wireless communication network. Additionally or alternatively, the communication interface 20 may include the circuitry for interacting with the antenna(s) to cause transmission of signals via the antenna(s) or to handle receipt of signals received via the antenna(s). In example embodiments, the communication interface 20 may receive and transmit data from nearby subscriber devices, such as the vehicle apparatus shown in FIG. 2. In some embodiments, the communication interface 20 may include a wired connection to one or more other computing devices, either directly or via a network. Additionally, the subscriber device 10 may be connected, or in communication with, one or more other subscriber devices in the present disclosure, such as FIGS. 1 and 3.

FIG. 2: Vehicle Apparatus

Referring now to FIG. 2, a block diagram of an apparatus 200, such as a vehicle apparatus, that may be configured to detect and/or diagnose a vehicle malfunction in accordance with an example embodiment is provided. Apparatus 200 may be embodied by or associated with any of a variety of computing devices that include or are otherwise associated with a device configured for managing the maintenance of a vehicle. In some embodiments of the apparatus, the apparatus itself may be embodied or partially embodied as a mobile sensor, such as an On-Board Diagnostic (OBD) receiver. The computing device may be a fixed computing device. In some embodiments, portions of the vehicle apparatus 200, such as the processing circuitry 220 may be a part of the apparatus shown in FIG. 1. For example, a sensing circuitry 290 may provide a mobile phone with information that the processing circuitry 12 of the subscriber device 10 (e.g., a mobile phone), the vehicle apparatus 200, and/or one or more servers uses to determine a type of malfunction. In some embodiments, at least a portion of the apparatus 200 may be distinct from, but in communication with the apparatus of FIG. 1 and/or the system of FIG. 3.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 200 may include, be associated with, or may otherwise be in communication with a processing circuitry 220, which includes a processor 240 and a memory device 260, a communication interface 280, a sensing circuitry 290. In some embodiments, the apparatus 200 may include an optional diagnosis circuitry 210 for processing the sensor data as described herein. In some embodiments, another device may process the sensor data as descried herein. In some embodiments, the processor 240 (and/or co-processors or any other processing circuitry assisting or otherwise associated with the processor) may be in communication with the memory device 260 via a bus for passing information among components of the apparatus. The memory device 260 may be non-transitory and may include, for example, one or more volatile and/or non-volatile memories. In other words, for example, the memory device 260 may be an electronic storage device (for example, a computer readable storage medium) comprising gates configured to store data (for example, bits) that may be retrievable by a machine (for example, a computing device like the processor). The memory device 260 may be configured to store information, data, content, applications, instructions, or the like for enabling the apparatus to carry out various functions in accordance with an example embodiment of the present disclosure. For example, the memory device 260 may be configured to buffer input data for processing by the processor 240. Additionally or alternatively, the memory device 260 may be configured to store instructions for execution by the processor 240.

The processor 240 may be embodied in a number of different ways. For example, the processor 240 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 240 may be configured to execute instructions stored in the memory device 260 or otherwise accessible to the processor. Alternatively or additionally, the processor 240 may be configured to execute hard coded functionality. As such, whether configured by hardware or software methods, or by a combination thereof, the processor 240 may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor 240 to perform the algorithms and/or operations described herein when the instructions are executed. However, in some cases, the processor 240 may be a processor of a specific device (for example, the computing device) configured to employ an embodiment of the present invention by further configuration of the processor by instructions for performing the algorithms and/or operations described herein. The processor 240 may include, among other things, a clock, an arithmetic logic unit (ALU) and logic gates configured to support operation of the processor.

The apparatus 200 of an example embodiment may also optionally include a communication interface 280 that may be any means such as a device or circuitry embodied in either hardware or a combination of hardware and software that is configured to receive and/or transmit data from/to other electronic devices in communication with the apparatus, such as by near field communication (NFC) or other proximity-based techniques, such as Bluetooth. Additionally or alternatively, the communication interface 280 may be configured to communicate via cellular or other wireless protocols including Global System for Mobile Communications (GSM), such as but not limited to 4G, 5G, and Long Term Evolution (LTE). In this regard, the communication interface 280 may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some embodiments, the communication interface 20 may include a wired connection to one or more other computing devices, either directly or via a network. In example embodiments, the communication interface may receive and transmit data from nearby apparatuses, such as the vehicle apparatus shown in FIG. 2.

The apparatus 200 of an example embodiment may also include a sensing circuitry 290 that may be any means such as a device or circuitry embodied in either hardware or a combination of hardware and software that is configured to detect and generate data indicative of a vehicle malfunction. In some embodiments, the sensing circuitry 290 may be part of the vehicle circuitry (e.g., user vehicle 440 shown in FIG. 4) and may generate and output diagnostic data (e.g., malfunction information) to a connected device or system (e.g., to the vehicle apparatus 430 shown in FIG. 4), either via wired connection (e.g., to a vehicle apparatus, such as an OBD sensor) or wirelessly (e.g., to a local or cloud network). In some embodiments, the sensing circuitry 290 may be embodied as an OBD receiver that connects to the OBD port on a standard vehicle to generate diagnostic data from the car's internal sensors. In some embodiments, the OBD port and receiver may refer to an OBD-II port and connector used in most modern vehicles. Alternatively, the sensing circuitry 290 may include another type of On-Board Diagnostics (e.g., OBD-I) or non-OBD sensing circuitry configured to detect and generate diagnostic data regarding a vehicle.

In some embodiments, vehicle sensors (e.g., vehicle sensors 324 shown in FIG. 3) may interpret events and/or operations from the vehicle and send data to a vehicle computing apparatus (e.g., vehicle computing apparatus 320 shown in FIG. 3, such as an engine control unit ("ECU")). Data collected and/or processed by the vehicle computing apparatus may then be available via OBD or embedded technology (e.g., Bluetooth, cellular radio, or the like). With reference to FIG. 2, in some embodiments, the apparatus 200 may receive data from the vehicle computing apparatus (e.g., vehicle computing apparatus 320 shown in FIG. 3), and the sensing circuitry 290 may be part of the vehicle computing apparatus or the apparatus 200. The sensing circuitry 290 may process the sensor data and cause transmission of data indicative of a vehicle malfunction from the vehicle (e.g., via embedded radio or via wired connection, such as via an OBD apparatus 200). In some embodiments such as those not incorporating an OBD function, the apparatus 200 may be the vehicle computing apparatus or may be integrated with the vehicle computing apparatus to cause the transmission of the data to a communication network, such as the communication circuitry 308 in FIG. 3. The sensing circuitry 290 may be powered by the vehicle itself.

The sensing circuitry 290 may then provide the information relating to the vehicle malfunction to diagnosis circuitry 210, the processor 240, or to another apparatus, via the communication interface 280, to have the type of repair needed for the vehicle be determined based upon the malfunction. The information provided by the sensing circuitry 290 may vary based on the complexity of the sensors and sensing circuitry, and the vehicle. For example, in some embodiments, the sensing circuitry 290 may include or receive data from an OBD database comprising predefined associations between OBD error codes and vehicle malfunctions (e.g., all vehicles from one manufacturer may use the same distinct error codes). In some embodiments, the sensing circuitry may only receive an indication that a malfunction in a certain area of the vehicle has occurred. In some embodiments, the sensing circuitry 290 may process raw data received from one or more vehicle sensors and output one or more OBD signals. In some embodiments, the OBD receiver may also include varying degrees of complexity that may affect the precision of the malfunction type detection. In some embodiments, raw data or predefined error codes may be transmitted from the sensing circuitry of the apparatus 200 to another device for processing. In some embodiments, the OBD receiver may receive varying amounts of vehicle information based on the type of vehicle attached (e.g., different vehicles may use different OBD protocols). For example, the OBD protocol used by a vehicle may be SAE J1850 pulse-width modulation ("PWM"), SAE J1850 variable pulse width ("VPW"), ISO 9141-2, ISO 14230 ("Keyword Protocol 2000"), or ISO 15765 controller area network ("CAN"). Example sensor inputs to the sensing circuitry may include any sensor on a vehicle, such as an engine speed sensor, mass air flow sensor, oxygen sensor, manifold absolute pressure sensor, fuel temperature sensor, spark knock sensor, voltage sensor, or the like. Similarly, the sensing circuitry may be configured to generate The apparatus 200 of an example embodiment may also include a diagnosis circuitry 210 that may be any means such as a device or circuitry embodied in either hardware or a combination of hardware and software that is configured to detect and/or determine the cause of a vehicle malfunction based upon the data provided by the sensing circuitry. In some embodiments, the diagnosis circuitry 210 may further include maintenance-related and diagnostic-related data and trigger conditions, which may provide the diagnostic and maintenance functionalities described herein for both planned diagnostic events (e.g., mileage-based routine maintenance) and unplanned diagnostic events (e.g., OBD trouble codes). As used herein, "diagnostic" and "maintenance" information may be used interchangeably unless noted otherwise. In some embodiments, the sensing circuitry 290 may provide the information relating to the vehicle malfunction to the diagnosis circuitry 210 to have the type of repair needed for the vehicle be determined based upon the malfunction. In some embodiments, the diagnosis circuitry 210 may be a part of the processing circuitry 220, such as the processor 240. In some embodiment the diagnosis circuitry 210 may be separate from, but in communication with, the processing circuitry 220 (e.g., via a network, wireless, or wired connection, such as by accessing a server or cloud computing environment).

In some embodiments, the apparatuses of FIGS. 1 and 2 may share one or more components. For example, the processor 14 of FIG. 1 and the processor 240 of FIG. 2 may actually be embodied as the same processor or collection of processors.

In any of the various embodiments described herein, the vehicle apparatus may be a part of the vehicle (e.g., software, firmware, and/or hardware residing on an onboard computing system of the vehicle capable of facilitating the functionalities described herein, which may include an API or other means to retrieve the relevant data) or may be a separate device attached to the vehicle (e.g., an OBD device engaged with an OBD 2.0 port of the vehicle). Description of a vehicle and a vehicle apparatus may refer to portions of the same vehicle/apparatus or to distinct apparatuses.

FIG. 3: Computation System

Referring now to FIG. 3, a block diagram of a system that may be specifically configured to generate diagnostic data objects and, in some embodiments, determine a remedial measure for a vehicle malfunction in accordance with an example embodiment is provided. The system 300 may be used to perform some or all of the operations described herein with respect to FIGS. 1-2 and 4-5. In some embodiments, the system 300 may be configured to perform the operations and support the functionality described herein using the circuitry elements described herein.

As illustrated in FIG. 3, the system 300 may include at least one server 316 and at least one onboard sensing apparatus 318. The at least one onboard sensing apparatus 318 may be physically attached to or embedded in the vehicle. In some embodiments, the at least one onboard sensing apparatus 318 may include a vehicle computing device 320 (e.g., an ECU or other vehicle computing device) and one or more vehicle sensors 324. In some embodiments, the vehicle computing device 320 may comprises at least one processor 326 and at least one memory 332 (e.g., non-transitory computer readable medium) configured to retrieve, store, and process the functions and algorithms described herein. In some embodiments, the vehicle computing device 320 may comprise sensor circuitry 310 configured to perform the functions of the sensing circuitries described herein, which may include receiving one or more signals from the one or more vehicle sensors 324, processing the one or more signals in conjunction with the processor 326, and generating diagnostic data based upon the sensor signals in conjunction with the processor 326, which may diagnostic data include malfunction data objects. In some embodiments, the vehicle computing device 320 may comprise embedded communications circuitry 328 configured to transmit one or more of the diagnostic data objects representing diagnostic information to the at least one server 316 and/or to one or more other servers and user devices. In some embodiments, the vehicle computing device 320 may include input/output circuitry 330 for receiving inputs (e.g., signals from a user interface, diagnostic equipment, of the like) and transmitting outputs.

In some embodiments, the at least one onboard sensing apparatus 318 may include a vehicle apparatus 322, which may be configured to receive and collect the diagnostic data objects from the vehicle computing device 320. In various embodiments, the vehicle apparatus 322 may be integral to or in communication with the apparatus 200 discussed herein. The vehicle apparatus 322 may include at least one processor 334, at least one memory 340, input/output circuitry 338, and communications circuitry 336. In some embodiments, the vehicle apparatus 322 may operate in accordance with the description of embodiments of the apparatus 200 shown in FIG. 2 or apparatus 430 shown in FIG. 4. In some embodiments, the vehicle apparatus 322 may comprise an OBD receiver engaged with an OBD port (e.g., input/output circuitry) to receive diagnostic information. The vehicle apparatus 322 may transmit the diagnostic information (e.g., via communications circuitry 336) to the at least one server 316 for performing the operations described herein. In some embodiments, the communications circuitry 336 may additionally or alternatively transmit the diagnostic information to a user device or other local receiver. In some embodiments, the communications circuitry 336 may transmit the diagnostic information to a remote network location (e.g., a vehicle protection server 470, web content management server 460, provider server 420, and/or application network 480 described herein with respect to FIG. 4), and the at least one server 316 may retrieve the diagnostic information from the remote network location for further processing in accordance with any of the embodiments described herein.

In some embodiments, the at least one server 316 may include a processor 302, a memory 304, input/output circuitry 306, communications circuitry 308, diagnostic circuitry 312, repair circuitry 314, and/or OCR circuitry 305. In some embodiments, the system 300 may be configured to execute some or all of the operations described above with respect to FIGS. 1 and 2.

Although components of FIG. 3 are described in some instances with respect to functional limitations, it should be understood that the particular implementations necessarily include the use of particular hardware. It should also be understood that certain of these components 302-338 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the system should therefore be understood to include particular hardware configured to perform the functions associated with the particular circuitry as described herein. Various components of FIG. 3 may also be present in FIGS. 1 and/or 2.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the system 300 may provide or supplement the functionality of particular circuitry. For example, the processors 302, 326, 334 may provide processing functionality, the memories 304, 332, 340 may provide storage functionality, the communications circuitries 308, 328, 336 may provide network interface functionality, and the like.

In some embodiments, the processors 302, 326, 334 (and/or co-processor or any other processing circuitry assisting or otherwise associated with the processor) may be in communication with one or more of the memories 304, 332, 340 via a bus for passing information among components of the system. The memories 304, 332, 340 may be non-transitory and may include, for example, one or more volatile and/or non-volatile memories. In other words, for example, the memory may be an electronic storage device (e.g., a computer readable storage medium). The memories 304, 332, 340 may be configured to store information, data, content, applications, instructions, or the like, for enabling the system to carry out various functions in accordance with example embodiments of the present disclosure.

The processors 302, 326, 334 may be embodied in a number of different ways and may, for example, include one or more processing devices configured to perform independently. Additionally or alternatively, the processors 302, 326, 334 may include one or more processors configured in tandem via a bus to enable independent execution of instructions, pipelining, and/or multithreading. The processors 302, 326, 334 may be understood to include a single core processor, a multi-core processor, multiple processors internal to the system, and/or remote or "cloud" processors.

In an example embodiment, the processors 302, 326, 334 may be configured to execute instructions stored in the respective memories 304, 332, 340 or otherwise accessible to the processor. Alternatively or additionally, the processors 302, 326, 334 may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processors 302, 326, 334 are embodied as an executor of software instructions, the instructions may specifically configure the processor to perform the algorithms and/or operations described herein when the instructions are executed.

In some embodiments, the system 300 may include input/output circuitries 306, 330, 338 that may, in turn, be in communication with the respective processors 302, 326, 334 to provide output to the user and, in some embodiments, to receive an indication of a user input. The input/output circuitries 306, 330, 338 may comprise a user interface and may include a display and may comprise a web user interface, a mobile application, a client device, a kiosk, or the like. In some embodiments, the input/output circuitries 306, 330, 338 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor.

The communications circuitries 308, 328, 336 may be any means such as a device or circuitry embodied in either hardware or a combination of hardware and software that is configured to receive and/or transmit data from/to a network and/or any other device, circuitry, or module in communication with the system 300. In this regard, the communications circuitries 308, 328, 336 may include, for example, a network interface for enabling communications with a wired or wireless communication network. For example, the communications circuitries 308, 328, 336 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The sensor circuitry 310 may include hardware or a combination of hardware and software configured to detect the status of the vehicle connected therewith. In an example embodiment, the sensor circuitry 310 may be configured to receive data from one or more vehicle sensors 324 and generate diagnostic data objects. The sensing circuitry 310 may determine when a malfunction in the vehicle is occurring via the diagnostic data objects. The sensor circuitry may interface with the communications circuitry 328 to provide information relating to a vehicle's health to the server 316, remaining portions of system 300, or to servers and intermediate and end users. For example, the vehicle computing device 320 and/or the apparatus 322 may transmit data from the sensor circuitry 310 via the respective communications circuitry 328, 336 via cellular or other wireless protocols including Global System for Mobile Communications (GSM), such as but not limited to 4G, 5G, and Long Term Evolution (LTE). Additionally, or alternatively, the vehicle computing device 320 and/or the apparatus 322 may be configured to communicate using proximity-based techniques, such as by near field communication (NFC) or Bluetooth.

It should also be appreciated that, in some embodiments, the sensor circuitry 310 may include a separate processor, specially configured field programmable gate array (FPGA), or application specific interface circuit (ASIC) in addition to the processor 302 to detect devices on the network. The sensor circuitry 310 may therefore be implemented using hardware components of the system configured by either hardware or software for implementing these planned functions.

In some embodiments, the at least one server 316 may be configured to process the diagnostic data objects provided by the at least one onboard sensing apparatus 318 to assess and/or present the status of the vehicle to one or more users or networked computing devices. Based on the diagnostic information represented by the diagnostic data objects, the at least one server 316 may identify a malfunction in the vehicle and may prepare one or more remedial actions for resolving the malfunction.

In some embodiments, the at least one server 316 may include diagnostic circuitry configured to generate one or more malfunction data objects representing a malfunction. The diagnostic circuitry 312 may include hardware and/or software configured to determine the type of malfunction in a vehicle based on the information from the at least one onboard sensing apparatus 318. In some embodiments, the diagnostic circuitry 312 may further include maintenance-related and diagnostic-related data and trigger conditions, which may provide the diagnostic and maintenance functionalities described herein for both planned diagnostic events (e.g., mileage-based routine maintenance) and unplanned diagnostic events (e.g., OBD trouble codes). In some other embodiments, the diagnostic circuitry 312 and the sensor circuitry 310 may be embodied in the same apparatus, such as the apparatus 200 (e.g., the sensor circuitry 310 may be embodied as the sensing circuitry 290 and the diagnosis circuitry may be configured within the processing server 220).

In one embodiment, at least one onboard sensing apparatus 318 may transmit the diagnostic data objects to the diagnostic circuitry 312 (e.g., via the apparatus 322 such as an OBD receiver and transmitter). In some embodiments, the sensor circuitry 310 may transmit all information from a vehicle regardless of malfunction. For example, the OBD receiver, or other sensor circuitry, may not be configured to process or assess a malfunction and only transmits the diagnostic data objects (e.g., OBD codes) received from the vehicle computing device 320 to the diagnostic circuitry 312. Similarly, in embodiments using embedded communications circuitry, the vehicle computing device 320 may transmit the diagnostic data objects to the diagnostic circuitry 312 for further processing. In such cases, at least one onboard sensing apparatus 318 may transmit information to the diagnostic circuitry 312 continuously, intermittently, or otherwise. In some instances, the sensor circuitry, such as a non-OBD sensor circuitry, may, at least initially, make a determination of the cause of the malfunction.

In an example operation, the apparatus 322 may be installed into a vehicle and detects vehicle information from the vehicle computing device 320 (e.g., an OBD receiver may be plugged into the OBD port and reads information off the vehicle's ECU). In some embodiments, an installed OBD receiver may request data from the vehicle using On-board diagnostics Parameter IDs (PIDs). In an example embodiment, the data collected by the sensor circuitry 310 based on the data from the vehicle sensors 324 may be transmitted, either via OBD or otherwise, to the diagnostic circuitry 312. In some instances, the data may be received from the at least one onboard sensing apparatus 318 by a subscriber device, such as a mobile phone, via a proximity-based protocol, such as Bluetooth. In such an example the subscriber device may transmit the data further to the diagnostic circuitry 312, such as via a cellular connection, and/or process and display the diagnostic data locally to the user. In any of the foregoing embodiments, the data collected by the vehicle computing device 320 may be transmitted to the cloud via one or more network connections. The diagnostic circuitry 312 may access the data collected by the at least one onboard sensing apparatus 318, such as sensor circuitry 310, on the cloud, process and/or interpret the data, and then provide the information to the repair circuitry 314 in order for the repair circuitry 314 to determine a recommended remedial measure to the user, such as through a mobile application and/or desktop software.

In some embodiments, the diagnostic circuitry 312 may determine the type of malfunction (e.g., the diagnostic circuitry may determine that there is a problem in the engine). In some embodiments, the diagnostic circuitry may determine the malfunction in a more specific manner (e.g., the diagnostic circuitry may determine that a certain cylinder in the engine is not firing correctly). The diagnostic circuitry 312 may be configured to receive the diagnostic data objects in the form of an OBD code and translate the code into an identifiable malfunction. In some embodiments, the diagnostic circuitry 312 may be embodied as a part of the apparatus 200 shown in FIG. 2, such as the diagnosis circuitry 210. The diagnostic circuitry 312 may be in communication with one or more local or networked databases that may assist in the diagnosis of a malfunction. In some embodiments, the diagnostic circuitry 312 may be configured to include, or be in communication with, a third-party code translation platform. The third-party code translation platform may receive and translate the data collected by the sensor circuitry 310 to identify and determine a severity of the malfunction. Vehicles may generate similar diagnostic data objects or may have different protocols depending upon, for example, the make or model of the vehicle. The diagnostic circuitry 312 may be configured to output malfunction data objects or one or more other diagnostic data objects to the repair circuitry 314.

Although the processor 302 may be employed to perform diagnostics, it should also be appreciated that, in some embodiments, the diagnostic circuitry 312 may include a separate processor, specially configured field programmable gate array (FPGA), or application specific interface circuit (ASIC) to perform such tasks. The diagnostic circuitry 312 may therefore be implemented using hardware components of the system configured by either hardware or software for implementing these planned functions.

The repair circuitry 314 may include hardware and/or software configured to receive the malfunction data objects or one or more other diagnostic data objects and create one or more remedial measure for remediating a malfunction of the vehicle. The repair circuitry 314 may receive information including policy information, malfunction diagnosis, and the like. Based on the diagnosis made by the diagnostic circuitry 312, the repair circuitry may determine the type of repairs that may be needed (e.g., if a tire is low, the most common remedial measure may be to inflate the tire), and in some embodiments, the repair circuitry 314 may include AI including supervised learning models or other machine learning algorithms to process the diagnostic data objects (e.g., maintenance and/or malfunction data objects) in combination with the vehicle owner's vehicle protection policies, and other data, such as the vehicle location and customer preferences, to optimize and recommend one or more remedial actions. In some embodiments, diagnostic modeling and/or predictive analytics may be used to inform any one or more of the functions described herein.

If the remedial action is unsuccessful, a second repair may be suggested (e.g., if the tire remains flat, a replacement tire or patch service may be scheduled for the user). In some embodiments, the repair circuitry 314 may look at the vehicle's policy information to determine whether a malfunction may be covered as part of the determination of a remedial measure (e.g., by vehicle protection coverage and/or warranty coverage may be available to remedy the problem). For example, an engine malfunction may be covered by a manufacturer warranty, and the repair circuitry may determine and recommend that the warranty service be carried out by an automotive dealership (e.g., transmitting diagnosis and warranty information to the dealer to schedule a service). In some embodiments, the repair circuitry 314 may be configured to include, or be in communication with third-party APIs that provide, information relating to recommended remedial measures, such as the cost and/or time of repair, schedule openings with local repair shops, location data for the user and/or vehicle, user preferences, or the like. These inputs may be input into the AI (e.g., machine learning) model by the repair circuitry 314 to determine the one or more remedial measures.

In some embodiments, the repair circuitry 314 may still create a remedial measure for the vehicle regardless of the vehicle coverage. The determination of the remedial measure and/or an estimated cost for a potential remedial measure may be based on a combination of the average local dealer labor rate, average OEM part cost, average local independent dealer labor rate, and/or average non-OEM part cost. The user of the system 300 may be able to indicate the most important factors to them regarding potential repairs and bias the recommendation provided by the model. For example, a user may indicate they care about getting original equipment manufacturer (OEM) replacement parts, which may be more expensive than third-party replacements. Alternatively, the user may indicate to use the cheapest method of repair or the system 300 may select the cheapest method of repair (e.g., in an instance in which no warranty or insurance coverage is available). In some embodiments, the repair circuitry may have a predetermined approach to determining a remedial measure when there is not one inputted by a user. For example, only OEM parts may be used for repairs because the system is not configured to allow the user to select different repair strategies, or the user does not make a selection.

In some embodiments, the repair circuitry 314, in communication with the diagnostic circuitry 312, may provide the user with one or more remedial measures, the certainty for each one (how often a particular remedial measure resolves a malfunction), the severity of the issue, and the average repair cost in the user's local area. In some embodiments, the repair circuitry 314 may provide the user with one or more primary remedial measures, which are one or more recommended remedial measures based on the determination completed by the repair circuitry. In some embodiments, the repair circuitry 314 may be configured to allow a user to set filter options that may allow the user to select a primary remedial measure and/or alter the remedial measure options based on one or more factors, such as the price, distance, rating, dealers only, OEM parts, and the like (e.g., a user may indicate that the most important factor is speed of the remedial measure and the repair circuitry may then adjust the remedial measure options based on the average speed of repairs for each option).

The determination of the remedial measure may also include determining if the malfunction is covered by any of the policy information (e.g., an insurance or warranty coverage). In some embodiments, when the potential repairs for the malfunction have been identified, the system (e.g., via repair circuitry 314) may leverage the algorithms (e.g., the machine learning models) discussed herein to compare the coverage on one or more vehicle protection policies relative to the potential repairs. In some embodiments, the ranking of proposed remedial measures may be based on whether or not the remedial measure is covered by one or more vehicle protection policies, and in some embodiments, an indicator may be given next to remedial measures that may be covered, whether or not the ranking is affected by the existence of possible coverage. In some embodiments, if the algorithm is unable to determine whether a remedial action is covered, the system 300 may be configured to suggest contacting the user's preferred repair shop. In either event, a diagnostic report (e.g., including one or more malfunction data objects and/or other diagnostic data objects) and/or one or more vehicle protection policies may be transmitted to the repair shop of the user's choosing via the system 300 and/or the user device.

For example, the vehicle may have an extended non-OEM protection plan that covers one or more malfunctions. In some embodiments, the diagnosis may not be able to determine the exact malfunction and therefore the repair circuitry 314 may schedule an appointment to have the malfunction checked before proceeding to make a selection of the remedial measure. For example, some malfunctions may be covered, while other, similar malfunctions may not be covered and the determination of whether the malfunction is covered may be of interest to the determination of the remedial measure (e.g., a repair that is covered may not cost the user anything, while repairs that are not may be costly regardless of merits of one over the other).

The repair circuitry 314 may carry out at least a portion of the scheduling of the remedial measure independent of human interaction. For example, the system may schedule a maintenance appointment with a mechanic (e.g., the automotive dealer) or other preferred mechanic of the user. Additionally, based on the vehicle and/or the policy information, the repair circuitry 314 may set up preventive care for a vehicle, such as manufacturer recommended maintenance, safety recalls, and the like. As discussed in more detail below, the remedial measure may be presented to the user, who may either accept, reject, or alter a given remedial measure. In some embodiments, the system may be configured to provide the service provider chosen to complete a remedial measure with the information obtained relating to the malfunction, potential repairs, coverage information, and the like.

The repair circuitry 314 may perform these functions using processing circuitry, such as the processor 302. Although the processor 302 may be employed to perform repair scheduling functions, it should also be appreciated that, in some embodiments, the repair circuitry 314 may include a separate processor, specially configured field programmable gate array (FPGA), or application specific interface circuit (ASIC) to perform such tasks. The repair circuitry 314 is therefore embodied by either hardware or software for implementing these planned functions. As discussed herein, the at least one server 316 may comprise multiple servers, or may include one or more intermediate servers that directly interact with the at least one onboard sensing apparatus 318. For example, the diagnostic circuitry 312 and the repair circuitry 314 may be embodied in different physical devices, each with its own processing circuitry or sharing common processing circuitry, without departing from the scope of the present disclosure.

The OCR circuitry 305 may include hardware or a combination of hardware and software configured to incorporate optical character recognition (OCR) to convert images with printed or handwritten text into machine-encoded text. The OCR circuitry 305 may be further configured to identify and search one or more documents for predetermined fields using a trained model as described herein. The image(s) that are converted using OCR may be received from a user device or otherwise, such as a mobile phone camera. In some embodiments, the processor 302 may transmit instructions to the OCR circuitry 305 including the portions of a policy form that the OCR circuitry should convert into machine-encoded text. For example, the processor 302 may transmit instructions for the OCR circuitry to convert a portion of the first page of a policy form that the processor has determined, such as through communication with a database containing information about one or more vehicle protection plans, to have vehicle protection plan information relating to a user. In some embodiments, the OCR circuitry 305 may convert a partial dataset indicator for the processor 302 to determine the partial dataset and/or the complete dataset. For example, the OCR circuitry may determine the policy form number, which indicates the complete dataset (e.g., the policy form) that should be used in connection with the partial dataset. The hardware and/or software included in the OCR circuitry may also be included in other components, such as the processor 302.

As will be appreciated, any such computer program instructions and/or other type of code may be loaded onto a computer, processor or other programmable system's circuitry to produce a machine, such that the computer, processor other programmable circuitry that execute the code on the machine create the means for implementing various functions, including those described herein.

It is also noted that all or some of the information presented by example interfaces described herein can be based on data that is received, generated and/or maintained by one or more components of system 300. In some embodiments, one or more external systems (such as a remote cloud computing and/or data storage system) may also be leveraged to provide at least some of the functionality discussed herein.

FIG. 4: Communication Network Configuration

Referring now to FIG. 4, an example communication network within and through which embodiments of the present disclosure may operate is provided. The communication network 400 may be configured to communicate via wired or wireless protocols. Wireless protocols may include cellular or other wireless protocols including Global System for Mobile Communications (GSM), such as but not limited to 4G, 5G, and Long Term Evolution (LTE). Portions of the communication network 400 may be embodied by or in communication with a system and/or apparatus, such as the systems and apparatuses of FIGS. 1-3.

As shown in FIG. 4, the vehicle apparatus 430, the provider server 420, the vehicle protection server 470, the web content management server 460, the application network 480, and the user device 450 may be connected to an example embodiment of the communication network 400. In some embodiments, as described herein, the user vehicle 440 may be connected directly to the network via embedded communications circuitry. The vehicle apparatus 430, as discussed throughout may include an OBD receiver, which connects to the OBD port in a vehicle 440, or another sensing circuitry configured to generate information related to the performance and/or operation of the vehicle. In some embodiments, one or more intermediate servers (not shown) such as a server of a hardware provider may be implemented in the network to receive and/or transmit data to facilitate the methods and systems herein. In some embodiments, at least some of the diagnostic data objects (e.g. GPS or fuel level) may be processed by one or more of the intermediate servers to be presented to a user (via interface) without further processing. In some embodiments, the servers selectively provide information to the user (e.g. alerts when something is wrong).

In some embodiments, a provider server 420, as shown in FIG. 4, may be connected to the communication network 400. The provider server 420 may be maintained by the provider of the application to the user. In some embodiments, the provider server may give information relating to one or more of a user's policy. For example, the provider may be an insurance company and may provide information about the insurance policy of the vehicle. The provider server 420 may also provide information relating to customer service, warranty information, protection data objects, customer information, and vehicle information.

In some embodiments, a vehicle protection server 470, as shown in FIG. 4, may be connected to the communication network 400. As discussed further in reference to FIG. 10, the vehicle protection server 470 may receive and store information related to one or more vehicle protection policies. In some embodiments, the vehicle protection server may be at least a part of the server 316 shown in FIG. 3, such that the vehicle protection server 470 may be configured to generate some or all of the diagnostic data objects, malfunction data objects, and/or remedial measures according to the platform described herein. The vehicle protection server 470 may be configured to transmit protection data objects, the protection data objects indicative of one or more vehicle protection policies including non-OEM vehicle protection policy information and/or warranty information for a vehicle. In some embodiments, warranty information may be transmitted by a manufacturer and stored on any of the servers or memories disclosed herein. The non-OEM vehicle protection policy includes any policy that may relate to a vehicle other than a warranty provided by the OEM. Example of vehicle protection plans include insurance policies, GAP insurance plans, vehicle extended protection plans, tire and wheel protection, and the like. In an example embodiment, the vehicle protection server may store and recall scans of one or more policies relating to the vehicle. In some embodiments, the vehicle protection server 470 may include one or more third-party software provider servers that are licensed by a dealer, independent repair shop and/or a range of other service providers (e.g., a paint-less dent removal network) to provide policy information (e.g., via API call). For example, the vehicle protection server 470 may use a third-party platform, such as a Dealer Management System or an F&I (Finance and Insurance) Menu Platform to obtain information relating to a policy. In some embodiments, the vehicle protection server may also be in communication with other servers that store and transmit policy information. For example, a manufacturer server 530 may store information relating to a vehicle warranty when a vehicle is purchased and there may not be any forms for the server 316 to use to determine the policy information as discussed herein.

In some embodiments, the vehicle protection server 470 may comprise one or more servers of a vehicle protection program provider (e.g., a provider of the policy and/or repair recommendation system described herein), and may be the same physical server as or part of a group of servers that include any one or more of the other servers described herein, including the provider server 420, web content management server 460, and/or application network 480.

In some embodiments, the user, manufacturer, or a third party may cause all or a portion of one or more policies to be loaded onto the vehicle protection server 470, which may then be in communication with the communication network 400. In an example embodiment, the vehicle protection server 470 may be connected to a device controlled by the user or a third party such as a dealer in accordance with the subscriber device 10 of FIG. 1 (e.g., one or more apparatuses may import (e.g., scan, download, retrieve, or the like) one or more policy documents and determine the content of one or more policies from at least a partial data set). In some embodiments, the vehicle protection server 470 may be in communication with the communication network 400 through the application network 480.

In some embodiments, a web content management server 460, as shown in FIG. 4, may be connected to the communication network 400. The web content management server 460 may be provided to assist the formation of the application and/or website to be used with the present disclosure and to connect other applications of the application network 480 with the user on the application platform (e.g., coupon and promotion providers, repair companies, etc.). In an example embodiment, the information relating to the vehicle policy information and sensory data may be provided to the web content management server in order to be delivered to subscribers (e.g., vehicle users) in an effective manner. In some embodiments, users may receive information from the platform and system described herein, and may transmit information from one or more third parties, such as a provider of one of the vehicle protection products or a third party, to the user.

In some embodiments, a user device 450, as shown in FIG. 4, may be connected to the communication network 400. The user device 450 may be any device that allows the user to interact with the functionality of the present disclosure as described, for example, with respect to the apparatuses and systems of FIGS. 1-3. In some embodiments, the user device 450, may be a mobile terminal, such as a personal digital assistant (PDA), mobile telephone, smart phone, personal navigation device, smart watch, tablet computer, camera or any combination of the aforementioned and other types of voice and text communications systems. In some embodiments, the user device 450 may be embodied as or in communication with the subscriber device 10 described in FIG. 1. In some embodiments, the user device 450 may be a stationary computing device, such as a desktop computer, that allows the user to access the functionality of the present disclosure.

In some embodiments, the vehicle apparatus 430, as shown in FIG. 4, may be connected to the communication network 400. Additionally, the vehicle apparatus may be connected to the user vehicle 440. In some embodiments, the vehicle apparatus 430 may be embodied as the apparatus 200 of FIG. 2. The connection between the vehicle apparatus and the user vehicle may be through a dedicated connection (e.g., the OBD port of a vehicle). In some embodiments, the vehicle apparatus may be connected to the OBD port or other sensors of the vehicle wirelessly (e.g., the vehicle may provide information to the vehicle apparatus through a Bluetooth connection or other embedded technology, such as a cellular connection). As discussed in reference to FIGS. 2 and 3, the vehicle apparatus 430 may be configured to detect and/or diagnose a vehicle malfunction. The detection and/or diagnosis may then be transmitted to other portions of the system through the communication network 400.

FIG. 5: Application Network Configuration

Referring now to FIG. 5, an example application network 480, such as the one shown in FIG. 4, is provided, which shows examples of servers and associated APIs that may interact during the processes described herein. The provider, subscriber, and/or dealer devices and servers may interact with the application network to coordinate and/or suggest one or more remedial measures. The servers connected to the application network is an example of the servers connected at a given time. In various embodiments, some or all of these servers may be connected. In some embodiments, additional servers may be present. In some embodiments, there may be multiple servers for the same function. For example, there may be a plurality of auto parts servers based on the apparatus being in communication with a plurality of auto part providers. In some embodiments, the servers may be dedicated, while others may provide multiple functions. In some embodiments, the servers connected to the application network 480 in FIG. 5 may be directly connected to the communication network 400. Additionally, in some embodiments, one or more of the components and servers connected to the communication network 400 in FIG. 4 may be connected to the application network 480.

In some embodiments, the servers connected to the application network 480 may allow for an apparatus to provide the user with information including payment methods (e.g., credit card server 500), road side assistance (e.g., road side assistance server 520), repair costs (e.g., auto parts server 540), location-based services (e.g., map server 550), voice assistance (e.g., voice recognition server 570), Wi-Fi Hotspots (e.g., cellular server 580), carrier advertisements (e.g., cellular server 580), discounts and coupons (e.g., discount server 560), warranty information (e.g., manufacturer server 530), technology and billing support (e.g., billing server 590), and user support (e.g., support server 595). Additional servers not shown may also be in communication with the application network 480. In some embodiments, additional servers may assist the apparatus in determining coverage levels, remedial measures, or the like. In some embodiments, additional servers may allow the user to more effectively use the system including, for example, accessing additional third-party services.

FIG. 6: Distribution Flowchart I

As an initial matter, FIGS. 6 through 10 show example operations of various stages of the present disclosure. These operations may be completed in conjunction with one or more other operations. Alternatively, these operations may be completed independent of one another. Additionally, operations not shown may also be completed in accordance with the present disclosure. As these are only example operations, it should be understood that these are not exhaustive operations and that various other steps may be used in accordance with the present disclosure. Additionally, the operations of the below Figures may be performed by, for example, the subscriber device 10 of FIG. 1, the apparatus 200 of FIG. 2, and/or the system 300 of FIG. 3. Additionally, the operations of FIGS. 6 through 10 may be performed by, or in communication with, the networks of FIGS. 4 and/or 5. Therefore, the operations of FIGS. 6 through 10 should be not construed to limit the scope of the present disclosure.

Referring now to FIG. 6, a flowchart of the distribution operations in accordance with an example embodiment is provided. Referring now to Block 600 of FIG. 6, a vehicle apparatus, such as the vehicle apparatus 200 shown in FIG. 2, is configured by having a non-transitory computer-readable storage medium and one or more computer program products associated with a connected processor, such as the processor 240. The program relates to the operation of the sensing circuitry 290 and the interaction with the other apparatuses in the system. In some embodiments, the installation may include an operating system. At Block 610 of FIG. 6, the configured vehicle apparatus is designated for use by the system. In some embodiments, the designation may include providing an identifying feature for the vehicle apparatus. In an example embodiment, the designation may be a barcode. Alternatively, a serial number and/or other unique feature may allow for an apparatus to be registered by the system. The instructions for connecting a vehicle and associated apparatuses to the present apparatus may be provided physically and/or digitally.

Referring now to optional Block 620 of FIG. 6, the vehicle apparatus is provided to a vehicle dealer for incorporation into a vehicle. In an example, the dealer may sell the vehicle apparatus to a user at the same time the user purchases the vehicle and the vehicle apparatus may come preinstalled or may be installed by the dealer. Alternatively, a dealer may sell the vehicle apparatus after the user purchases a vehicle and the user may install the vehicle apparatus. In some examples, the user may purchase the vehicle apparatus directly from the provider, or at least independently of a vehicle dealer (e.g., purchase the vehicle apparatus at a big-box store and self-install the vehicle apparatus in the user's vehicle). In such a case, then Block 620 may be skipped and move directly to Block 630.

Referring now to Block 630 of FIG. 6, a user subscribes to the provider's service, which may include real time monitoring, Wi-Fi, and/or one or more additional vehicle protection policies (e.g., an extended vehicle protection plan, insurance protection, in-vehicle Wi-Fi access, etc.). At Block 640 of FIG. 6, the vehicle apparatus is installed into the user's vehicle or activated if already installed. In some examples, the installation may be completed by a third party, such as a dealer at the time of purchase, and the dealer may use an onboarding app, for example, to scan the vehicle apparatus and associated it with the user's account and/or vehicle. In other examples, the installation may be completed by the user. In some embodiments, the installation may include placing the OBD receiver into the vehicle's OBD port. Alternatively, there may be more complex installation processes depending on the vehicle apparatus used. Referring now to Block 650, the vehicle apparatus is now in the proper position to interact with the vehicle and detect malfunctions. The vehicle apparatus may be tested by the system to verify that the vehicle apparatus is functioning correctly. In some embodiments, the vehicle apparatus may interact with one or more vehicle apparatuses positioned on the vehicle (e.g. via the OBD port or other interface). In some embodiments, additional sensors may be installed to wiredly or wirelessly provide data to the vehicle apparatus.

In some embodiments, the dealer may install the vehicle apparatus into a vehicle before the user purchases the vehicle, such as when the vehicle apparatus is received from the manufacturer. Alternatively, the vehicle apparatus may be installed before the dealer receives the vehicle (e.g., the vehicle apparatus may be installed by the manufacturer). In an example embodiment where the vehicle apparatuses are installed before a user purchases the vehicle, the vehicle apparatuses may be able to track the vehicles in a dealer's inventory or during the transport of vehicle(s) from the manufacturer to the dealer. For example, a dealer may have a line of credit (e.g., a floorplan) that requires the financier to check on the inventory and the vehicle apparatus may be configured to allow the financier to monitor the inventory remotely and/or to reconcile vehicles that may be showing in the inventory despite already being sold.

FIG. 7: Initial Registration Flowchart II

Referring now to FIG. 7, a flowchart of the operations included in the registration of a vehicle and user to be used in an example embodiment is provided. In some embodiments, the registration may be carried out by or between any of the computing apparatuses, systems, and/or networks described with respect to FIGS. 1-5. For example, in one embodiment, the registration may occur between a user device or third-party device and the system 300 of FIG. 3 or the vehicle protection server 470 or provider server 420 of FIG. 4. Referring to Block 700 of FIG. 7, as discussed above in reference to FIG. 6, a user may subscribe to the provider's service. In some embodiments, the provider may receive a subscription information including user-specific identifying information and/or details regarding the purchased services. In some embodiments, the provider may receive subscription indication comprising a signal that an identified or unidentified user has subscribed to the services, providing additional data regarding policy registration and onboarding, and some or all of the details of the user's policy data may be determined as described in the processes herein. Additionally, the subscription indication may include information including the registration service information, device registration information, data service activation information, application download notifications, and onboarding notifications. The subscription information may be transmitted to the provider at the time the user purchases a vehicle or at a later time. The operations of FIG. 7 may be completed in conjunction or independent of the operations of FIG. 6, with regard to time. For example, the registration operations may occur simultaneously with the installation of the vehicle apparatus into the vehicle.

At Block 710 of FIG. 7, the apparatus, such as the subscriber device 10 shown in FIG. 1, includes means, such as the communication interface 20, for receiving the vehicle apparatus information for a user's vehicle. In some embodiments, the registration of the vehicle may be at least partially processed by the subscriber device (e.g., a mobile phone or the like). In some embodiments, the registration of the vehicle may be sent to a third-party server (e.g., a provider server) via the sensing and sensing circuitry or by one or more other network communications circuitry in the vehicle. In such embodiments, the user may register an account with the provider to associate the vehicle with their user profile data. In some embodiments, the apparatus may use the vehicle apparatus information to determine which vehicle apparatus to connect to during operation and associate with the subscription profile of the user. For example, multiple OBD receivers may be in use in different vehicles across a network, or in proximity to one another, and the registration information may allow an apparatus to connect to the specific OBD receiver connected to the user's vehicle. The vehicle apparatus information may be manually entered into the apparatus, such as using the user interface 22. Alternatively, the vehicle apparatus information may be obtained remotely, such as through a pairing operation (e.g., a vehicle apparatus may be paired to a connected phone using a cellular connection). In some embodiments, the client device may be registered and/or assigned to a user account based on a device identifier, such as a phone number. For example, a phone number may be assigned to a certain account and the user's account syncs with the system when a user logs into the mobile application on a mobile phone with the related phone number. In some embodiments multiple apparatus may be linked to a client (e.g., an agency providing fleet vehicle services) for viewing and tracking of each fleet vehicle and the associated policy and diagnostic information associated therewith.

Referring now to Block 720 of FIG. 7, the apparatus, such as the subscriber device 10 shown in FIG. 1, includes means, such as the communication interface 20, for receiving data associated with at least one policy information form (e.g., subscription to the monitoring, diagnostic, and repair system described herein). The reception may be in the form of a scan, such as by a camera, to import an image of the policy information form into the apparatus. In some embodiments, the reception may be an electronic transmission of an electronic form (e.g., either electronically generated or an electronic file representing a paper form). In some embodiments, the data associated with the at least one policy information form may be captured and/or generated by the customer's device (e.g., a mobile phone or the like) and may be processed locally or transmitted to a server or other computing device (e.g., the provider's server) via the network. In some embodiments, the data associated with the at least one policy information form may be captured and/or generated by a third-party device, such as a dealer computing device or a computing device in or on the vehicle (e.g., any of the computing apparatuses, systems, and/or networks described with respect to FIGS. 1-5).

The policy information form may be a portion of a policy document containing data related to the user (e.g., subscriber) and one or more associated policies (e.g., insurance, warranty, protection data objects, etc.), or may be another indicator. In an example embodiment, a predetermined set of template policy information forms may be stored in the apparatus or accessed by the apparatus via a network. In some embodiments, the policy information form may contain a dataset indicator, such as an ID number, QR code, RFID code, or the like.

The policy information form may comprise user-specific data and generic policy data. In some embodiments, the generic policy data may be extrapolated from the identification of the policy information form without requiring the generic policy data to be captured in each instance. For example, there may be a base warranty length for a certain vehicle brand (e.g., 5 years or 50,000 miles) that may be inferred by the apparatus unless explicitly stated otherwise. The data associated with at least one policy information form may be a partial dataset referenced in relation to FIG. 8. For example, the data may comprise a partial (e.g., incomplete) dataset identifying some, but not all, of the data from the policy information form. These operations are discussed in more detail in relations to FIG. 8 below.

In various embodiments, the policy information form may be generated by and received from a dealer (e.g., captured by a dealer imaging device, such as a camera, when the user purchases the vehicle). Additionally or alternatively, the user may input the policy information form themselves either by electronically capturing and/or transmitting the data or portions thereof (e.g., electronically entering the data associated with the policy information form). In some embodiments, a dealer apparatus and the user apparatus may both capture data associated with the at least one policy information form. For example, the dealer may capture and/or input information relating to the manufacturer warranty, while the user may then capture and/or input information relating to an insurance policy. In some embodiments, the dataset indicator may be a barcode, or other type of indicator of one or more terms. For example, a user vehicle may include a standard manufacturer warranty, and the policy information form may include an indicator that alerts the apparatus that it applies to a certain vehicle.

Referring now to optional Block 730 of FIG. 7, the apparatus, such as the subscriber device 10 shown in FIG. 1, includes means, such as the memory device 16, for storing the information received in Blocks 710 and 720. The information may be stored for later use relating to the other operations detailed herein, including the policy onboarding and for subsequent viewing by the user. The data may be stored locally, for example in the user device or within the vehicle computing apparatus described herein. In some embodiments, the data may be additionally or alternatively stored remotely, such as in the provider server, or the other servers discussed herein, for coordinating the data and presentation to the user. The information may be stored in the form received or in another form based on a transformation by the apparatus. Referring now to Block 740 of FIG. 7, the operations performed allow for the policy onboarding process, such as shown in FIG. 8, to take place.

FIG. 8: Policy Onboarding Flowchart III

Referring now to FIG. 8, a flowchart of the operations included in the policy onboarding process for the system, such as the devices shown in FIGS. 1-5, is provided. In some embodiments, policy onboarding and the calculations associated therewith may be performed by or between any of the computing devices described with respect to FIGS. 1-5. Referring now to Block 800 of FIG. 8, the apparatus, such as the subscriber device 10 of FIG. 1, apparatus 200 of FIG. 2, or computation system 300 of FIG. 3, includes means, such as the processing circuitry 12, the processor 14, communication interface 20 or the like, for receiving a partial dataset comprising a partial dataset indicator associated with at least one type of dataset. The partial dataset indicator may comprise data capable of identifying the policy information form from which the terms of the form may be extrapolated (e.g., the generic terms described above). As discussed above, in some embodiments, the dataset may be the data associated with a policy information form discussed in reference to FIG. 7. The partial dataset may further include the user-specific data described herein. In some embodiments, the partial dataset may comprise a captured image of one or more pages of a policy information document. For example, in some embodiments, the first page of the policy information document may be captured with a user's phone camera or scanner. In some embodiments, the partial dataset may comprise a captured image of user-specific-information-containing pages of a policy information document.

In some embodiments, all of the necessary partial dataset(s) (e.g., warranty and protection data objects) may be obtained at the time the user purchases the subscription service and onboards into the system. For example, the warranty information may be obtained from a manufacturer server and the protection data object for one or more vehicle protection plans may be imported or retrieved in response to a user (or other third party) indication that the user is subscribed to one or more plans. In some embodiments, one or more partial dataset may be obtained at a later time than the time the user purchases the subscription service. For example, the user may purchase a vehicle protection plan after purchasing a vehicle and subscription and the client device associated with the user may transmit the one or more scanned pages of the vehicle protection plan at a time proximate to when the vehicle protection plan is purchased. Additionally, there may be subsequent information, such as vehicle information or customer information, which can be used to verify the information obtained from the partial dataset(s).

The apparatus of an example embodiment may be configured to recognize certain types of datasets. For example, the recognized datasets may include policy information relating to various policy types including an insurance policy, a manufacturer warranty, an extended vehicle protection plan, a GAP insurance plan, a tire and wheel coverage plan, or a prepaid maintenance plan. The recognition (e.g., steps 800-850 in FIG. 8) may comprise a categorization of the policy form (e.g., which type of policy is involved) as well as a calculation of the specific policy terms in the document. In some embodiments, the dataset may be captured using optical character recognition (OCR) technology, discussed in more detail below.

The systems and apparatuses described herein may extrapolate the partial dataset into a complete dataset as described herein. The partial dataset may include a partial dataset indicator which enables the apparatuses and systems described herein to determine a complete dataset template (e.g., a template corresponding to the partial dataset, which may include data not represented in the captured partial dataset). The complete dataset template may include a predetermined template of a policy form, which may be used to supply generic data fields from the template to complete the partial data set. For example, a GAP insurance policy may have a predetermined template from which the system may extrapolate and determine non-captured policy information to generate a complete dataset including both the partial dataset and the remaining template information missing from the partial dataset. The complete dataset may include the complete dataset template and the user-specific information captured from the partial dataset.

In some embodiments, the partial dataset indicator may be a portion of the actual complete dataset. For example, the first page of a policy information form may be scanned and provided to the apparatus and the fields, style, shape, and other identifying characteristics, which may be input into a machine learning model to identify the complete dataset template. In some embodiments, the partial dataset indicator may be a designated proxy for the complete dataset template. For example, there may be a barcode, QR code, RFID code, or the like designated for a "standard" manufacturer warranty. In some embodiments, the partial dataset indicator may provide information relating to a database containing the complete terms of the dataset (e.g., at least the complete generic terms of the predetermined template dataset). For example, the partial dataset indicator may be an identification number used to interface with a policy provider's database (e.g., the identification number may allow the apparatus to pull information directly from the internet automatically).

In some embodiments, the apparatus, such as the subscriber device 10 of FIG. 1, includes means, such as the processing circuitry 12, the processor 14, or the like, for transforming a scanned picture including text into a machine-encoded text. In an example embodiment, the transformation may be completed using optical character recognition (OCR) technology. OCR involves converting images with printed or handwritten text into machine-encoded text. The digitization of the text allows for an apparatus to complete the comparison discussed below in relation to block 820. In some embodiments, the entire partial dataset may be converted using OCR. Alternatively, only portions of the partial dataset may be converted using OCR. For example, only certain portions of the policy paperwork may contain useful information and converting the entire provided document may be unnecessary.

In some embodiments, the apparatus (e.g., apparatus 100 shown in FIG. 1 and/or the at least one server 316 shown in FIG. 3) may employ one or more OCR algorithms (e.g., via OCR circuitry 305 shown in FIG. 3), which include AI or another machine learning model trained to identify specific fields in specific locations in the partial dataset (e.g., fields on the front page or first few pages of a captured policy document image). In some embodiments, the apparatus that comprises OCR algorithm and model may be configured to scan for entries in one or more specific areas of a page and transmit the scanned information in them (e.g. policy forms) to the system. In some embodiments, the apparatus may be configured to search for character strings that contain certain characters and transmit the string to the system (e.g., driver's license, such as the state and/or license number). Additionally or alternatively, the apparatus that comprises OCR technology may be configured to capture barcodes (e.g., barcode scanning devices).

In some embodiments, the captured image comprising a partial dataset of the policy document may be transmitted from the user device or third-party device to a server (e.g., the at least one server 316 shown in FIG. 3, or one of the servers of FIG. 4). The server may then apply the OCR model to the partial dataset to extract one or more relevant fields. For example, in one embodiment, a dealer representative may capture images of the policy documents during onboarding at the dealership, or the user may capture the images themselves.

In some embodiments, the OCR circuitry may operate in multiple stages. In some embodiments, a first stage (e.g., Block 820 in FIG. 8) of the OCR algorithm and model may be configured to scan for a dataset identifier, such as an identification number or other indicia on the partial dataset that identifies the type of dataset (e.g., the type of form, policy, or vehicle protection program). In some embodiments, the OCR algorithm and model may be configured to search a one or more certain areas of the first page in known locations of dataset identifiers. In such an example, the apparatus using OCR may be configured to communicate with memory, such as the memories 16, 304, that contains information about policy forms based on identification number (e.g., a database may contain a GAP policy form and an identification number associated with the GAP policy form).

In a second stage (e.g., Block 830 of FIG. 8), the OCR model and algorithm may extract the remaining partial dataset from the captured image using the trained model to identify the location and nature of the data in the partial dataset (e.g., the model may be trained to recognize a GAP insurance form and identify the location of the customer name, policy number, etc. on the form through supervised learning with a training set), which may vary between forms. The text identified by the AI described herein may be converted into digital data by one or more OCR algorithms, such as matrix matching (e.g., pattern recognition) or feature extraction.

In some embodiments, the apparatus may be configured to merge the data extracted from the partial dataset with policy information contained in the whole datasets (e.g., certain pages of a policy information may be uniform across all policies using the same form) as shown in Block 840 of FIG. 8. The policy documents may then be available to the system (e.g., system 300 shown in FIG. 3) for determination of remedial measures and the policy documents may be made available to the user in a protection locker or "digital glovebox" that allows quick access to necessary vehicle and user documents (e.g., Block 850 of FIG. 8).

In some embodiments, the apparatus may receive an input from the user or other third party, such as through the user interface 22, which indicates certain information about a policy. For example, the user may manually enter the identification number associated with the policy form before the apparatus uses OCR circuitry to capture the policy information from the policy form type indicated by the user. In some embodiments, the user inputting the policy information (e.g., the dealer or user) may be prompted to enter and/or verify information relating to the policy being scanned. For example, there may be a plurality of different policies that use a similar form and a manual input may be necessary to determine the policy type between the different types in order to onboard the policy correctly (e.g., an automotive dealer employee may have to select between a lease and conventional purchase when onboarding a GAP insurance plan for a user). In some embodiments, some or all of a partial dataset may be captured and/or imported from a dealer document management system.

In some embodiments, the OCR circuitry of the apparatus may be configured to recognize and allow for the uploading of other information relating to the protection locker. For example, the apparatus may receive information relating to receipts for repairs, expiration dates of policies, driver license information, or the like. In one example workflow of the above-described embodiments, the user may open a provider application on their user device; the user selects to add a document/receipt/policy to their protection locker; the user allows the app to use their camera and they take a picture; the apparatus (e.g., the user device or a server or third-party device) uses OCR circuitry to scan the image in order to identify the form and extract certain information such as the date, description, place of purchase, city/state, cost, etc. In some embodiments, the user may be permitted to manually add or edit information in the protection locker.

Referring now to Block 810 of FIG. 8, the apparatus, such as the subscriber device 10 of FIG. 1 or the server 316 of FIG. 3, includes means, such as the processing circuitry 12, the processor 14, or the like, for providing at least one complete dataset indicator. In an example embodiment, there may be policy information templates that correspond to predetermined generic datasets (e.g., predetermined forms may be approved for use). The completed dataset indicator may indicate which portions of a partial dataset contain user specific and generic policy information. For example, the terms and limitations may always be in a specific box on the front page of a policy information form. The complete dataset indicator may be compared with the captured, partial dataset indicator to determine if the policy information form represented by the partial dataset is the same as the template represented by the complete dataset template. For example, the complete dataset indicator may be an identification number and/or barcode that is compared to the identification number and/or barcode of the partial dataset indicator, such as the dataset identifier described above with respect to the multistage process. The complete dataset template may be in a predetermined template dataset comprising the generic terms of a form used for a particular policy type.

Referring now to Block 820 of FIG. 8, the apparatus, such as the subscriber device 10 of FIG. 1, includes means, such as the processing circuitry 12, the processor 14, or the like, for comparing the partial dataset indicator and at least one of the at least one complete dataset indicator to identify the complete dataset template to which the partial dataset corresponds (e.g., so that the terms of the partial dataset may then be extrapolated). The completed dataset indicator used in the comparison may be the same type or category as the partial dataset. In some instances, there may be multiple acceptable forms that may be used for a given policy and then the comparison may be completed using all said forms to determine which form corresponds with the partial dataset indicator. In other embodiments, there may be no initial indication of the possible forms from the partial dataset indicator and the comparison may include every complete dataset indicator available. In some embodiments, the comparison may be based on similarities between the partial and complete dataset indicators. For example, a threshold amount of similarity between the partial dataset and complete dataset template may indicate that the same form is being used for both indicators.

Referring now to Block 830 of FIG. 8, the apparatus, such as the subscriber device 10 of FIG. 1, includes means, such as the processing circuitry 12, the processor 14, or the like, for determining at least one of the one or more terms of the partial dataset. The determination may be based on the comparison of the partial dataset indicator and the complete dataset indicator. For example, the similarities between the partial dataset indicators and the complete dataset indicators may allow for the partial dataset to be determined. In an example embodiment, the comparison will indicate the type of dataset (e.g., the form used for a given policy). For example, the comparison may indicate that the partial dataset is related to a GAP insurance plan. In such a case, a GAP insurance plan may have a specific form that is used, and the system determines the form used based on the indicator. The apparatus may use the OCR technology discussed herein to transform the partial dataset into computer-readable form. In some embodiments, the OCR may allow the apparatus to identify the partial dataset indicator (e.g., by allowing the apparatus to interpret the partial dataset indictor in the text of the dataset). In some embodiments, the partial dataset indicator may already be computer readable (e.g., a barcode). In such embodiments, the OCR may be used in addition to a separate partial dataset indicator based on the typical locations that the information is located, as provided by the complete dataset template. In other words, the complete dataset indicator may provide a template for the location of useful information on a given form. For example, the first page of a GAP insurance plan may include the user's name, vehicle information, plan scope and term, and the like, in various portions of the first page of the form. In such a case, the complete dataset indicator may indicate that the GAP insurance scope and term are always in a specific area of the GAP insurance's first page, and the OCR may identify the terms on the first page of the dataset.

In some embodiments, the type of dataset may indicate certain terms for the partial dataset. For example, there may be a law, or standard practice, of including certain terms for certain types of policy (e.g., a GAP insurance provider may always include a standard level of coverage with a GAP insurance plan). In such cases, the information need not be included in the partial dataset in order to be determined by extrapolation from the identified complete dataset template to generate the complete dataset. Additionally, the partial dataset may also provide information that allows the apparatus to gain access to a database containing information. For example, the partial dataset may include information that allows the apparatus to communicate with a database that contains more terms or information relating to a user's policy. For example, the partial dataset indicator may provide a user identification code or number that allows the apparatus to access a third-party database containing the complete dataset template and/or user-specific information that is not included in the partial dataset or that was not read from the partial dataset.

Referring now to Block 840 of FIG. 8, the apparatus, such as the subscriber device 10 of FIG. 1, includes means, such as the processing circuitry 12, the processor 14, or the like, for deriving policy information data for a user (e.g., user-specific data) based on the one or more terms of the partial dataset. In some embodiments, the policy information data may include the user-specific portions of the partial dataset, the complete dataset template of the identified form, and/or other policy information related to the user and/or vehicle. In some embodiments, the policy information data may be a combination of more than one partial and/or complete datasets from different sources. For example, the policy information may include information relating to an insurance policy, a manufacturer warranty, an extended vehicle protection plan, a GAP insurance plan, a tire and wheel coverage plan, and/or a prepaid maintenance plan. For example, in some embodiments, the first page of the manufacturer's warranty may include an insurance policy number, which may then be retrieved from the provider server in response to the policy number's capture in the partial dataset. In some embodiments, additional policy information data may be derived from a second partial dataset using the same processes outlined above. These additional partial datasets may be associated with a particular user and/or vehicle to determine a comprehensive policy coverage for the user and/or vehicle (e.g., such data may be collected in a policy "protection locker" as described herein). In some embodiments, some of the policy information data may be predetermined or entered independent of the operations of FIG. 8. For example, the user may be able to indicate the terms of a specific warranty independent of the operations of FIG. 8. Additionally, in some embodiments, the policy information may be, at least initially, assumed by the apparatus and requested to be confirmed by the user and/or policy provider. For example, a certain warranty may be uniform across the same make and/or model for a given year (e.g., all cars of a certain brand may have a 5 year/50,000 miles warranty) unless the manufacturer, dealer, or the like indicates a deviation to the apparatus (e.g., purchase of an extended vehicle protection plan).

In some embodiments, as discussed in more detail below in reference to FIG. 14, the policy information may be stored in a protection locker associated with a particular user, a particular vehicle, or the like, wherein a user can check to see what coverage exists and information relating to said coverage, such as term, limitations, and the like.

Referring now to Block 850 of FIG. 8, the apparatus, such as the subscriber device 10 of FIG. 1, includes means, such as the processing circuitry 12, the processor 14, or the like, for causing the transmission of the policy information for use by an application (e.g., policy information may be transmitted to the user's device protection locker through the application network 480 shown in FIGS. 4 and 5) on the user device (e.g., the user's mobile phone or other computing device). The policy information may include one or more terms of a policy determined using an apparatus of the present disclosure. The transmission may be completed using the communication network 400, as shown in FIG. 4. Said policy information may be used in the operations of FIG. 9.

Additional Examples of Operations Related to FIG. 8

In an example set of operations, related to FIG. 8, a dealer may use the system during the onboarding process by uploading scans of one or more pages (e.g., first page) of one or more policy documents. In such an example, the system, using OCR circuitry, may be configured to capture a form identification number from the first page of the one or more policy documents that the system matches with one or more policy forms through communication with a database. In such cases, the system may then have the necessary information to use OCR circuitry to determine the contents of the rest of the pages being scanned based on the form type (e.g., the system may be able to get information such as the policyholder name and policy identification number from certain areas of the first page of a policy) and combine it with the standard information that is uniform across a specific form type. The policy information received from the OCR process combined with the additional standard information may be stored in a vehicle protection locker associated with the user's vehicle and may be accessible to the user through a subscriber device.

In some embodiments, the OCR technology may also be used to allow users to upload other protection related documents and receipts to be stored in the vehicle protection locker. In such an example, the system may be configured to identify expiration dates associated with insurance cards, driver's licenses, vehicle protection plans, and/or the like. In some embodiments, the user may be able to approve, reject, or alter the information uploaded. Additionally or alternatively, the user may be able to manually enter the information. Data may also be imported from third-party databases, such as a dealer's management server.

FIG. 9: Sensory Operation Flowchart IV

Referring now to FIG. 9, a flowchart of the operations performed by or in connection with the sensor circuitry of an example embodiment of an apparatus and system is provided. Referring now to Block 900 of FIG. 9, the apparatus, such as the components of the system 300 of FIG. 3, includes means, such as the communications circuitry 308 or the like, for receiving the policy information data associated with a user's vehicle. In some embodiments, some or all of the sensory operation calculations may be done on the vehicle computing apparatus. In some embodiments, some or all of the sensory operation calculations may be done on the user device. In some embodiments, some or all of the sensory operation calculations may be done on a server (e.g., the provider server). In some embodiments, the sensory operation and related calculations may be done by or between any of the apparatuses, systems, and/or networks described with respect to FIGS. 1-5. In some embodiments, the policy may be provided by an apparatus, such as the subscriber device 10 shown in FIG. 1. In some embodiments, the policy information data may be stored in a server or networked location for retrieval. In some embodiments, the policy information may be stored locally in a user apparatus or vehicle computing apparatus. Additionally, some or all of the policy information may be inputted into an apparatus, such as the system 300 shown in FIG. 3, such as manually inputted by a user via the input/output circuitry 306.

Referring now to Block 910 of FIG. 9, the apparatus, such as the components of the system 300 of FIG. 3, includes means, such as the processor 302 or the like, for receiving a signal comprising diagnostic data objects, which may be processed to include malfunction data objects relating to a type of malfunction from data captured by sensors at the user's vehicle. The term "malfunction" may refer to diagnostic data objects of either a planned (e.g., scheduled maintenance intervals or triggers) or unplanned (e.g., OBD trouble code) nature. In various embodiments, the type of signal may depend on the type of vehicle apparatus used to detect and/or determine the malfunction (e.g., OBD error codes determined from onboard vehicle apparatuses, or raw data from one or more sensors on the vehicle). In some embodiments, the signal may be received over a wireless connection, such as a cellular connection (e.g., 4G, 5G, or LTE) or proximity-based connection (e.g., NFC or Bluetooth). In some embodiments, the signal may be provided from the apparatus, such as through the diagnostic circuitry 312. In such cases, the diagnostic circuitry may be connected to the processor 302 and the like through a wireless or a wired connection.

In some embodiments, the received signal may comprise a predetermined data format. For example, the vehicle apparatus may include an OBD receiver, which receives information from a vehicle through said vehicle's OBD port. The OBD port may transmit "trouble codes" that include one letter indicating the general area of the malfunction with four digits providing additional, more precise information about the malfunction. In such a case, the OBD standard includes four different parts of a vehicle indicated by a letter; these parts include the Powertrain (P), the Body (B), the Chassis (C), and the network (U). The digits then provide additional information about the malfunction in these parts. Therefore, an apparatus, such as the system 300 shown in FIG. 3, may be configured to determine the malfunctions relating to said codes. The apparatus may further be configured to identify which policy(ies) of the policy information data apply to the given malfunction (e.g., as part of the remedial measure).

In some embodiments, the diagnostic data objects may have varying amounts of information relating to the type of malfunction for the vehicle. In some cases, the signal may have basic information relating to the general location of malfunction, the estimated severity, or the like. Alternatively, the signal may have more complete information relating to the specific malfunction (e.g., a bent valve in one of the cylinders). In some embodiments, the signal relating to the malfunction may come directly from the vehicle or user device. In some embodiments, the signal relating to the malfunction may be transmitted from an intermediary (e.g., a network server, such as a manufacturer server) with or without additional processing (e.g., a server may determine one or more malfunctions from the vehicle data and transmit the signal related to the malfunctions that includes additional information related to the malfunction). As discussed in more detail below, the amount of data provided in the signal affects the ability of the apparatus to make accurate recommendations relating to repairs. The accuracy of the estimation may be directly related to the sophistication of the vehicle apparatus used to detect the malfunction and the amount of processing used to identify the malfunction. As discussed above, for vehicle computing devices 320, the level of specificity in the type of malfunction depends at least on the computing device, the sensor capabilities, and the OBD standard employed by an individual vehicle.

Referring now to Block 920 of FIG. 9, an apparatus, such as the system 300 of FIG. 3, includes means, such as the repair circuitry 314 or the like, for determining a remedial measure for the vehicle based on the terms of the policy information and the type of malfunction. A remedial measure may be any steps taken by an apparatus in an attempt to repair, mitigate, or otherwise remedy and/or prevent a vehicle malfunction. In some embodiments, the remedial measure may also be based on the current location of the vehicle as received by one or more positioning sensors on the vehicle or on a user device in or near the vehicle (e.g., a GPS receiver). For example, a malfunction may require immediate repair and therefore getting to a specific dealer may not be plausible. In some embodiments, there may be default repair providers, such as mechanics, dealers, or the like. For example, the dealer that sells the vehicle to the user may be the default service provider. In some embodiments, the user may be able to set their preferred repair methods, including the type of repairs (e.g., complete or minimum repair level), who does the repair (e.g., level of care or type), the speed of repairs (e.g., who has appointments available), preferred service provider, and/or the like. In some embodiments, the remedial measure may be related to the policy information and the level of coverage available for the malfunction (e.g., a user may be promptly notified that a malfunction is covered under warranty, so that the maximum repair may be undertaken).

In an example embodiment, the type of repairs made may be determined by the user. For example, for lower value vehicles, a user may only want the minimum amount of repairs to make the vehicle operational, while a user with a higher valued vehicle may want a complete repair using OEM parts and high rated mechanics. In some embodiments, the user may be able to indicate the preferred level of repairs. Alternatively, the system 300 may be configured to provide a remedial measure with a certain level of repairs regardless of user input (e.g., a repair must use OEM replacement parts).

In some embodiments, the user may also be able to determine which mechanic or dealership does the repairs to the vehicle. For example, the user may only want a certified mechanic (e.g., such as a mechanic certified to work on the specific brand of the vehicle) to work on the vehicle. In some embodiments, the user may be able to identify, via an apparatus such as the user device, one or more requirements for a mechanic to be selected. For example, the user may be able to set a minimum customer rating, a maximum cost, a minimum certification level, and/or the like. The user may select one or more preferred mechanics that are given preference during the selection process.

In some embodiments, the speed of repairs may be a deciding factor in determining the remedial measure. For example, the malfunction of the vehicle may preclude the vehicle from being drivable and therefore immediate repairs may be necessary. In such a case, the other preferences (e.g., using a certain dealership) may be ignored due to the speed in which repairs is needed. Alternatively, the user may indicate that the speed of repair is not the most important factor (e.g., the user has multiple vehicles to drive). In some embodiments, the speed of repair may be considered in conjunction with the mechanic cost and/or qualifications.

Referring now to Block 930 of FIG. 9, the apparatus, such as the system 300 shown in FIG. 3, includes means, such as the communication circuitry 308, the repair circuitry 314, or the like, for scheduling a repair for the type of malfunction observed. The scheduled repair may depend on the specificity of the diagnosis by the apparatus and the user's selections or preferences for the apparatus and policies. For example, in one embodiment where the apparatus only identifies a general cause (e.g., something in the transmission), the scheduled repair may only be a check-up until an exact cause is found. In some embodiments, the diagnosis may be specific enough (e.g., a specific part of the transmission is broken), allowing the apparatus to schedule a replacement, including potentially ordering the necessary parts. In some embodiment, the apparatus may be connected to one or more scheduling services for mechanics or dealerships. In some embodiments, there may be one or more mechanics and/or dealerships that are registered with the apparatus, allowing the apparatus to quickly make recommendations and/or appointments. In other embodiments, the scheduling of appointments may be completed through the internet (e.g., for mechanics and/or dealership that already allow online appointments). In some embodiments, the user may indicate one or more preferred mechanics, who may or may not allow the apparatus to schedule appointments. In such cases, the apparatus may provide the user the contact information (e.g., phone number) for the mechanic and/or dealership with specific instructions relating to the vehicle's malfunction (e.g., the apparatus may tell the user that the engine is misfiring so that the user can notify the mechanic).

In some embodiments, the apparatus may provide a prompt to the user requesting authorization to connect the user with a repair provider or to request authorization to schedule a repair.

In some embodiments, the vehicle malfunction information may be provided to a service provider, such as a mechanic, a dealer, or a manufacturer, who may facilitate repairs with the user either automatically or in response to a user indication (e.g., Block 920 of FIG. 9). In some embodiments, the user may provide an indication of a service provider to transmit the malfunction information to when a malfunction is detected. Alternatively, there may be a default service provider to which the apparatus transmits the malfunction information such that the service provider may follow up proactively. For example, if a vehicle is still under manufacturer warranty, the apparatus may transmit the malfunction information to the manufacturer or a delegated dealer, who may coordinate the repairs.

In various embodiments, the amount of information relating to the vehicle malfunction provided to a service provider may vary. For example, in some cases, the service provider may receive a notification that a vehicle needs an appointment with no additional information and in some cases, the service provider may receive information relating to the type of malfunction, the user's schedule, or otherwise. In some embodiments, the system may contact the service provider and have the service provider set an appointment time without any required input from the user, as discussed above. Alternatively, the user may be prompted to choose from a one or more appointment times and/or verify a potential appointment time. In some embodiments, the vehicle malfunction information may be transmitted to a plurality of service providers to determine the recommended remedial measure. In such cases, the system may receive information from one or more of the service providers including availability of appointments, estimates of time and/or cost, level of expertise, or the like.

In some embodiments, as part of Block 930 in FIG. 9, the system may be configured to coordinate additional services beyond scheduling a repair when a vehicle malfunction is detected. For example, the apparatus may be configured to, either automatically or at the prompt of a user, reserve alternative transportation for the some or all of the estimated duration of the repairs. The types of alternative transportation that may be scheduled through the apparatus may include ride sharing, a rental vehicle, a loaner vehicle, or similar transportation. In some embodiments, the apparatus may recommend one or more transportation solutions based on the estimated time to complete the repairs and/or a user's typical vehicle usage. For example, the apparatus, such as the processing circuitry 12, 302, may be configured to determine whether it would be more cost-effective for the user to use a ride sharing service or rent a vehicle. The determination may include the average amount driven by the user, the estimated repair time of the user's vehicle, the user's preference, and/or the like. Additionally, the apparatus may be configured to determine if there are any additional methods the user could travel, such as whether the dealership repairing the user's vehicle having a loaner program. The cost of a loaner or other transportation may be factored into the remedial actions described herein, such that, in one example, a more expensive service at an automotive dealership that has a loaner program may be cheaper than another service provider that requires the user to acquire their own transportation. In some embodiments, the apparatus may be configured to automatically schedule a method of transportation and may be configured to automatically facilitate payment. Alternatively, the user may be prompted to verify a method of transportation or choose from a plurality of substitute transportation options. In some embodiments, the apparatus may be configured to check the status of the vehicle repair with the service provider and update the alternative transportation as necessary (e.g., a repair may be taking longer than estimated and a rental vehicle may need to be extended).

Referring now to Block 940 of FIG. 9, the apparatus, such as the system 300 shown in FIG. 3, includes means, such as the input/output circuitry 306, the communication circuitry 308, or the like, for causing the transmission of a malfunction indicator to a user relating to the remedial measure for the vehicle. For example, a user operable application on the user mobile device may present one or more remedial measures, ordered or organized by cost, likelihood of success, or the like, on the interface of the user device. The malfunction indicator may be any notification that a malfunction is occurring. In some embodiments, the indicator may also provide information relating to the remedial measure according to any of the embodiments discussed herein. The user may be provided with the malfunction indictor through a user's registered device, such as a mobile phone. The indicator may also be provided to an in-vehicle infotainment system, such as a display screen. In some embodiments, the malfunction indicator may include at least one of the types of malfunctions, one or more recommended repairs, the appointment information for scheduled repairs, or the like. In some embodiments, the apparatus may include means for input from the user. For example, the user may be able to accept or decline the remedial measure. In some embodiments, the user may be able to choose between a plurality of repair options including the type of repair, the mechanic/dealership performing the repair, the cost of the repair, the speed of repair, or the like. For example, there may be options of repair presented to the user for "most cost effective," "most complete repair," "quickest repair," or the like. In some embodiments, the apparatus will choose an initial remedial measure and the user may be able to approve the remedial measure, cancel the remedial measure, or replace the remedial measure with a different remedial measure. For example, the apparatus may make an appointment to have the oil changed and the user may override said appointment, instead changing the oil themselves. Alternatively, the apparatus may not allow the user to interact with the malfunction indicator. For example, the apparatus may notify the user of the remedial measure, but not allow any changes from the user. In some embodiments, the malfunction indicator may comprise an indication that scheduled maintenance may be needed (e.g., the vehicle, user device, and/or network may report regular service intervals via the malfunction indicator). For example, the apparatus may, based on the vitals of the vehicle, such as miles, and the policy information, be required to get check-ups during certain intervals as to not jeopardize the vehicle's health or as a condition for a policy, such as a warranty.

Vehicle Information Management

In some embodiments, the vehicle apparatus described herein may be installed into a vehicle prior to purchase by the user. In such embodiments, the system (e.g., the application network 480 and one or more provider or dealer servers on the network) may associate the vehicle and vehicle apparatus with the dealership to allow the dealer to monitor and receive data related to each of the vehicles in its inventory. The vehicle apparatus may return diagnostic information regarding the vehicles to the dealer, which information may include the location and operational status of the vehicle. The tracking of vehicles using the sensor apparatus may begin as early as during the manufacturing of the vehicle (e.g., a factory may use the tracking information for work flow purposes or otherwise). In some embodiments, the vehicle apparatus may be an integral portion of the vehicle (e.g., embedded technology, such as GPS, cellular communication, or otherwise) and therefore may not require any specific installation before being operational.

In one example, automotive retailers who sell vehicles typically have a line of credit to finance their floorplan (i.e., inventory). Floorplan financing can be provided by a traditional bank or OEM Captive (e.g., Ford Motor Credit). In some instances, traditional inventory procedures may result in inconsistencies between the inventory on file with the dealer or lender on the one hand and the vehicles on the lot on the other hand. In some instances, this inconsistency may occur because a car is off the lot at that time or if it was sold and not reported to the bank. In embodiments of the present disclosure, the vehicle apparatus on each vehicle may provide automated reporting to the dealer, the lender, and/or a third party regarding the location and/or registration status of the vehicle. The automated reporting to the dealer may include alerts and/or notifications of status changes for the vehicle. The reporting may include allowing connected devices to visualize the information (related to inventory) and communicate with each other (e.g., to resolve discrepancies). In some embodiments, telematics (GPS) data and/or profile data associated with the vehicle may report the position and sale status of each vehicle.

In another example workflow, the dealer plugs in an apparatus, such as the OBD device described herein, into vehicles in their inventory, including those vehicles that are part of their floorplan financing. When a vehicle has been sold, the system 300 status for the vehicle is changed to "sold." The banking institution associated with the dealer and the dealer can access the system to track all vehicles that have been financed as part of the floorplan and have been sold or have not been sold, as well as see the location of each vehicle. In some embodiments, only the location of unsold vehicles may be displayed to third parties.

Diagnostic Modeling and Predictive Analytics: Machine Learning and AI and Other Modeling In some embodiments, diagnostic modeling and/or predictive analytics may be used to inform any one or more of the functions described herein. For example, the AI and machine learning according to the embodiments described herein will now be described. Machine learning is often used to develop a particular pattern recognition algorithm (i.e. an algorithm that represents a particular pattern recognition problem, such as the remedial measures and OCR functionality described herein) that is based on statistical inference. In some embodiments, the system (e.g., system 300) receives large quantities of signals from a variety of sources and must determine the remedial measures or correct fields of the correct form for the situation. In some embodiments, a "trained model" may be trained based on the algorithms and processes described herein, and trained models described herein may be generated using the processes and methods described herein and known in the art. The trained model may use an aggregated data set comprising information associated with one or more vehicles, subscribers, and/or other sources of information (e.g., third-parties). The aggregated data set used to train the model may be cleaned, for example, to remove outliers. The aggregated data set used to train the model may be reduced by selecting data which corresponds to a desired focus of the model (e.g., certain vehicles, certain types of subscribers, certain fault codes, or the like).

For example, a set of clusters may be developed using unsupervised learning, in which the number and respective sizes of the clusters is based on calculations of similarity of features of the patterns within a previously collected training set of patterns. In another example, a classifier representing a particular categorization problem may be developed using supervised learning based on using a training set of patterns and their respective known categorizations. Each training pattern is input to the classifier, and the difference between the output categorization generated by the classifier and the known categorization is used to adjust the classifier coefficients to more accurately represent the problem. A classifier that is developed using supervised learning also is known as a trainable classifier.

In some embodiments, content analysis includes a source-specific classifier that takes a source-specific representation of the content received from a particular source as an input and produces an output that categorizes that input as being likely to include a relevant data reference or as being unlikely to include a relevant data reference (e.g., likely or unlikely to meet the required criteria). In some embodiments, the source-specific classifier is a trainable classifier that can be optimized as more instances of content for analysis are received from a particular source.

In embodiments, analysis ends if the system determines that received content does not include at least one relevant data reference.

In embodiments, the system determines whether a referenced relevant data is already known to the system. In some embodiments, this determination is based on whether data representing the referenced relevant data is stored is a data repository. In embodiments, analysis ends if the system determines that a referenced relevant data already is known to the system.

If the system determines that a previously unknown relevant data is referenced within the content data, the system determines whether the content data quality needs verification. In some embodiments, the determination of whether particular content data quality needs verification is based in part on a confidence rating associated with the source that provided the content (e.g. received directly by the system, by a connected or related system, or from a secondary source). There are a variety of data quality signals upon which, alone or in combination, a source confidence rating may be based. For example, in some embodiments, the content provided by a server that specializes in notifications of relevant remedial measures or OCR functionality and that previously has published content that provided references to several sets of relevant data may not need further verification. In embodiments, if the system determines that the data quality of the received content does not need verification, data representing the referenced relevant data is stored in the data repository.

In embodiments, if the system determines that the data quality of the received content does need verification (e.g. untrustworthy data from an outside source), the system submits data representing the referenced relevant data for verification. Verification of a relevant data may be a manual process, an automatic process, or a combination. Verification of data quality may be based in part on attributes of the data (e.g. are the results similar to the subset of data collected by the system?), and/or on attributes of the received content (e.g. does the date indicate that this reference is stale?). In some embodiments, the system collects references to previously unknown data that were extracted from content received during a predetermined time period, (e.g. a week) and then submits the set of collected references for verification. Additionally or alternatively, in some embodiments, the system submits a relevant data reference for verification directly after identifying the reference within received content.

In embodiments, if the system determines that a reference to a previously unknown relevant data is verified, data representing the referenced relevant data is stored in the data repository.

In embodiments, a confidence rating is associated with each source that has provided content referencing a previously unknown relevant data. In embodiments, the system updates the confidence rating associated with the source that provided the reference to the relevant data based in part on the content data quality verification results. For example, in embodiments, the system may increase a confidence rating if the relevant data reference is verified and, conversely, the system may decrease a confidence rating if the relevant data reference is not verified. In another example, the system may increase a confidence rating if content received from a particular source is determined to include a relatively greater number of verified relevant data references than content received from other sources within a predetermined time period. In some embodiments in which the source is associated with a source-specific classifier, the confidence rating is based in part on a percentage of successful determinations that content includes a relevant data reference. The process ends after the system updates the confidence rating.

In some embodiments, the AI and models described herein use a "deep learning" module. Deep learning is a subset of machine learning that generates models based on training data sets provided to it. In some embodiments, the training model may use unsupervised learning techniques including clustering, anomaly detection, Hebbian Learning, as well as learning latent variable models such as Expectation—maximization algorithm, method of moments (mean, covariance), and Blind signal separation techniques, which include principal component analysis, independent component analysis, non-negative matrix factorization, and singular value decomposition.

In some embodiments, any other modeling technique may be used, such as statistical analysis of a given dataset. The modeling techniques may comprise gathering an aggregated device data set corresponding to a plurality of other vehicles. The data may be statistically analyzed for trends and to estimate the effects of one or more courses of action on a common problem or vehicle data set shared by a first vehicle and the aggregated vehicle data set. In some embodiments, any other modeling and/or statistical analysis technique known to a person of skill in the art, in light of the present disclosure, may be used.

As described herein, the apparatus, systems, and methods disclosed herein may employ diagnostic modeling and/or predictive analytics to identify existing diagnostic issues with a vehicle and/or predict future issues with a vehicle. The diagnostic modeling and/or predictive analytics system may further be configured to generate and facilitate transmission of one or more offers or recommendations to a user (e.g., incentives, promotions, diagnostic alerts or suggestions, or the like). For example, if a user is experiencing a fault or expected to experience a fault as determined by the diagnostic modeling and/or predictive analytics system (e.g., by retrieving a DTC from the vehicle or predicting a fault with the vehicle), the diagnostic modeling and/or predictive analytics system may predict a need for service and generate a discount incentive to cause the user to seek repair of their vehicle before the problem worsens. The diagnostic modeling and/or predictive analytics system may be configured to identify both planned and unplanned diagnostic trigger events. As described herein, the diagnostic modeling and/or predictive analytics system may comprise software, firmware, and/or hardware configured to facilitate the functions described herein. The diagnostic modeling and/or predictive analytics system may be embodied on one or more apparatus, which may interact with and/or receive information from the vehicle and one or more third parties (e.g., application network 480).

For predictive analytics, the methods described herein may be executed in advance of the occurrence of an actual issue or fault based on a future predicted issue or fault or other need or opportunity. For example, the predictive analytics system may determine that one or more faults will occur within an expected time period (e.g., a confidence interval based on a predicted lifespan). In some embodiments, the predictive analytics system may generate a maintenance offer (e.g., an incentive or promotion) based upon the expected time period for failure (e.g., if the system predicts that a component will fail in approximately 60 days, the system may make an offer to fix the fault that expires after 90 days).

A further use of the diagnostic modeling and predictive analytics systems described herein is intelligent risk determination based on vehicle and subscriber data. For example, in some embodiments, the system may calculate a risk associated with the subscriber and/or vehicle based upon one or more aggregated vehicle data sets. In some embodiments, a model may be trained using data associated with other vehicles and/or other subscribers to estimate the risk of failure for a vehicle and/or the expected payout from the program based on one or more failures. In some embodiments, the system may determine an intelligent quote or offer for one or more of the protection products described herein based on the predicted risk associated with a vehicle and/or subscriber based on any of the signals and inputs described herein (e.g., vehicle age, driving habits, DTC data, etc.).

In some embodiments, the diagnostic modeling and predictive analytics system may proactively execute a repair operation associated with one or more of the protection products based on a predicted or actual fault with the vehicle (e.g., an insurance claim may be proactively started based upon a detection of a fault or a predicted fault; a repair may be automatically scheduled based upon a detection of a fault or a predicted fault; or the like).

FIGS. 10-15: Example Operation

Referring now to FIG. 10, a flowchart of the operations performed by or in connection with the sensor circuitry of an example embodiment of an apparatus is provided. FIGS. 11 through 17 show example embodiments of various steps of FIG. 10 and other operations of the present disclosure, but are not to be construed as limiting, as the operations may be carried out in a different way. Additionally, FIGS. 11 through 17 are example user interfaces and are not the only way to display information of the present disclosure.

Referring now to Block 1000 of FIG. 10, an apparatus includes means for receiving initial registration information for the user. In some embodiments, the apparatus according to FIG. 10 may include one or more apparatuses, systems, and/or networks (e.g., servers or local devices) for making the determinations described herein (e.g., a provider server) as described herein with respect to FIGS. 1-5. An example embodiment of this process is shown in FIGS. 11A and 11B.

Referring to 11A, the user's policy information form agreeing to get the provider's service is scanned in using a mobile device. In some embodiments, the dealer who sells the user the service will scan the policy information form, as is shown here (e.g., "Joe" 1110). Alternatively, the user may scan their own policy information form. In an example embodiment, as shown, after scanning the initial service contract, the user (e.g., customer 1120 listed on FIG. 11B) has their information inputted from the provider policy and the policy type is identified. As discussed above, importation may be completed using OCR technology. As shown in the present example, the first page of a policy 1100 may be scanned by a mobile device camera. Additional or alternative pages of a policy may also be scanned. Alternatively, the scan could be imported from other locations, such as a traditional scanner. After the scanning and importation occurs, the information relating to the user and the policy are also imported. The initial provider policy information form may include user information including name, address, and/or phone number; vehicle information including make, model, and/or mileage; and the length and/or scope of the initial provider policy (e.g., a provider policy may be free for the first year with a new purchase). In some embodiments, the user may create and transmit profile data to the provider server, or other relevant computing device, to establish a profile, and the policy information form may be associated with the profile. In some embodiments, the system, via one or more computing devices, may automatically create a user profile based on information received and decoded (e.g., via OCR) from the policy information form. The process shown in FIG. 11A may be repeated for subsequent policies relating to an insurance policy, a manufacturer warranty, or other protection policy, such as a vehicle protection plan, a GAP insurance plan, a tire and wheel coverage plan, a prepaid maintenance plan, or the like. In some embodiments, the user may import subsequent policies through a subscriber device 10. As discussed in more detail above in relation to OCR, the protection locker may also store information, obtained though OCR or otherwise, that includes driver's license, insurance card information, receipts, vehicle owner's manuals, and other documents.

As shown in FIG. 11B, the user's name (e.g., John Smith 1120) and policy type (e.g., Pocket Drive 1130) may be confirmed based on the scanned policy. In an example embodiment, the dealer, or user, manually inputs one or both of these before scanning the policy. In some embodiments, a confirmation 1140 that the scan was successful may be provided. In some embodiments, the scanned policy document may be added to a protection locker as described herein. The protection locker may include the complete dataset of one or more policies (e.g., the user-specific data and the generic policy data from the policy information data related to the extrapolated policy information form).

In some cases, the scan may not be sufficient (e.g., the resolution of the scan was insufficient) and an error message may be provided. After the confirmation has been given, the apparatus may allow for subsequent policies to be added to the user's account. As discussed in more detail below, the aggregation of the policies is stored in a vehicle protection locker (e.g., the example protection locker shown in FIG. 14). All of this information may be saved to a user profile, based on the user's name, phone number, or other identifying qualities, such that the user, provider, dealer, and/or a third party (as appropriate) may retrieve the relevant policy information data associated with the user profile. The user profile may be created by a user or a dealer. Alternatively, the apparatus may create a profile, independent of human interaction, based on one or more user information traits, such as a phone number.

Referring now to Block 1010 of FIG. 10, an apparatus (e.g., one or more of the apparatuses, systems, and/or networks described with respect to FIGS. 1-5) includes means for receiving an initial registration information for the vehicle apparatus. An example embodiment of this process is shown in FIGS. 12A and 12B. In some embodiments, the sensor of the vehicle apparatus, as discussed herein, is connected in some way to the user's vehicle (e.g., either integrally with the vehicle electronics or attached to the vehicle separately). For example, an OBD receiver may connect directly to the OBD port of the vehicle to communicate OBD vehicle malfunction data to one or more networked devices (e.g., via a wired or wireless communication interface). In some embodiments, the vehicle apparatus may have an identifier that allows an apparatus, such as the system 300 of FIG. 3, to more effectively find and connect to the sensor. In some embodiments, the vehicle apparatus may be connected directly to a mobile device, such as through NFC or Bluetooth, while in other embodiments, the vehicle apparatus may be connected to a network, such as with the provider's network, through cellular or other wireless protocols including Global System for Mobile Communications (GSM), such as but not limited to 4G, 5G, and Long Term Evolution (LTE).

In some embodiments, the vehicle apparatus identifier, such as the bar code shown in FIG. 12A, may be imported using similar methods to the policy information discussed in FIG. 11 (e.g., using a camera on a smart phone). In some embodiments, the vehicle apparatus identifier may comprise a readable indicia, such as barcode, QR code, RFID code, or the like, which may be captured by one of the apparatus described herein (e.g., a dealer apparatus or subscriber apparatus). In some embodiments, the vehicle apparatus identifier may be imported in a different way, such as the dealer, or user, manually inputting the identification number. As shown in FIGS. 12A and 12B, the user information 1120 may already be imported, allowing the vehicle apparatus to be connected to the user profile along with the policy information. As shown in FIG. 12B, the confirmation of the connection may be provided. In some embodiments, the user may control the connected devices and policies via an application served from a server (e.g., a provider server) to the user device (e.g., subscriber device). Alternatively, an error message instructing a redo of the scan may be provided if the scan is unsuccessful. In various embodiments, the scanning technology and methodology shown and described with respect to FIGS. 11A-12B may be employed in any data collection situation described herein and is not limited to the specific example shown.

Referring now to FIG. 13, an example summary of the user profile data, including the policies imported are illustrated. In the depicted embodiment, a graphical user interface is rendered to present profile data associated with the user. In some embodiments, the graphical user interface may render any additional data associated with a user and/or a covered vehicle. In some embodiments, a single interface may include some or all of the various data points associated with a user and/or vehicle, regardless of their source, according to any of the embodiments described herein. The example, as shown, may be provided to the user, a dealer, or other third party, for setting up or managing an account for the user as permitted by applicable laws. The information included in the summary may include the user's name 1120, phone number 1350, various connected policies (e.g., the provider policy 1300 and the vehicle extended protection plan 1320), and connected hardware (e.g., the vehicle apparatus 1310). Additionally, the summary may indicate popular inputs that are not present in the present case. For example, the dealer may not input the GAP insurance 1330 or the Tire & wheel protection 1340 due to either the user not purchasing it, or for various other reasons. In such cases, a marking may be displayed that indicates that a given type of policy has not been entered, or is incomplete (e.g., the mark beside the GAP insurance 1330 and the Tire & Wheel 1340 indicates that they are not complete). In various embodiments, the missing policy items may be rendered with a hyperlink (e.g., a hyperlink associated with icons 1330, 1340) for transferring the user to a second interface for facilitating entry or acquisition of the identified coverage. As discussed below, the user may import this information later and/or the apparatus may prompt the user to register for the identified coverage. In an example embodiment, once the dealer submits the information (e.g., presses submit), the user may receive information on how to download and use the information. For example, the user may receive a text to their registered mobile phone with instructions on downloading an application. Alternatively, the instructions may be provided in other digital mediums. In some embodiments, the dealer may provide the instructions for downloading physically or provide the user with the requisite application (e.g., by a flash drive). In some embodiments, the user may access their profile based on one or more identifying features, such as phone number or address. After receiving access to their profile, the user may access said profile on a plurality of computing devices.

Referring now to Block 1020 of FIG. 10, an apparatus, such as the subscriber device 10 of FIG. 1, may include means, such as the processing circuitry 12, the processor 14, or the like, for determining policy information for user. The process of determining policy information data is detailed in much more detail above in reference to FIG. 8. The policy information may relate to one or more different policies relating to the user's vehicle and the user (subscriber), which policy information may be extrapolated from a partial dataset to form a complete dataset. The policy information, once determined may be displayed in the user's vehicle "protection locker," as shown in FIG. 14. The protection locker may allow the user to quickly view the terms and protection for the vehicle's various policies. In some embodiments, the locker may be accessed by repair circuitry 314 during a determination of a remedial measure, as discussed herein. For example, as shown in FIG. 14, the user has a factory warranty 1400, a vehicle extended protection plan 1410, tire and wheel protection 1420, and GAP insurance 1430. The vehicle protection locker may provide the basics of the contract, along with, in some cases, the entire contract. Portions of the vehicle protection locker may be stored remotely from the subscriber device, such as in the cloud, and/or locally in the subscriber device, such as the memory 16. A subscriber device associated with a user may have access to multiple protection lockers for multiple vehicles owned by the user (e.g., a family may have access to a vehicle protection locker for each of the family's vehicles). In some embodiments, the protection locker may be stored in a remote server and accessed via one or more networks by the user device or a required third-party device.

In some embodiments, the user may be able to add additional protection to their vehicle from the vehicle protection locker. For example, the user may be able to purchase an insurance policy or an extended vehicle protection plan through the protection locker. In such embodiments, the subscriber device may transmit a request to the application network (e.g., application network 480 shown in FIG. 5) to request a quote from and/or subscribe to one or more additional coverage policies. The vehicle protection locker may also provide the user with information relating to the user's policies, allowing for the verification of the policy information data and the respective parameters of each policy. Additionally, the user may input additional information relating to new policies not present in the protection locker or import the policy information data from one or more provider servers. For example, the user may not have the physical document for a new policy and therefore may not be able to use the import functionality. In such a case, the user may manually type in the information or retrieve the policy information data electronically. In some embodiments, a third party may allow for the information to be imported from their database over the internet. For example, a user may be able to log into their account at an insurance provider server and import the information electronically into the protection locker associated with the user. Regardless of the import method, the entirety of the vehicle's protection data may be aggregated into the vehicle protection locker. The vehicle protection locker may include policies that are current, lapsed, and/or those that take effect in the future. In some embodiments, the vehicle protection locker may comprise one or more data files stored locally on a subscriber (user) device. In some embodiments, the vehicle protection locker may comprise one or more data files stored remotely third-party apparatus, such as a provider server.

Referring now to Block 1030 of FIG. 10, an apparatus, such as the system 300 of FIG. 3, includes means, such as the repair circuitry 314, for receiving and/or determining diagnostic information relating to the vehicle's malfunction. As discussed in more detail above in reference to FIG. 3, the level of diagnostic information may be based on the amount of information received from the vehicle apparatus relating to the vehicle's malfunction. For example, the more precise information relating to the vehicle malfunction, the more precise the necessary repairs may be estimated. In some embodiments, the vehicle apparatus may be constantly detecting for malfunction. Alternatively, the vehicle apparatus may scan the vehicle intermittently based on time or distance driven. In some embodiments, the user may be able to direct the vehicle apparatus to take a reading at a given time through the application. For example, as shown in FIG. 15, the user may select to have a scan completed (e.g., by pressing "scan" 1530). As shown, while the scan is in progress 1500, initial warnings may be provided. For example, the brake fluid may be low in the vehicle as indicated by the exclamation point 1510. Additionally, the overall vehicle health may also be provided indicating the severity of the malfunction (e.g., the vehicle health is still good, as indicated by the check 1520, even though the brake fluid is low). In some embodiments, the user may be able to view the entire report, which may show the various malfunctions and potential remedies. For example, for the low brake fluid malfunction, the recommended remedy may be to add more brake fluid. The user may also view a report (e.g., a report as shown in FIG. 18) based on the scan. In some embodiments, a vehicle image may be displayed on the graphical user interface (e.g., as shown in FIG. 15). In some embodiments, the vehicle image may be retrieved from one or more databases (e.g., third party or OEM databases), which may be requested based on one or more vehicle identifiers (e.g., VIN, make/model, user ID or token, or other data sufficient to identify a vehicle).

Various embodiments may include scanning a vehicle for diagnostic issues (e.g., planned or unplanned) and calculating one or more recommendations and/or promotions and taking one or more next steps either automatically or in response to an input from a user. For example, with reference to the interface depicted in FIG. 15, selection of the "scan" icon and/or an automatic scan process may cause transmission of computer-readable instructions from the user apparatus (e.g., a mobile phone operating the depicted application) or another apparatus (e.g., a server or cloud-based processing system) to the vehicle apparatus and/or vehicle to cause execution of a vehicle scan. In some embodiments, the vehicle apparatus and/or vehicle may automatically initiate a scan. In some embodiments, the scan may include querying a vehicle API for vehicle information including sensor readings, diagnostic trouble codes, and any other API outputs. In various embodiments, a graphical user interface (e.g., as shown in FIG. 15) may be rendered showing the progress of the scan with descriptions of the vehicle systems and/or other criteria being scanned and with one or more bars or status indicators showing the progress of the scan. In some embodiments, the data detected during the scan may be presented to the user (e.g., "low brake fluid"). In some embodiments, the data received during the scan may be compared with one or more databases, including but not limited to user profile information and protection plan information, third party information, aggregated vehicle diagnostic information from one or more additional vehicles and databases, one or more models (e.g., trained machine learning models based on vehicle diagnostic data and other vehicle data as described herein), promotion databases, location databases, and/or any of the other systems and databases described herein (e.g., the application network 480). The graphical user interface may then render one or more reports and output prompts according to any of the embodiments discussed herein. In some embodiments, any one or more of the functionalities described herein may be combined into a single user application to facilitate one-stop access to relevant vehicle information.

Referring now to Block 1040 of FIG. 10, an apparatus, such as the system 300 shown in FIG. 3, includes means, such as the processor 302, the repair circuitry 314, or the like, for determining coverage level of vehicle based on diagnostic information and policy information. When a malfunction is determined by the apparatus and a potential repair is identified, the apparatus may then compare the potential repair with existing policy information to determine whether the potential repairs may be covered by a policy. For example, a manufacturer warranty may only apply to the powertrain of the vehicle and no other parts. Additionally, some policies may no longer be applicable (e.g., the mileage maximum has been reached on a warranty). In some embodiments, the determination of whether a malfunction is covered by one or more policies determines the scope of the repairs. For example, certain policies may require certain mechanics (e.g., a manufacturer warranty may require a dealership mechanic work on the vehicle). Additionally, in such a case, the cost of the repairs may be weighted less as the user will not be paying the bill (or only a small portion, such a deductible).

In an example embodiment, an apparatus, such as the system 300 shown in FIG. 3, includes means, such as the processor 302 or the like, for determining if a policy is still valid for a vehicle. For a provider service, the user may purchase a set term of time when originally purchasing the service (e.g., number of months (X)). The start date of the policy (S) may be provided by the apparatus as well. In such an example, the amount of time left on the service policy can be shown as:

$$\text{Time Left on Policy}=X-(\text{Today's Date}-S)$$

If the number is less than or equal to zero (0), then the policy is no longer active and the user may lose access to the service. This equation may also be used for other term-based determinations with S being the date of the policy beginning. In the embodiments described herein, a user may be alerted or prompted within a predetermined period of time or a predetermined mileage of a vehicle protection policy ending (e.g., transmitting email offers or reminders).

In an example embodiment, an apparatus, such as the system 300 shown in FIG. 3, includes means, such as the processor 302 or the like, for determining if a warranty is still valid. To do this, the apparatus may provide the amount of miles covered by the warranty ("Total warranty miles"), along with the amount of miles on the vehicle at the time of purchase ("Miles at purchase") (a new vehicle may be estimated as zero). Therefore, the miles left on the policy may be determined as follows:

$$\text{Miles left on warranty}=\text{Total warranty miles}-(\text{Current miles}-\text{Miles at purchase})$$

Additionally, some warranties may also be time based, wherein the following equations shows the time left on a warranty:

$$\text{Time left on warranty}=\text{Term of warranty}-(\text{Today's Date}-\text{Purchase Date})$$

If one of the warranty equations is less than or equal to zero, then the warranty is no longer valid. While the example above relates to a warranty, the operations may be similar for other policies that include term and/or mileage limitations. Each of the policies described herein may be determined via one or more of the formulas indicated above. In some embodiments, the system may track the time remaining on one or more vehicle protection products (e.g., via time and/or mileage transmitted as diagnostic data objects from the vehicle computing device 320) and may alert the user to the expiration of one or more of the vehicle protection products (e.g., one or more of a vehicle warranty or non-OEM protection product). In some embodiments, the system may be configured to offer one or more vehicle coverages (e.g., vehicle protection plan, GAP insurance plan, tire and wheel plan, pre-paid maintenance plans, and/or the like) and/or insurance policies when an insurance policy, warranty, and/or vehicle coverage expires or nears expiration. The offer for additional protection may be provided through the system application or may be separate from the application, such as through an email or other type of communication. The example equations above are illustrative and not exhaustive of the calculations carried out by various embodiments of the present disclosure.

Referring now to Block 1050 of FIG. 10, an apparatus, such as the system 300 shown in FIG. 3, includes means, such as the processor 302, the repair circuitry 314, the communication interface 308, or the like, for creating and carrying out a remedial measure for the vehicle based, at least in part, on the coverage level. As discussed in more detail above in reference to FIG. 9, the remedial measure may be any steps taken by an apparatus in an attempt to repair, mitigate, or otherwise remedy and/or prevent a vehicle malfunction. The remedial measure may include recommending different mechanics based on rating, price, and/or speed. An example of the recommended mechanics is shown in FIG. 16. As shown in FIG. 16, the user may have a default dealer for repair (e.g., My Dealer 1600). In some embodiments, the apparatus may be configured to always schedule an appointment at the same dealer. Alternatively, the user may, either prompted by the apparatus or manually, schedule an appointment, such as shown in FIG. 16 by the button 1610. In some embodiments, as shown in FIG. 16, the mechanics listed by the apparatus may include the mechanic rating and the estimated cost. In some embodiments, the user may have a pre-selected approach to scheduling appointments. For example, the user may want to use the cheapest mechanic within a certain distance. The apparatus may provide additional mechanic options (e.g., ABC Auto 1620 and DEF Mechanic 1630), as well as an option to explore other nearby mechanics. In some embodiments, the user may be provided with a list of potential repairs, the certainty for each one (how often a particular fix resolves the malfunction), the severity of the malfunction, and the average repair cost in their local area. In some embodiments, the options may be presented to a user, a user selection indication may be received, and the remedial measure may be carried out. In some embodiments, the remedial measure (e.g., scheduling an appointment at the dealer) may be automatically carried out for some or all of the possible vehicle malfunctions.

Referring now to Block 1060 of FIG. 10, the apparatus, such as the system 300 shown in FIG. 3, includes means, such as the input/output circuitry 306 or the like, for notifying the user of the remedial measure for the vehicle. In some embodiments, the notification, as discussed in reference to Block 1050, may occur during the process of making the remedial measure. In some embodiments, the notification may be a suggestion or recommendation for the remedial measure and a list of corresponding service providers. In some embodiments, the notification may provide service appointment details as discussed above. For example, the user may be asked to select from a plurality of repair options and/or mechanics. In other embodiments, the notification may occur after the remedial measure has been made. For example, the user may receive a message confirming an appointment with a mechanic.

Referring now to FIGS. 17A and 17B, the apparatus may also be used to schedule regular maintenance for a vehicle, such as part of a warranty or otherwise. In an example embodiment, the apparatus may determine the proper maintenance schedule from the policy information. For example, the manufacturer warranty may require general service at certain intervals of mileage, such as every 10,000 miles. Alternatively, the user may input information relating to maintenance and desired maintenance intervals. For example, the user may input when the oil was last changed and indicate the distance and/or time before the next oil change. As shown in FIG. 17A, the notification to the user may be in the form of a push notification. The notification may also be in the form of a text message, email, phone call, or the like. In the present example, the user may look up the service schedule, as shown in FIG. 17B, through the application. In some embodiments, the service schedule (also referred to as a maintenance schedule or planned maintenance) may be retrieved from one or more databases, such as third-party or OEM databases. The information may also be available through an email or internet-based website. In some embodiments, the apparatus may automatically schedule the appointment. Alternatively, as shown in FIGS. 17A and 17B, the user may schedule the maintenance with assistance from the apparatus. In some embodiments, the user may schedule the maintenance independently of the apparatus, such as with a local shop not on the present network and input the appointment information manually. There may be a verification by a user that an appointment was attended, so that the apparatus may track correctly for upcoming maintenances. For example, the user may be prompted to confirm that the oil was changed in order for the apparatus to know when the oil should be changed the next time. In some embodiments implementing a regular service, the malfunction information may include a service prompt, which may be determined by various sensor data associated with the vehicle (e.g., odometer reading, tire pressure, or the like).

Turning to FIG. 18, an example of one or more remedial measures is shown according to any of the embodiments herein. In the depicted embodiment, a diagnostic trouble code (DTC) has been received from a vehicle apparatus (e.g., an OBD sensor assembly and corresponding circuitry) at a processing circuitry (e.g., a provider server). In some embodiments, onboard diagnostics may be transmitted from the vehicle apparatus to the processing circuitry with the DTC or other sensor data. The remedial measure has been determined (e.g., by a provider server), and the remedial measure is presented to the user (e.g., via the subscriber device). The apparatus may present details regarding the malfunction, such as the DTC, severity, and further information explaining the problem. The depicted remedial measure further includes a list of possible causes with recommended fixes, the likelihood of success with each fix, the estimated cost of each fix, and the average mileage associated with each fix. The list of possible causes, estimates, and/or likelihood of resolving the malfunction may be programmatically determined according to any of the embodiments described herein. The depicted remedial measure further includes an option for a user to schedule a repair. In some embodiments, the option to schedule a repair may select from one or more available vendors based upon a promotion or incentive, as detailed herein, and/or repair data for the third-party repair service (e.g., statistical percentage of success by vendor, proximity to the user, etc.). In some embodiments, policy data objects (e.g., user information, oil type covered by policy) and/or diagnostic data objects (e.g., DTC trouble codes, mileage, maintenance intervals, etc.) may be automatically transmitted to the third-party vendor to facilitate automatic scheduling and confirmation of an appointment. In some embodiments, the data regarding the proposed fixes, their cost, and likelihood of success may be developed based on a machine learning model. The model may be generated from a training set of data comprising historical repairs and diagnostic information. In some embodiments, the model and/or remedial measure may be region-specific (e.g., repair costs within a certain city). By way of example, in some embodiments, a machine learning model is trained based on a database of vehicle malfunction information. In some embodiments, the model may be trained based on similar vehicles (e.g., all vehicles of a certain make or model) and, in some embodiments, may be trained based on problem type and/or solution type (e.g., outcomes for all vehicles sharing the same DTC). In some embodiments, statistical analysis may be run on aggregated data from a plurality of vehicles to identify the percentage of cases that resulted in a positive solution of the DTC. Similarly, the analysis may determine the average cost to repair the malfunction and the average mileage of the malfunction based upon the other vehicle data.

ADDITIONAL EXAMPLES

With reference to FIG. 19, an example of a user onboarding process is shown. In the depicted embodiment, a user may enter one or more identifying information (e.g., a username, mobile number, or the like) and a password. The system may then connect the user's profile with the user's vehicle and the onboard vehicle apparatus to link the respective data. The process of onboarding may also register the subscriber device with the system to be associated with a specific user. In some embodiments, the user may have a pre-existing account which is retrieved, or the user may set up a new account during the process.

With reference to FIG. 20, a user menu of the software application implemented on the subscriber device and/or the dealer device is depicted. For example, in some embodiments, the system may provide personalized and vehicle-specific information on the dealer associated with the user, roadside assistance, a vehicle protection locker, and/or maintenance information as disclosed herein. In some embodiments, the system may also provide configuration options with respect to vehicle selection, a Wi-Fi hotspot, geo-fencing, and notification options. As described herein, any one or more of the functionalities detailed herein may be provided within an intuitive graphical user interface to facilitate complete access to relevant user data, vehicle data, third-party data, recommendation data, service data, promotional data, and any other data relevant to the user. In some embodiment, a geo-fencing option may be provided which may comprise the apparatus retrieving location information (e.g., via GPS receiver or cellular receiver on the apparatus, vehicle, or vehicle apparatus) and enable or disable one or more functionalities based on the location of the vehicle and/or user relative to the geo-fences (e.g., a user must be within a predetermined geographic area to activate one or more of the features described herein and/or one or more functionalities associated with the vehicle). In some embodiments, the geo-fences may limit the vehicle travel range, such as by reporting to a designated user device when the vehicle leaves the fence.

Turning to FIG. 21, an example Wi-Fi hotspot interface is shown that provides Wi-Fi subscription and usage information to the user. For example, a vehicle may have an on-board Wi-Fi hotspot as would be understood by a person of ordinary skill in the art, and the system disclosed herein may provide configuration options and policy information with respect to the Wi-Fi hotspot. In some embodiments, a third-party Wi-Fi subscription service may exchange user account and/or payment data with a vehicle protection server and/or provider server to facilitate use of a Wi-Fi hotspot without requiring separate registration.

FIG. 22 depicts an example roadside assistance interface according to some embodiments discussed herein. The roadside assistance options may be dictated by the remedial measured necessary as discussed above (e.g., one option may be to call a tow truck to tow the vehicle to the service provider determined to fix the vehicle's malfunction). In some embodiments, the contact procedure triggered by selection of the "call now" option may be programmatically determined based upon the nature of the diagnostic data and any malfunction indicated thereby. FIG. 23 depicts an example emergency contact interface. In the emergency contact interface, a user may store one or more emergency contacts, which may be automatically contacted in the event an accident is detected by the one or more sensing circuitries in the vehicle apparatus or by the subscriber device. FIG. 25 depicts an example customer support interface allowing the user to contact a customer support representative. In some embodiments, the apparatus may facilitate transmission of diagnostic data and any other relevant data from the apparatus and/or vehicle/vehicle apparatus to the customer support representative to facilitate resolution of the customer's problem.

With reference to FIG. 24, another embodiment of the onboarding process described in FIGS. 6-10 shown in FIGS. 11A-11B is shown. In the depicted embodiment, a vehicle protection locker is shown, which comprises a graphical user interface for saving and retrieving vehicle protection data from disparate sources related to a vehicle, including a factory warranty, vehicle extended protection plan, and tire and wheel coverage information. In the depicted embodiment, the user may select the plus at the bottom of the left image, which opens an import selection screen. The subscriber apparatus allows the user or dealer to capture the first page of a policy (e.g., a GAP contract in the depicted image). The partial dataset of the first page of the GAP contract may then be extrapolated into a complete dataset according to the embodiments discussed herein, and the GAP coverage data may be imported into the locker. Likewise, in some embodiments, any other partial dataset may be received in relation to any other vehicle protection and subsequently extrapolated into a complete dataset. In some embodiments, a complete dataset for any of the protection plans may be captured (e.g., via a camera) and/or received (e.g., via wired or wireless connection) during onboarding.

FIGS. 26A-26B depict an example tutorial of the processes described herein, which tutorial may be presented to a user, a dealer, or a third party for instructing and detailing the onboarding process. The tutorial includes instructions for loading a partial dataset (FIG. 26A) and for adding the vehicle apparatus and additional coverage products and apparatus (FIG. 26B). The onboarding process described with respect to FIGS. 11A-13 and 26A-26B may be performed via a subscriber device, a dealer device (e.g., registration at the dealer), or via a provider server (e.g., registration over the internet on a provider web page, or registration by the provider in response to receiving user, vehicle, vehicle apparatus, and/or policy information). As described herein, any of the onboarding procedures may occur automatically in response to a customer, dealer, or third-party request with transmission of the relevant onboarding data. FIG. 27 shows a dealer-facing onboarding interface that may be presented to a dealer via a dealer device (e.g., the dealer device may include substantially the same structure shown with respect to the subscriber device and other apparatuses disclosed herein). The depicted interface includes a registration confirmation and instructions to guide the user (subscriber) to install the vehicle protection computer program product on their subscriber device (e.g., mobile phone) to define a computer readable medium having computer program instructions installed thereon.

FIGS. 28 and 29 illustrate user interfaces that may be presented to a subscriber device relating to a vehicle protection locker associated with a user. For example, FIG. 28 shows a vehicle extended protection plan for a Honda Accord. In such an example, the user interface may include information relating to the policy information (e.g., policy number, policy holder, vehicle identification information, terms and scope of protection plan, methods of filing a claim, etc.). Similar information may be displayed for other types of policies and warranties. For example, FIG. 29 illustrates a similar interface for a pre-paid maintenance plan, which also includes information relating to policy information (e.g., policy number, policy holder, vehicle identification information, terms and scope of policy, and methods of filing a claim, etc.).

FIG. 30: Flexible VIN Detection and Operation

In some embodiments, including during any of the processes and during operation of any of the systems and apparatus described herein, there may be a mismatch between the vehicle apparatus and the vehicle. The vehicle apparatus and supporting systems and processes may intelligently resolve the mismatch while enabling valuable functionality to the user. Vehicles may require unique communication protocols that vary by manufacturer and/or model. Thus, in an instance in which a vehicle apparatus, apparatus, or system is unable to identify the vehicle or the identified vehicle does not match an expected or associated vehicle, the system may seek to resolve the mismatch and/or prevent communication errors (e.g., sending an incorrect signal to a vehicle bus, querying the wrong bus/system on a vehicle, or misinterpreting received signals from the vehicle). The systems, apparatus, and methods discussed herein are configured to resolve the mismatch and/or scale a functionality of the vehicle apparatus and associated devices to provide functionality to the user without compromising the vehicle and data integrity. In addition, in some embodiments, a vehicle apparatus may be associated, directly or indirectly, with a registered vehicle, such that upon detection of the registered vehicle, enhanced functionality is provided to the consumer. In some embodiments, at least a highest tier of functionality may include diagnostic modeling and predictive vehicle analytics according to the embodiments described herein. As described herein, the vehicle apparatus may read vehicle data from the vehicle. In some embodiments, an apparatus (e.g., a consumer device, such as a handheld phone or a server or remote processing device) may be configured to execute the functions for resolving the vehicle identification issues detailed herein.

In various embodiments, the vehicle apparatus may be installed in any vehicle regardless of whether the vehicle has been registered with the provider and the vehicle apparatus. As described herein, the apparatus 200 may receive vehicle data from an on-board computing system. For example, the apparatus 200, such as an OBD receiver, may attempt to detect and/or request a vehicle identification data object, such as a Vehicle Identification Number ("VIN"), from the on-board vehicle computing system to identify the vehicle. Although the vehicle identification data object for the vehicle may be described as a VIN, any equivalent unique identifier of a vehicle may be used to perform the processes described herein. The user interface of the subscriber device 10 may be configured to provide certain levels of information to the user based on, for example, the information, or lack thereof, provided by the vehicle. Additionally, while the operations of FIG. 30 are discussed in reference to apparatus 200, one or more operations discussed herein may be carried out by other components discussed herein, such as components of the system 300. In some embodiments, the apparatus according to FIG. 30 may include and/or be in communication with one or more apparatuses, systems, and/or networks (e.g., servers or local devices) for making the determinations described herein (e.g., a provider server) as described herein with respect to FIGS. 1-5. For example, various steps of FIGS. 30-35 may be carried out on a server (e.g., server 316), a subscriber device 10, a vehicle apparatus, and/or the like.

Referring now to Block 3000 of FIG. 30, the vehicle apparatus may be installed in a vehicle. As discussed above, the apparatus 200 may include or be in communication with the vehicle apparatus installed in the vehicle. In various embodiments, the vehicle apparatus may be an OBD receiver that is installed in the OBD port of the vehicle according to any of the embodiments described herein. In some embodiments, in an instance the vehicle apparatus may communicate with the vehicle to receive vehicle data, in the form of one or more data objects, such as a vehicle identification data object (e.g., Vehicle Identification Number (VIN)) and other information relating to the vehicle.

Referring now to decision Block 3010 of FIG. 30, an apparatus 200 includes means, such as the diagnosis circuitry 210, the processor 240, or the like, for determining the vehicle data includes a vehicle identification data object. For example, as shown in Block 3010, the apparatus 200 may determine whether a VIN is detected based on the vehicle data provided from the on-board vehicle computing system. For example, in an instance the apparatus 200 detects a VIN, the VIN information may be transmitted to the processor 240 or the diagnosis circuitry 210 of the apparatus. In an example embodiment, in an instance in which the vehicle data includes a vehicle identification data object (e.g., the VIN is detected), the operations may proceed to Block 3040, while in an instance in which the vehicle data does not include vehicle identification data object (e.g., the VIN is not detected), the operations may proceed to Block 3020.

Referring now to Block 3020 of FIG. 30, the apparatus 200 includes means, such as the processor 240, the communication interface 280, the sensing circuitry 290, or the like, for receiving an indication that the vehicle data does not include a vehicle identification data object (e.g., "no VIN" indication that no VIN has been detected). In an instance the apparatus 200 receives a "no VIN" indication status message, no VIN is received and as such the apparatus may not be able to identify the vehicle. In various embodiments, the apparatus may still receive basic diagnostic data (e.g., OBD or OBDII Data, or any other vehicle diagnostic data retrieved from the vehicle that does not require apportionment of a specific VIN) captured by the vehicle apparatus regardless of vehicle type.

In some embodiments, Block 3030 may include an error protocol in an instance in which the vehicle apparatus is unable to identify the vehicle (e.g., does not receive a vehicle identification data object or cannot interpret the vehicle identification data object). As shown in the operations of Block 3030 of FIG. 30, in some embodiments, an apparatus 200 includes means, such as the processor 240, communication circuitry 280, or the like, for transmitting a request for a manual input of the vehicle identification data object (e.g., manual input of VIN by a user, scan of the VIN or other identifier via camera, push message prompted by the user to transmit the vehicle identifier, or the like). For example, the apparatus 200 may communicate with the subscriber device (e.g., via the communication interface 280 or through a server) and in response to a transmission from the apparatus 200, the subscriber device may render an input graphical user interface including a request for input of the vehicle identification data object. In an example embodiment where the user inputs a valid vehicle identification data object (e.g., a valid VIN), the operations of the apparatus may move to Block 3040, as if the apparatus 200 had received the vehicle identification data object from the on-board vehicle computing system. In some embodiments, the subscriber device 10 may provide basic information, such as make, model, and year for the user to confirm.

Referring now to Block 3050 of FIG. 30, in an instance the vehicle identification data object (e.g., VIN) is not received from the on-board vehicle computing system and/or user input, the apparatus 200 includes means, such as the processor 240 or the like, for causing the subscriber device to operate only using the OBD data received from the apparatus 200. For example, the information relating to Battery, DTC, Maintenance Icon, Wi-fi, Trip History, Repairs and Maintenance, Glovebox, and Services Tab Changes discussed herein. In some embodiments, the odometer changes may be based on GPS data instead of actual data and the fuel changes may be based on virtual fuel calculations. In various embodiments, the defeatured version discussed in reference to Block 3050 may be designated as Level 3 operation.

Referring now to Block 3040 of FIG. 30, in an instance in which the apparatus receives the vehicle identification data object of the vehicle (e.g., from the apparatus 200, through manual input by a user, or through any other means), the apparatus 200 includes means, such as the processor 240, the communication interface 280, or the like, for receiving data relating to the specific vehicle (e.g., an OEM data library based on the vehicle). In some embodiments, the data received relating to the specific vehicle may include at least one of a vehicle make, vehicle model, vehicle options, vehicle model type (e.g., XE versus SE), fuel, battery, and/or any other relevant information on the vehicle for facilitating the functions described herein. In some embodiments, the data may be stored at least partially on the apparatus 200 (e.g., the data may be stored on the memory device 260). Alternatively or additionally, the data may be received via the communication interface 280. For example, the apparatus 200 may download the data from the communication network 400. In various embodiments, the apparatus may also receive information comprising associations between vehicle identification data objects and registration data. As discussed below, in various embodiments, the information provided to a user via the graphical user interface may be restricted in an instance in which the vehicle identification data objects and registration data do not correlate with one another. For example, a user's registration data may only apply to one vehicle and in an instance in which the vehicle apparatus is inserted into another vehicle, the vehicle data may not be provided to the user. In some embodiments, a user's registration data may include more than one vehicle and the information provided to a user may not be restricted based on the vehicle apparatus being installed in a different vehicle.

Referring now to decision Block 3060 of FIG. 30, an apparatus, such as the system 300 shown in FIG. 3, includes means, such as the processor 302, for determining whether the vehicle identification data object (e.g., VIN) detected by the vehicle device, or inputted by the user, matches a vehicle identification data object (e.g., VIN) stored in the registration data. In some embodiments, the registration data may correspond to a user account and/or registration of a vehicle associated with the vehicle identification data object in association with a subscription, user policy, or the like according to any of the embodiments described herein. In some embodiments, the registration data may correspond with and follow the onboarding processes described herein, whereby at least two of the vehicle apparatus, vehicle, and consumer account may be interrelated and registered. Moreover, in some embodiments, the yin detection and operation process may be followed by the diagnostic, promotional incentive, and other vehicle related functions described herein.

As discussed above in reference to FIG. 7, the subscriber device 10 may have previously received a subscription indication for a given user and that subscription indication may include information including the registration service information, device registration information, data service activation information, application download notifications, and onboarding notifications. In various embodiments, the apparatus 200 may be in communication with the subscriber device 10 and/or the communication network 400 that has the subscription indication for a given user and/or vehicle. In various embodiments, a user may have a subscription relating to one or more individual vehicles loaded into a subscriber device 10 (e.g., as discussed in reference to FIGS. 11A-11B). In some embodiments, the user may have a subscription that allows for the features of the application to work in any vehicle. For example, a car dealership may have registration tier that enables a vehicle apparatus to operate as discussed herein for any vehicle attached to the vehicle apparatus, while individual plans may only apply to one or more individual vehicles. Additionally, an individual vehicle may come with a subscription, independent of the user (e.g., a new vehicle may come with a policy independent of the owner), such that the registration data may be only associated with the vehicle, rather than the user.

Referring now to Block 3070 of FIG. 30, in an instance in which the vehicle identification data object of the vehicle does not match the vehicle identification data object of the registration data, an apparatus 200 includes means, such as the processor 240, the communication interface 280, or the like, for transmitting a notification that the vehicle apparatus is not attached to the appropriate vehicle. In various embodiments, the apparatus 200 may be in communication with the subscriber device 10, such that the subscriber device 10 renders a notification to the graphical user interface in response to the communication with the apparatus 200. The notification may also be sent in an instance in which the subscription for a vehicle has lapsed. In various embodiments, the notification may include an option for the user to subscribe for the given vehicle (e.g., the notification may include sign-up information). In various embodiments where the vehicle identification data object is detected, but does not match the subscription information, the apparatus 200 includes means, such as the processor 240, the communication interface 280, or the like, for providing OEM data independent of the subscription data relating to policy and the like to the subscriber device for rendering to the user. For example, the subscriber device 10 may display information such as Odometer, Fuel, Battery, Maintenance Icon, WiFi, Trip History, DTC and Repairs and Maintenance. In various embodiments, the raw information discussed above may be displayed as a part of a Level 3 operation. Additionally, in the protection locker, a notification indicating that no policy information is found may be displayed. For example, the protection locker may display a message indicating that "It doesn't look like you have any vehicle protection plans." Additionally, various other features on the subscriber device 10 may be inactive in an instance in which there is no policy information.

In various embodiments, the subscriber device 10 may render a graphical user interface associated with either a first operational level or a second operational level. As discussed below, the first operational level includes at least partial vehicle specific information. In some embodiments, the first operational level may be subdivided into one or more levels. For example, Level 1 may include more complete vehicle specific information than Level 2. In various embodiments, the second operational level may be a defeatured compared to the one or more subdivided levels of the first operational level. For example, the second operational level may be Level 3 discussed herein that incorporates only raw information received from the on-board vehicle computing system. An example of the included components of each level is shown in the table below. In some embodiments, the diagnostic modeling and predictive vehicle analytics may be enabled for at least a portion of the available functionality levels. For example, in some embodiments, the diagnostic modeling and predictive vehicle analytics may be enabled for at least Level 1, and in some embodiments, for Level 2.

| | Level 1 (OEM + Provider Data) | Level 2 (OEM Data without Provider Data) | Level 3 (No OEM/Provider Data) |
|---|---|---|---|
| Odometer | Yes | Yes | Virtual Only |
| Fuel | Yes | Yes | Virtual Only (Standard OBD2 Data, not OEM) |
| Battery | Yes | Yes | Yes |
| DTC | Yes | Yes | Yes |
| Maintenance | Yes | Yes | Yes |
| Glovebox | Yes | Yes | Yes |
| WiFi | Yes | Yes | Yes |
| Trip Info/ History Tab | Yes | Yes | Yes |
| Roadside Assistance (in Services tab) | Yes | No | No |
| Repairs/ Maintenance (in Services tab) | Yes | Yes | Yes |

Referring now to Block 3080 of FIG. 30, the apparatus 200 includes means, such as the processor 240, the communication interface 280, or the like, for receiving information from the vehicle apparatus relating to the OEM data. For example, the vehicle apparatus (e.g., an OBD receiver) may be configured to collect various data relating to vehicle specific information. In such embodiments, the apparatus may transmit the collected data for use in various operations. For example, the OEM data may be collected and compared with known OEM data for similar vehicles. In some embodiments, the apparatus 200 may be in communication with a server, such as the server 316, to communicate with the communication network 400 to receive OEM data. In some embodiments, the apparatus 200 may request OEM data from the vehicle via transmitting OBD Parameter IDs (PIDs) to the on-board vehicle computing system. In such an embodiment, the on-board vehicle computing system may provide OEM data to the apparatus 200 based on the OBD PIDs. In various embodiments, the apparatus 200 includes means, such as the processor 240, the communication interface 280, or the like, for transmitting the vehicle data to a server (e.g., server 316). In various embodiments, the apparatus may be configured to communicate with various servers in connection with the communication network 400, such that information relating to the vehicle may be updated regularly and features may be vehicle specific. For example, certain types of vehicle may require periodic maintenance based on specific issues that may be prevented by communicating with vehicle specific vendors.

Referring now to Block 3090 of FIG. 30, the server 316 includes means for transmitting data to the protection locker. In various embodiments, the data may be received by a given subscriber device 10 based on a log-in or the like to associate a user with the given data.

FIG. 31: Example Process Flow

Referring now to FIG. 31, a simplified example method of the Flexible VIN Detection and Operation is provided in accordance with various embodiments. Referring now to Block 3100 of FIG. 31, an apparatus 200 includes means, such as the processor 240, the communication interface 280, or the like, for receiving vehicle data from an on-board vehicle computing system. In various embodiments, a vehicle apparatus (e.g., vehicle apparatus 200, 322, which may include a processor, is in electrical communication with the on-board vehicle computing system. In various embodiments, the registered account of the subscriber device 10 may be associated with the vehicle apparatus and the predetermined vehicle identification data object. In various embodiments, the vehicle apparatus may be configured to cause the graphical user interface to be rendered on a user mobile device.

Referring now to Block 3110 of FIG. 31, the apparatus 200 includes means, such as the processor 240, the communication interface 280, or the like, for determining whether the vehicle data includes a vehicle identification data object. As discussed above, the vehicle identification data object may include any unique vehicle identifiers, such as a VIN.

In various embodiments, in an instance in which the vehicle data does not include the vehicle identification data object, the vehicle apparatus includes means for causing rendering of an input graphical user interface. In various embodiments, the input graphical interface includes a request for input of the vehicle identification data object. In various embodiments, the vehicle apparatus also includes means for receiving the manual input of the vehicle identification data object via the input graphical user interface. In various embodiments, the vehicle identification data object may be obtained using OCR technology, such as the OCR technology described herein. For example, a user may take and/or provide a photo of the VIN plate of the vehicle, a piece of paper with vehicle identification information, and/ or the like, in order to identify the vehicle. In various embodiments, in an instance in which the vehicle data does not include the vehicle identification data object, the vehicle apparatus includes means for determining a second operational level of the plurality of operational levels. In some embodiments, the vehicle apparatus includes means for receiving second vehicle data from the on-board vehicle computing system. In such an embodiment, the vehicle apparatus includes means for causing rendering of a second graphical user interface. In some embodiments, the second graphical user interface may include one or more second renderable data objects associated with the second operational level. In some embodiments, the one or more second renderable data objects are based on the second vehicle data. In some embodiments, the second operational level may be a defeatured relative to the first operational level discussed below. For example, the second operational level may be Level 3.

Referring now to Block 3120 of FIG. 31, the apparatus 200 includes means, such as the processor 240, the communication interface 280, or the like, for determining a first operational level from a plurality of operational levels in an instance in which the vehicle data includes a vehicle identification data object. In various embodiments, the first operational level may be defined as an operational level at least partially based on the vehicle. In various embodiments, the first operational level may be level 1 or level 2 operational level discussed herein.

Referring now to Block 3130 of FIG. 31, the apparatus 200 includes means, such as the processor 240, the communication interface 280, or the like, for receiving first vehicle data from the on-board vehicle computing system. In various embodiments, the first vehicle data may relate to vehicle operation, such as Odometer, Fuel, Battery, Maintenance Icon, WiFi, Trip History, DTC, and/or Repairs and Maintenance. In various embodiments, the first vehicle data may be used in conjunction with the vehicle data relating to the vehicle identification to provide vehicle specific recommendations (e.g., Level 1 or Level 2 of the first operational level discussed herein).

Referring now to Block 3140 of FIG. 31, the apparatus 200 includes means, such as the processor 240, the communication interface 280, or the like, for causing rendering of a graphical user interface including one or more first renderable data objects associated with the first operational level. In various embodiments, the apparatus 200 may cause a transmission to an associated subscriber device 10 to rendered the graphical user interface to the user.

In some embodiments, the determination of the first operational level from the plurality of operational levels includes comparing the vehicle identification data object with a predetermined vehicle identification data object associated with a registered account. In some embodiments, the determination of the first operational level from the plurality of operational levels includes determining whether the vehicle identification data object matches the predetermined vehicle identification object associated with the registered account. In some embodiments, the determination of the first operational level from the plurality of operational levels includes retrieving supplemental data associated with the predetermined vehicle identification data object or the registered account in an instance in which the vehicle identification data object matches the predetermined vehicle identification object associated with the registered account. In such an embodiment, the one or more first renderable data objects may be further based on the supplemental data. In some embodiments, the one or more first renderable data objects may not be based on the supplemental data in an instance in which the vehicle identification data object does not match the predetermined vehicle identification data object associated with the registered account.

FIG. 32: Car Specific Diagnostics

Referring now to FIG. 32, in some embodiments, the system may be configured to render a maintenance interface to the user configured to provide vehicle-specific diagnostic and maintenance information. In various embodiments, the operations discussed in FIGS. 32-34 may be subsequent to the operations of FIGS. 30-31, such that the car specific diagnostics and/or the car specific promotions may be a part of the first operational level discussed above. As with FIGS. 30-31, the operations are discussed as carried out by the apparatus 200, but one or more operations may be carried out by other components discussed herein, such as the system 300.

In some embodiments, an apparatus 200 includes means, such as the processor 240, the communication interface 280, or the like, for providing vehicle specific diagnostics. In various embodiments, the apparatus 200 may transmit the vehicle specific diagnostics to a subscriber device 10, either directly or indirectly (e.g., via a server) and the subscriber device 10 may render a graphical user interface based on the vehicle specific diagnostics. Referring now to Block 3200, the apparatus 200 includes means, such as the processor 240, the communication interface 280, or the like, for determining whether a diagnostic triggering event has occurred. In various embodiments, a diagnostic triggering event may include a malfunction triggering event (e.g., the diagnostic triggering event may be a potential malfunction of the vehicle, such as the engine pistons are not firing correctly) and/or a maintenance reminder (e.g., the diagnostic triggering event may be a certain amount of miles until service is needed). In some embodiments, the diagnostic triggering event may comprise a planned diagnostic event (e.g., maintenance-related triggers, such as a predetermined mileage or wear of expected wear parts) or an unplanned diagnostic event (e.g., an OBD-provided diagnostic trouble code indicating one or more faults with the vehicle). Some examples of diagnostic triggering events include reading events off the vehicle, such as tire pressure indicator is low (e.g., a notification or promotion may be sent to a consumer apparatus), DTC codes, etc. Additionally, there could be time based maintenance, such as a trigger when the vehicle hasn't been serviced in 6 months, or it is at a 36 month service date. In an instance in which the diagnostic trigger event has occurred, the apparatus may proceed to Block 3200, while if the diagnostic trigger event the apparatus may await a user input (e.g., entering a standby state until a user input is received at Block 3260 or a diagnostic trigger event is detected at Block 3200). In various embodiments, the determination of a triggering event may be based on the vehicle specific information discussed in reference to FIGS. 30-31. For example, the apparatus 200 may receive OEM data relating to the proper amount of miles between services, information on last known service, common malfunctions, or the like. In such an embodiment, the apparatus 200 may combine the OEM data about the vehicle with the first vehicle data (e.g., mileage) to determine if a trigger event has occurred. For example, the apparatus 200 may receive an OEM recommendation that the oil be changed every 5000 miles and that the last known oil change was when the vehicle had 50000 miles. As such, the apparatus 200 may determine, based on the first vehicle data, that the vehicle currently has 56000 miles and therefore service is needed.

Referring now to Block 3210 of FIG. 32, the apparatus 200 includes means, such as the processor 240, the communication interface 280, or the like, for determining whether the service has been completed. In an instance in which a trigger event has seemingly occurred (e.g., the vehicle reaches a mileage that typically recommends service), the apparatus 200 may determine whether the trigger event has been taken care of yet (e.g., has the car been serviced). In some embodiments, the apparatus may determine whether the service has been completed via user input (e.g., a user or mechanism may input the service information). In some embodiments, the apparatus may determine service is complete based on vehicle data collected via the vehicle apparatus. In various embodiments, in an instance in which the service has been completed, the apparatus may either finish operations (e.g., not display any information to the user) or proceed to determining whether any third-party maintenance information is available (e.g., Block 3270).

Referring now to Block 3220 of FIG. 32, the apparatus 200 includes means, such as the processor 240, the diagnosis circuitry 210, or the like, for determining whether a user has opted not to receive maintenance information. In an instance in which the user has opted out of the maintenance notification, the apparatus may proceed to the third-party maintenance information step of Block 3270, but only display the information upon a prompt from the user (e.g., the user accesses the protection locker). Alternatively, if maintenance notifications are enabled, the apparatus may proceed to display push notifications (e.g., Block 3250) to the user relating to the triggering event.

Referring now to Block 3270, the apparatus 200 includes means, such as the processor 240, the communication interface 280, or the like, for determining whether there is any third-party maintenance data available for the given vehicle type. For example, the apparatus may be in communication with a third-party that collects maintenance data relating to specific vehicle types. Block 3270 may be completed in response to Blocks 3210, 3220, and/or 3260. In some embodiments, the apparatus 200 may cause a request for user input to be rendered to the graphical user interface of the subscriber device 10 (e.g., request a user input of third-party maintenance data). In some embodiments, maintenance data may be provided to a subscriber (also referred to as a consumer) device (e.g., rendered to the graphical user interface of a consumer device) and the user may interact with a representation of a given piece of maintenance data (e.g., selecting a given maintenance event, making a given maintenance event complete, and/or saving maintenance records). In some embodiments, the subscriber device may be a mobile phone using a touchscreen. In some embodiments, the maintenance records saved may include information such as date of maintenance, maintenance type, name of repair shop, a photo of the receipt, and/or add notes about the maintenance event. In some embodiments, the maintenance event may be marked complete in response to a user taking a photo of their receipt (e.g., information about the completed maintenance, such as shop name, date, and/or the like, may be extracted via the techniques described herein, such as OCR). In some embodiments, the maintenance event may be marked complete in response to information electronically received (e.g., via API from the provider platform) from the third-party vendor/shop that enters information relating to the maintenance.

Referring to Block 3280, in an example where there is no third-party maintenance data (e.g., either the apparatus is not in communication with third-party providers and/or the third-party providers do not have maintenance data for the given vehicle), the client device may display default maintenance information, such as standard mileages for changing the oil or the like (e.g., 5,000 miles may be a standard mileage to change the fuel for most vehicles). Alternative, as shown in Block 3290, the apparatus 200 includes means, such as the processor 240, the communication interface 280, or the like, for providing third-party maintenance data. For example, a specific type of vehicle may need to have the oil changed more frequently for various reasons.

Referring now to Block 3250, the apparatus 200 includes means, such as the processor 240, the communication interface 280, or the like, for displaying maintenance information to the user, including potential incentives relating to the maintenance as described, for example, with respect to FIG. 32. In some embodiments, the displaying of the information may be the result of a user prompt (Block 3240) or automatically (e.g., a pop-up notification). In various embodiments, an apparatus may be configured to perform the operations of FIG. 32 in the background during operation.

FIG. 33: Incentive Engine/Promotional Flow

In various embodiments, the apparatus may be configured to provide incentive data objects to users based on vehicle diagnostic data object. In various embodiments, the apparatus may be configured to detect and/or predict issues with a vehicle. In some embodiments, these detected and/or predicted issues may then be used to trigger rendering of a user interface for the user comprising one or more incentives and/or recommendations to cause the user to address the issues. In various embodiments, the operations discussed herein may be performed by various components, such a server, the subscriber device, and/or the like. In some embodiments, the data may be read from the vehicle (e.g., by a vehicle apparatus) and transmitted to the various components, such a server, the subscriber device, and/or the like for the further processing steps described herein.

Traditionally, vehicle owners may be reluctant to obtain preventive maintenance and/or maintenance for minor issues, and the user may not be aware of issues that could spiral into larger and more costly problems. In various embodiments, the apparatus may prioritize and programmatically generate an urgency score associated with maintenance options based on the severity of the malfunction. For example, a diagnostic modeling and predictive analytics system may be used to determine the urgency score and/or determine the fault. The urgency score may be based upon a present urgency (e.g., the car is inoperable) or a future predicted urgency (e.g., low fluid level that is expected to cause future engine problems). For example, the low washer fluid is not likely to cause future problems, but powertrain issues may spiral into more expensive problems, and therefore a powertrain offer may be prioritized over a washer fluid offer. In some embodiments, the diagnostic modeling and predictive analytics systems, apparatus, and methods described herein may determine the urgency score and may connect the recommended action (e.g., a particular promotion or a recommended maintenance activity) with the diagnostic data received and analyzed by the system. In various embodiments, the apparatus may be configured to provide one or more maintenance options based on the average margin for a repair (e.g., a higher margin may allow for a greater discount). In various embodiments, the detection of larger malfunctions (or potential malfunctions) may result in higher incentives provided for given repairs (e.g., incentivize a user to get a large repair or a more preventative repair that avoids a large repair). In various embodiments, the apparatus may be configured to communicate with and retrieve vehicle diagnostic data objects from providers relating to maintenance information. The apparatus may use vehicle diagnostic data objects along with the incentive data objects to incent users to seek recommended maintenance services by offering relevant, real time incentives. In some embodiments, the urgency score may inform the incentive data objects (e.g., a greater urgency may cause a greater incentive, such as a greater discount, to be provided).

Referring now to Block 3300 and 3310 of FIG. 33, the apparatus 200 includes means, such as the processor 240, the communication interface 280, or the like, for on-boarding user and vehicle information, including vehicle data, policy information, dealer promotional material, and the like. Referring now to Block 3330, the apparatus 200 includes means, such as the processor 240, the communication interface 280, or the like, for determining whether a diagnostic trigger event (e.g., a vehicle malfunction or a maintenance trigger event) has occurred. The determination of a diagnostic trigger event may be the same as discussed in reference to Block 3200 of FIG. 32. The information used to determine the trigger event may be received from the vehicle apparatus according to any of the embodiments described herein. For example, as discussed in reference to FIG. 30, the apparatus 200 may receive information relating to the vehicle, including error codes, mileage, and the like. In some embodiments, potential trigger events include DTC, recall, low battery, mileage service, crash, or service internal indication. Various other types of trigger events indicative of a need for maintenance (whether planned or unplanned) may also be used herein.

Referring now to Block 3340 of FIG. 33, the apparatus 200 includes means, such as the processor 240, the communication interface 280, or the like, for determining whether one or more incentives may be available relating to the triggering event. In some embodiments, the apparatus may check for a plurality of incentives regardless of the trigger event (e.g., check for service incentive even if the trigger event is for a low-battery). In various embodiments, the determining whether one or more incentives may be available may be completed using an incentive engine. For example, the incentive engine may reach out to third-parties to determine whether the third-party providers offer any incentives. For example, the incentive engine may be configured to communicate with third parties, such as automotive stores, body shops, non-OEM mechanics, and/or the like, and provide these incentives to be used as discussed herein in addition to provider incentives. In various embodiments, the incentive engine may be configured to connect users with third-party providers. In some embodiments, the incentives may be retrieved from a database of existing incentives provided by one or more providers. In some embodiments, the diagnostic modeling and predictive analytics system, apparatus, and methods may be configured to select and/or generate an incentive based upon a customer's actual or predicted needs and/or based upon profile data associated with a third-party service provider (e.g., service offerings, expertise, pre-agreed promotions, location, etc.).

Referring now to Block 3360 of FIG. 33, the apparatus 200 includes means, such as the processor 240, the communication interface 280, or the like, for determining whether a user has incentive notifications activated. For example, the apparatus 200 may receive a transmission from a subscriber device 10 that indicates that a user has selected incentive notifications to be active. In an instance in which the notifications are inactive, as shown in Block 3350, the apparatus may determine whether any of the incentives are relevant, but does not provide the incentive to the user, unless the user accesses the protection locker. Alternatively, as shown in Block 3370, the user may receive a push notification, via a subscriber device 10, indicating all active inventions in the protection locker. Additionally, in some embodiments, the apparatus may also determine which incentives are active and may mark them individually from other incentives.

Referring now to FIG. 34, a simplified method of providing maintenance information to a user interface. Referring now to Block 3400 of FIG. 34, the apparatus 200 includes means, such as the processor 240, the communication interface 280, or the like, for receiving vehicle data from an on-board vehicle computing system on a first vehicle. In various embodiments, the vehicle data may include information relating to the identity of the vehicle. For example, the vehicle data may include a unique vehicle identifier, a make, a model, and/or the like. In various embodiments, the identity of the vehicle may be determined by the vehicle data.

In some embodiment, reception of the vehicle data may be in response to receiving diagnostic trigger indication. In some embodiments, the diagnostic trigger indication may be based on at least one of a diagnostic trigger event or a user input. In some embodiments, the apparatus may include means for causing at least the rendering of the graphical user interface based on the indication.

Referring now to Block 3410 of FIG. 34, the apparatus 200 includes means, such as the processor 240, the communication interface 280, or the like, for generating a vehicle diagnostic data object based on the vehicle data. In some embodiments, the vehicle diagnostic data object includes one or more maintenance actions associated with the first vehicle. In some embodiments, the vehicle diagnostic data object may include data indicative of at least one potential fault with the first vehicle based on the vehicle data. In some embodiments, the at least one potential fault may be predicted to occur but has not yet occurred with the first vehicle. In some embodiments, the vehicle diagnostic data object may be generated by retrieving third-party maintenance data associated with the first vehicle and comparing the third-party maintenance data with the vehicle data.

In some embodiments, the generating the vehicle diagnostic data object includes generating a trained model based on one or more aggregated vehicle data sets according to the AI and machine learning training and model generation and execution procedures described herein. In various embodiments, the trained model may include marketing focused information relating to attachment rates for given offers. For example, the trained model may be used to tailor an offer (e.g., a pricing or discount, the message text) based on a given vehicle, a user's age and/or demographics, and/or the like. The model may be trained based on a data set generated from past promotions and associated consumer metadata. In various embodiments, the trained model based on one or more aggregated vehicle data sets includes second vehicle data from each of a plurality of vehicles. In some embodiments, the generating the vehicle diagnostic data object includes inputting at least a portion of the vehicle data into the trained model to generate the vehicle diagnostic data object. In some embodiments, the trained model is trained using the one or more aggregated vehicle data sets includes historical maintenance data associated with the plurality of vehicles. In some embodiments, the apparatus may also include means for retrieving the aggregated vehicle data sets from an insurance claim database. In various embodiments, the aggregated vehicle data sets may include repair data (e.g., relating to cost to fix), vehicle reliability history (e.g., frequency and/or severity of various types of malfunctions including information relating to when such malfunctions occur), maintenance details about vehicles, and/or driving behavior data. In some embodiments, the plurality of vehicles may include at least two different makes of vehicle.

Referring now to Block 3420 of FIG. 34, the apparatus 200 includes means, such as the processor 240, the communication interface 280, or the like, for associating the vehicle diagnostic data object and one or more provider incentive data objects to generate a maintenance offer associated with the first vehicle. The "maintenance offer" and "maintenance actions" may comprise any respective offers or actions associated with addressing a diagnostic issue identified in association with a vehicle, including current or future issues with the vehicle (e.g., as determined by a diagnostic modelling or predictive analytics system) and including planned or unplanned diagnostic triggers. In various embodiments, the apparatus also includes means for generating the one or more provider incentive data objects based on provider offering data. In some embodiments, the provider offering data includes metadata associated with the provider. For example, the metadata may include one or more of provider location, provider time of operation, or provider service offerings.

In some embodiments, the vehicle diagnostic data object includes metadata associated with the first vehicle. In some embodiments, associating the vehicle diagnostic data object and the one or more provider incentive data objects includes comparing the metadata associated with the first vehicle and the metadata associated with the provider. In some embodiments, the one or more provider incentive data objects may be based on metadata associated with the first vehicle. In some embodiments, the metadata can be any relevant piece of information about the vehicle (e.g., make, model, mileage, time since last service, age of parts, etc.).

In some embodiments, the metadata associated with the first vehicle includes a vehicle location received from the first vehicle. In such an embodiment, the metadata associated with the provider includes the provider location. In some embodiments, comparing the metadata associated with the first vehicle and the metadata associated with the provider includes determining that the vehicle location and the provider location are within a threshold distance of each other.

In some embodiments, the provider offering data includes one or more provider incentives. In some embodiments, associating the vehicle diagnostic data object and the one or more provider incentive data objects may include matching the one or more provider incentives with the vehicle diagnostic data object. In some embodiments, the one or more provider incentive data objects are associated with the vehicle diagnostic data object based on at least one triggering event detected in the vehicle diagnostic data object or vehicle data, wherein the at least one triggering event comprises at least one fault detected by a sensor on the first vehicle, wherein the at least one triggering event comprises at least one potential fault with the first vehicle, wherein the at least one potential fault is predicted based on a trained model generated based on one or more aggregated vehicle data sets. In some embodiments, the one or more aggregated vehicle data sets may include second vehicle data from each of a plurality of vehicles.

In some embodiments, the one or more provider incentive data objects may be agnostic of the vehicle diagnostic data object, that is may be determined independent of the vehicle diagnostic data object. Alternatively, the one or more provider incentive data objects may be based on metadata associated with the first vehicle. In some embodiments, the one or more provider incentive data objects are stored in association with a user profile associated with the first vehicle, such that generating the maintenance offer includes comparing the stored one or more provider incentive data objects with the vehicle diagnostic data object.

Referring now to Block 3430 of FIG. 34, the apparatus 200 includes means, such as the processor 240, the communication interface 280, or the like, for causing rendering of a graphical user interface. In various embodiments, the apparatus 200 may provide a given subscriber device 10 with the one or more renderable data objects to be rendered by the subscriber device 10. In various embodiments, the graphical user interface includes one or more first renderable data objects associated with the maintenance offer. In various embodiments, the first renderable data objects may be any indication of a maintenance offer. In various embodiments, the first renderable data objects may be interactive (e.g., the user may be able to select a given offer). In various embodiments, the first renderable data objects may be static, such that the user cannot interact with the first renderable data objects. For example, an automotive store may be offering 15% off of motor oil and the first renderable data object may just indicate such a deal with information relating to where to redeem such an offer.

In various embodiments, the maintenance offer may be accepted via the user interface (e.g., via a user touching an icon corresponding to an acceptance of the maintenance offer. In some embodiments, the apparatus also includes means for updating the graphical user interface to display second renderable data objects associated with scheduling data. The scheduling discussed herein may be similar to the operations discussed in some embodiments, the apparatus may also include means for transmitting the scheduling data to a first provider based on an acceptance of the maintenance offer the user.

FIGS. 6-10 and 30-34 illustrate flowcharts of various apparatuses, methods, computer readable media, and systems according to example embodiments of the disclosure. It will be understood that each block of the flowcharts, and combinations of blocks in the flowcharts, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present disclosure and executed by a processing circuitry of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions. For example, portions of the above-identified flow diagrams may be performed by multiple interacting apparatuses within the network. For example, in some embodiments, onboarding data may be gathered and generated by either a user device or a dealer device during subscription to one or more coverage policies. The protection locker, once onboarded, may be stored and delivered to the user or a third party from any of the networked computing devices described herein. For example, the protection locker may be displayed to the user via an app on the user device (e.g., the user's mobile phone. Similarly, the remedial measure may be determined by any of the computing devices disclosed herein.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Example Embodiments: User Interface and Functionality

FIGS. 35-84 illustrate additional example embodiments of a graphical user interface associated with an apparatus configured to implement embodiments of the present disclosure. For example, in some embodiments, a graphical user interface may be presented as part of a user application on a customer mobile device and may communicate with the systems and other apparatus disclosed herein for performing and displaying any of the functionalities described herein. The functionality and interface elements depicted in FIGS. 35-84 may be shown on an apparatus interface (e.g., a user, client, or dealer apparatus) and may performed according to the methods and apparatus described herein.

For example, FIGS. 35, 40, and 46-48 show an example graphical user interface depicting a map within a home screen interface in accordance with an embodiment of the present disclosure. The map may show third-party vendor locations and, in some embodiments, may facilitate driving instructions to the vendor/shop. The interface may further comprise a dashboard (e.g., the portion shown beneath the map) configured to be slidable over the map in response to a user touch input and gesture moving the dashboard upwards. The depicted dashboard includes an image of a vehicle retrieved from a third-party service provider server. An example navigation interface of a home screen interface is shown to be configured to, for example, navigate a user to a maintenance location in accordance with some embodiments of the present disclosure. In some embodiments, a third-party mapping API may be called and the navigation interface may be rendered into the consumer application on a mobile device as provided by the third-party.

FIGS. 36-37 show an example home screen interface including a user dashboard showing an example protection locker in accordance with an embodiment of the present disclosure. In the depicted embodiment, the user is able to access their vehicle registration information, protection information, insurance information, relevant receipts, and any other relevant data on the graphical user interface via one or more renderable data objects displayed on a screen of the apparatus.

FIGS. 38-40 and 44-45 show example maintenance data interfaces of a home screen interface in accordance with an embodiment of the present disclosure. In the depicted embodiment, the onboarding process may comprise the user inputting information about the vehicle, such as a make, model, trim level, vehicle color, or the like. The input data may be transmitted to a third-party server to request an image of the vehicle matching the information provided, and the graphical user interface may display an image of the vehicle.

FIGS. 41-42 show an example user home screen including a home screen interface in accordance with embodiments of the present disclosure. In the depicted embodiment, links to one or more vehicle diagnostic data sets (e.g., fuel information, battery information, diagnostic alerts—including DTC, maintenance information, recall information, and any other relevant information relating to the vehicle status and health), vehicle historical information (e.g., trip, location history, and the like), and/or additional functionality (e.g., WiFi hotspot) may be depicted. In some embodiments, with reference to FIGS. 41-42, the graphical user interface may comprise a rescan function that re-reads the vehicle data from the vehicle and updates the displayed information. The graphical user interface may be configured to trigger the rescan based on a pull-down gesture (e.g., "pull down here to rescan") as shown in the depicted embodiment. FIGS. 56-69 show an example of a home screen interface defining a vehicle scan animation in accordance with an example embodiment of the present disclosure. In the depicted embodiment, during a pull-down gesture, a top-down image of a vehicle is slowly revealed. Upon reaching the end of the pull-down (e.g., determined by a predetermined distance on the interface/screen), a scan animation may be shown and text indicating the status of the scan may be rendered beneath the vehicle. Upon completion of the scan, in some embodiments, an animation of the top-down image of the vehicle may be depicted as driving off screen (e.g., beneath the upper portion of the dashboard as shown in FIGS. 65-69. In some embodiments, the vehicle may disappear and the interface may return to the version shown in, for example, FIG. 56 upon completion of the rescan.

FIG. 43 shows an example home screen interface with a device offline indication in accordance with an embodiment of the present disclosure.

FIGS. 49-53 show examples of a home screen interface presenting vehicle status and diagnostic data in accordance with some embodiments of the present disclosure (e.g., upon selecting one of the diagnostic icons on the dashboard interface). FIGS. 40-41 show a timeline interface that tracks a historical record of the vehicle by the time of the occurrence of a diagnostic trigger event and/or vehicle information, such as a trip.

FIG. 54 shows an example of a home screen interface presenting a theft protection program information page in accordance with an example embodiment of the present disclosure. FIG. 55 shows an example of a home screen interface presenting a factory warranty information page in accordance with an example embodiment of the present disclosure. The protection lockers described herein may comprise one or more renderable interface pages that depict a status of each of one or more protection plans.

FIGS. 70-84 show an example of a home screen interface defining another vehicle scan animation in accordance with an example embodiment of the present disclosure. The depicted animation shows a vehicle with one or more bars surrounding the vehicle, which bars may fill as the scan progresses. In some embodiments, the bars may fill to a calculated position to render diagnostic information about the vehicle in an intuitive manner. For example, the fuel bar may fill to the actual fuel level of the vehicle. In some embodiments, the fullness of the bars may be tied to the completeness of the scan (e.g., all bars finish the scan 100% full). In some embodiments, the vehicle image may be shown at the center of the scan animation upon the occurrence of one or more of (1) detecting vehicle identification information, (2) associating the vehicle identification information with registration data, and/or (3) retrieval of the image from a third-party server following step (1) or (2). In some embodiments, the animation of FIGS. 70-84 may be depicted during a first-scan and/or onboarding process and the rescan animation described above may be depicted during a rescan.

CONCLUSION

Many embodiments of the subject matter described may include all, or portions thereof, or a combination of portions, of the systems, apparatuses, methods, and/or computer readable media described herein. The subject matter described herein includes, but is not limited to, the following specific embodiments:

A. A method of flexibly scaling vehicle monitoring system functionality:
receiving vehicle data from an on-board vehicle computing system;
determining, via a processor, whether the vehicle data comprises a vehicle identification data object;
in an instance in which the vehicle data comprises a vehicle identification data object, determining a first operational level from a plurality of operational levels;
receiving first vehicle data from the on-board vehicle computing system; and
causing rendering of a graphical user interface comprising one or more first renderable data objects associated with the first operational level, wherein the one or more first renderable data objects are based on the first vehicle data.

B. The method of embodiment A, wherein in an instance in which the vehicle data does not comprise the vehicle identification data object, causing rendering of an input graphical user interface comprising a request for input of the vehicle identification data object.

C. The method of any one of embodiments A-B, further comprising receiving the manual input of the vehicle identification data object via the input graphical user interface.

D. The method of any one of embodiments A-C, wherein in an instance in which the vehicle data does not comprise the vehicle identification data object, determining a second operational level of the plurality of operational levels, receiving second vehicle data from the on-board vehicle computing system, and causing rendering of a second graphical user interface comprising one or more second renderable data objects associated with the second operational level, wherein the one or more second renderable data objects are based on the second vehicle data.

E. The method of any one of embodiments A-D, wherein the second operational level is defeatured relative to the first operational level.

F. The method of any one of embodiments A-E, wherein determining the first operational level from the plurality of operational levels comprises comparing the vehicle identification data object with a predetermined vehicle identification data object associated with a registered account,
determining whether the vehicle identification data object matches the predetermined vehicle identification object associated with the registered account; and
in an instance in which the vehicle identification data object matches the predetermined vehicle identification object associated with the registered account, retrieving supplemental data associated with the predetermined vehicle identification data object or the registered account, wherein the one or more first renderable data objects are further based on the supplemental data; and
in an instance in which the vehicle identification data object does not match the predetermined vehicle identification data object associated with the registered account, the one or more first renderable data objects are not based on the supplemental data.

G. The method of any one of embodiments A-F, wherein a vehicle apparatus, comprising the processor, is in electrical communication with the on-board vehicle computing system, and wherein the registered account is associated with the vehicle apparatus and the predetermined vehicle identification data object.

H. The method of any one of embodiments A-G, wherein a vehicle apparatus, comprising the processor, is in electrical communication with the on-board vehicle computing system.

I. The method of any one of embodiments A-H, wherein the vehicle apparatus is configured to cause the graphical user interface to be rendered on a user mobile device.

J. The method of any one of embodiments A-I, further comprising onboarding a subscriber registration data object.

K. The method of embodiment J, wherein the onboarding comprises associating the registration data with a subscriber account and/or the vehicle.

L. The method of any one of embodiments A-K further comprising:
receiving vehicle data from an on-board vehicle computing system on a first vehicle; and
generating a vehicle diagnostic data object based on the vehicle data, wherein the vehicle diagnostic data object comprises one or more maintenance actions associated with the first vehicle.

M. The method of any one of embodiments A-L further comprising:
associating, via a processor, a vehicle diagnostic data object and one or more provider incentive data objects to generate a maintenance offer associated with the first vehicle; and
causing rendering of a graphical user interface comprising one or more first renderable data objects associated with the maintenance offer.

N. At least one non-transitory computer-readable storage medium having computer program code stored thereon, the computer program code configured, in execution with at least one processor, to perform the method of any one of embodiments A-M.

O. An apparatus for flexibly scaling vehicle monitoring system functionality, the apparatus comprising means for performing the method of any one of embodiments A-M.

P. A method of providing vehicle diagnostics and maintenance, the method comprising:
receiving vehicle data from an on-board vehicle computing system on a first vehicle;
generating a vehicle diagnostic data object based on the vehicle data, wherein the vehicle diagnostic data object comprises one or more maintenance actions associated with the first vehicle;
associating, via a processor, the vehicle diagnostic data object and one or more provider incentive data objects to generate a maintenance offer associated with the first vehicle; and
causing rendering of a graphical user interface comprising one or more first renderable data objects associated with the maintenance offer.

Q. The method of embodiment P, wherein generating the vehicle diagnostic data object comprises:
generating a trained model based on one or more aggregated vehicle data sets comprising second vehicle data from each of a plurality of vehicles; and
inputting at least a portion of the vehicle data into the trained model to generate the vehicle diagnostic data object.

R. The method of any one of embodiments P-Q, wherein the trained model is trained using the one or more aggregated vehicle data sets comprising historical maintenance data associated with the plurality of vehicles.

S. The method of any one of embodiments P-R, further comprising retrieving the aggregated vehicle data sets from an insurance claim database.

T. The method of any one of embodiments P-S, wherein the plurality of vehicles comprise at least two different makes of vehicle.

U. The method of any one of embodiments P-T, further comprising receiving diagnostic trigger indication, wherein the indication is based on at least one of a diagnostic trigger event or a user input; and causing at least the rendering of the graphical user interface based on the indication.

V. The method of any one of embodiments P-U, further comprising generating the one or more provider incentive data objects based on provider offering data.

W. The method of any one of embodiments P-V, wherein the provider offering data comprises metadata associated with the provider, including one or more of provider location, provider time of operation, and provider service offerings.

X. The method of any one of embodiments P-W, wherein the vehicle diagnostic data object comprises metadata associated with the first vehicle, and wherein associating the vehicle diagnostic data object and the one or more provider incentive data objects comprises comparing the metadata associated with the first vehicle and the metadata associated with the provider.

Y. The method of any one of embodiments P-X, wherein the metadata associated with the first vehicle comprises a vehicle location received from the first vehicle, wherein the metadata associated with the provider comprises the provider location, and wherein comparing the metadata associated with the first vehicle and the metadata associated with the provider comprises determining that the vehicle location and the provider location are within a threshold distance of each other.

Z. The method of any one of embodiments P-Y, wherein the provider offering data comprises one or more provider incentives, and wherein associating the vehicle diagnostic data object and the one or more provider incentive data objects comprises matching the one or more provider incentives with the vehicle diagnostic data object.

AA. The method of any one of embodiments P-Z, further comprising updating the graphical user interface to display second renderable data objects associated with scheduling data, and transmitting the scheduling data to a first provider based on an acceptance of the maintenance offer the user.

BB. The method of any one of embodiments P-AA, wherein the vehicle diagnostic data object comprises data indicative of at least one potential fault with the first vehicle based on the vehicle data.

CC. The method of any one of embodiments P-BB, wherein the at least one potential fault is predicted to occur but has not yet occurred with the first vehicle.

DD. The method of any one of embodiments P-CC, wherein the one or more provider incentive data objects are associated with the vehicle diagnostic data object based on at least one triggering event detected in the vehicle diagnostic data object or vehicle data.

EE. The method of any one of embodiments P-DD, wherein the at least one triggering event comprises at least one fault detected by a sensor on the first vehicle.

FF. The method of any one of embodiments P-EE, wherein the at least one triggering event comprises at least one potential fault with the first vehicle, wherein the at least one potential fault is predicted based on a trained model generated based on one or more aggregated vehicle data sets comprising second vehicle data from each of a plurality of vehicles.

GG. The method of any one of embodiments P-FF, wherein the one or more provider incentive data objects are agnostic of the vehicle diagnostic data object.

HH. The method of any one of embodiments P-GG, wherein the one or more provider incentive data objects are based on metadata associated with the first vehicle.

II. The method of any one of embodiments P-HH, wherein the vehicle diagnostic data object is generated by retrieving third-party maintenance data associated with the first vehicle and comparing the third-party maintenance data with the vehicle data.

JJ. The method of any one of embodiments P-II, wherein the one or more provider incentive data objects are stored in association with a user profile associated with the first vehicle, such that generating the maintenance offer comprises comparing the stored one or more provider incentive data objects with the vehicle diagnostic data object.

KK. The method of any one of embodiments P-JJ further comprising onboarding a subscriber registration data object.

LL. The method of embodiment KK, wherein the onboarding comprises associating the registration data with a subscriber account and/or the first vehicle.

MM. The method of any one of embodiments P-LL further comprising connecting a vehicle apparatus to the on-board vehicle computing system.

NN. The method of any one of embodiments P-MM further comprising:
  determining, via a processor, whether received vehicle data comprises a vehicle identification data object;
  in an instance in which the vehicle data comprises a vehicle identification data object, determining a first operational level from a plurality of operational levels;
  receiving first vehicle data from the on-board vehicle computing system; and
  causing rendering of a graphical user interface comprising one or more first renderable data objects associated with the first operational level, wherein the one or more first renderable data objects are based on the first vehicle data.

OO. The method of any one of embodiments P-NN, wherein the vehicle diagnostic data object is generated based on at least one of a diagnostic modeling system and a predictive analytics system.

PP. The method of any one of embodiments P-OO, wherein at least one of the provider incentive data objects and the maintenance offer is determined based on at least one of a diagnostic modeling system and a predictive analytics system.

QQ. The method of embodiment OO or PP, wherein the at least one of the diagnostic modeling system and the predictive analytics system comprises a machine learning model trained based on an aggregated device data set.

RR. The method of embodiment OO or PP, wherein the at least one of the diagnostic modeling system and the predictive analytics system comprises a statistical model using an aggregated device data set.

SS. The method of any one of embodiments P-RR, wherein the provider incentive data object comprises an intelligently-quoted protection product and the maintenance offer comprises an offer to purchase the protection product.

TT. The method of any one of embodiments P-SS, further comprising proactively executing a repair operation based on the vehicle diagnostic data object.

UU. The method of embodiment TT, wherein proactively executing a repair operation comprises automatically initiating an insurance claim and/or a repair of the vehicle.

VV. At least one non-transitory computer-readable storage medium having computer program code stored thereon, the computer program code configured, in execution with at least one processor, to perform the method of any one of embodiments P-UU.

WW. An apparatus for providing vehicle diagnostics and maintenance, the apparatus comprising means for performing the method of any one of embodiments P-VV.

XX. A method of providing vehicle diagnostics and maintenance, the method comprising:
  receiving vehicle data from an on-board vehicle computing system on a first vehicle;
  generating a vehicle diagnostic data object based on the vehicle data, wherein the vehicle diagnostic data object comprises one or more maintenance actions associated with the first vehicle;
  predicting a risk of failure of the vehicle based on the vehicle diagnostic data object; and
  causing rendering of a graphical user interface comprising one or more first renderable data objects associated with the risk of failure, wherein in some embodiments the renderable data objects may comprise a maintenance offer.

YY. The method of embodiment XX, further comprising proactively executing a repair operation based on the predicted risk of failure.

ZZ. The method of embodiment YY, wherein proactively executing a repair operation comprises automatically initiating an insurance claim and/or a repair of the vehicle.

AAA. At least one non-transitory computer-readable storage medium having computer program code stored thereon, the computer program code configured, in execution with at least one processor, to perform the method of any one of embodiments XX-ZZ.

BBB. An apparatus for providing vehicle diagnostics and maintenance, the apparatus comprising means for performing the method of any one of embodiments XX-AAA.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:
1. A method comprising:
  receiving vehicle data from a vehicle computing system onboard a vehicle;
  identifying, at a first computing system, at least one malfunction associated with the vehicle based at least in part on the vehicle data;
  identifying at least one user preference associated with a profile corresponding to the vehicle;
  determining, via the first computing system, at least one remedial measure based on the at least one malfunction and the at least one user preference, wherein the at least one remedial measure comprises a type of repair for the at least one malfunction, the type of repair being determined based on both the at least one malfunction and the at least one user preference;

detecting a location associated with the vehicle via a GPS receiver associated with the vehicle or a user device;

comparing, via the first computing system, first data associated with the vehicle to second data associated with a provider, wherein the first data includes at least the type of repair and the location, and wherein the second data is associated with a capability of the provider to perform the type of repair;

determining, via the first computing system, following the determination of the at least one malfunction and the at least one remedial measure, the provider based on the comparison;

initiating, via the first computing system in response to a user selection, following the determination of the provider, a provider network connection between the first computing system and a provider computing system associated with the provider;

transmitting, via the provider network connection and to the provider computing system, at least a portion of one of the at least one malfunction and the at least one remedial measure;

causing initiation of the at least one remedial measure for the vehicle; and causing rendering of one or more graphical user interfaces (GUIs) on the user device comprising information associated with the at least one remedial measure.

2. The method according to claim 1, wherein receiving the vehicle data from the vehicle computing system onboard the vehicle comprises:

detecting the vehicle data via at least one sensor onboard the vehicle; and transmitting the vehicle data from the vehicle computing system onboard the vehicle to the first computing system.

3. The method according to claim 1, wherein receiving the vehicle data from the vehicle computing system onboard the vehicle comprises:

receiving the vehicle data comprising a signal indicative of a type of apparatus utilized to identify an error associated with operation of the vehicle.

4. The method according to claim 1, wherein determining the at least one remedial measure comprises:

identifying policy information corresponding with the vehicle; and determining the at least one remedial measure based at least in part on the vehicle data and the policy information associated with the vehicle.

5. The method according to claim 1, wherein determining the at least one remedial measure comprises:

receiving, via the one or more GUIs, a GUI selection from a user that indicates the at least one remedial measure based at least in part on the vehicle data.

6. The method according to claim 1, further comprising: receiving at least one user engagement accepting the at least one remedial measure, wherein the at least one remedial measure is automatically initiated via the first computing system in response to receiving the at least one user engagement.

7. The method according to claim 1, further comprising:
identifying, at the first computing system, a second malfunction associated with the vehicle based at least in part on the vehicle data;

generating an urgency score associated with the second malfunction;

identifying one or more factors for determination of a second remedial measure for the second malfunction, wherein, based at least in part on the urgency score, the one or more factors exclude the at least one user preference; and determining, via the first computing system, the second remedial measure based at least in part on the second malfunction and the one or more factors and excluding the at least one user preference.

8. A system comprising at least one processor and at least one non-transitory memory having computer-coded instructions thereon that, in execution with the at least one processor, causes the system to:

receive vehicle data from a vehicle computing system onboard a vehicle;

identify at least one malfunction associated with the vehicle based at least in part on the vehicle data;

identify at least one user preference associated with a profile corresponding to the vehicle;

determine at least one remedial measure based on the at least one malfunction and the at least one user preference, wherein the at least one remedial measure comprises a type of repair for the at least one malfunction, the type of repair being determined based on both the at least one malfunction and the at least one user preference;

detect a location associated with the vehicle via a GPS receiver associated with the vehicle or a user device;

compare, via a first computing system, first data associated with the vehicle to second data associated with a provider, wherein the first data includes at least the type of repair and the location, and wherein the second data is associated with a capability of the provider to perform the type of repair;

determine, via the first computing system, following the determination of the at least one malfunction and the at least one remedial measure, the provider based on the comparison;

initiate, via the first computing system in response to a user selection, following the determination of the provider, a provider network connection between the first computing system and a provider computing system associated with the provider;

transmit, via the provider network connection and to the provider computing system, at least a portion of one of the at least one malfunction and the at least one remedial measure;

cause initiation of the at least one remedial measure for the vehicle; and cause rendering of one or more graphical user interfaces (GUIs) on the user device comprising information associated with the at least one remedial measure.

9. The system according to claim 8, wherein, to receive the vehicle data from the vehicle computing system onboard the vehicle, the system is caused to:

detect the vehicle data via at least one sensor onboard the vehicle; and transmit the vehicle data from the vehicle computing system onboard the vehicle to the first computing system.

10. The system according to claim 8, wherein, to receive the vehicle data from the vehicle computing system onboard the vehicle, the system is caused to:

receive the vehicle data comprising a signal indicative of a type of apparatus utilized to identify an error associated with operation of the vehicle.

11. The system according to claim 8, wherein, to determine the at least one remedial measure, the system is caused to:

identify policy information corresponding with the vehicle; and determine the at least one remedial measure based at least in part on the vehicle data and the policy information associated with the vehicle.

12. The system according to claim 8, wherein, to determine the at least one remedial measure, the system is caused to:

receive, via the one or more GUIs, a GUI selection from a user that indicates the at least one remedial measure based at least in part on the vehicle data.

13. The system according to claim 8, further caused to:

receive at least one user engagement accepting the at least one remedial measure, wherein the at least one remedial measure is automatically initiated via the first computing system in response to receiving the at least one user engagement.

14. A computer program product comprising at least one non-transitory computer-readable storage medium having computer program code stored thereon that, in execution with at least one processor, configures the computer program product for:

receiving vehicle data from a vehicle computing system onboard a vehicle;

identifying, at a first computing system, at least one malfunction associated with the vehicle based at least in part on the vehicle data;

identifying at least one user preference associated with a profile corresponding to the vehicle;

determining, via the first computing system, at least one remedial measure based on the at least one malfunction and the at least one user preference, wherein the at least one remedial measure comprises a type of repair for the at least one malfunction, the type of repair being determined based on both the at least one malfunction and the at least one user preference;

detecting a location associated with the vehicle via a GPS receiver associated with the vehicle or a user device;

comparing, via the first computing system, first data associated with the vehicle to second data associated with a provider, wherein the first data includes at least the type of repair and the location, and wherein the second data is associated with a capability of the provider to perform the type of repair;

determining, via the first computing system, following the determination of the at least one malfunction and the at least one remedial measure, the provider based on the comparison;

initiating, via the first computing system in response to a user selection, following the determination of the provider, a provider network connection between the first computing system and a provider computing system associated with the provider;

transmitting, via the provider network connection and to the provider computing system, at least a portion of the one of the at least one malfunction and the at least one remedial measure;

causing initiation of the at least one remedial measure for the vehicle; and causing rendering of one or more graphical user interfaces (GUIs) on the user device comprising information associated with the at least one remedial measure.

15. The computer program product according to claim 14, wherein receiving the vehicle data from the vehicle computing system onboard the vehicle comprises:

detecting the vehicle data via at least one sensor onboard the vehicle; and transmitting the vehicle data from the vehicle computing system onboard the vehicle to the first computing system.

16. The computer program product according to claim 14, wherein receiving the vehicle data from the vehicle computing system onboard the vehicle comprises:

receiving the vehicle data comprising a signal indicative of a type of apparatus utilized to identify an error associated with operation of the vehicle.

17. The computer program product according to claim 14, wherein determining the at least one remedial measure comprises:

identifying policy information corresponding with the vehicle; and determining the at least one remedial measure based at least in part on the vehicle data and the policy information associated with the vehicle.

18. The computer program product according to claim 14, wherein determining the at least one remedial measure comprises:

receiving, via the one or more GUIs, a GUI selection from a user that indicates the at least one remedial measure based at least in part on the vehicle data.

19. The computer program product according to claim 14, further comprising:

receiving at least one user engagement accepting the at least one remedial measure, wherein the at least one remedial measure is automatically initiated via the first computing system in response to receiving the at least one user engagement.

20. The method according to claim 1, further comprising:

transmitting, to the user device via the first computing system, a request for authorization to initiate the provider network connection, wherein initiating the provider network connection is based at least in part on the authorization.

* * * * *